United States Patent
Annema et al.

(10) Patent No.: US 7,059,954 B2
(45) Date of Patent: Jun. 13, 2006

(54) METHOD AND DEVICE FOR PROCESSING A POULTRY LEG

(75) Inventors: Hein Annema, Stevensbeek (NL); Petrus Christianus Hendrikus Janssen, Wilbertoord (NL); Franciscus Albertus Gerardus van den Hurk, Geffen (NL); Adrianus Josephes van den Nieuwelaar, Gemert (NL)

(73) Assignee: Stork PMT B.V. (NL)

( * ) Notice: Subject to any disclaimer, the term of this patent is extended or adjusted under 35 U.S.C. 154(b) by 0 days.

(21) Appl. No.: 10/393,705

(22) Filed: Mar. 21, 2003

(65) Prior Publication Data

US 2003/0181157 A1  Sep. 25, 2003

Related U.S. Application Data

(63) Continuation of application No. 09/971,501, filed on Oct. 5, 2001, now abandoned, which is a continuation of application No. PCT/NL00/00224, filed on Apr. 5, 2000.

(30) Foreign Application Priority Data

| Apr. 6, 1999 | (NL) | ................................. 1011736 |
| Jul. 26, 1999 | (NL) | ................................. 1012703 |

(51) Int. Cl.
*A22C 17/02* (2006.01)

(52) U.S. Cl. ..................... 452/136; 452/135; 452/149

(58) Field of Classification Search ............. 452/97, 452/125, 129, 130, 135, 136, 138, 149, 150, 452/151, 152, 153, 154, 155, 156, 160, 163, 452/164, 165
See application file for complete search history.

(56) References Cited

U.S. PATENT DOCUMENTS

| 3,913,174 | A | * | 10/1975 | Paoli ........................... 452/128 |
| 4,041,572 | A | | 8/1977 | Martin et al. |
| 4,380,849 | A | * | 4/1983 | Adkison et al. ............ 452/136 |
| 4,480,353 | A | * | 11/1984 | Martin et al. ................ 452/165 |
| 4,527,305 | A | * | 7/1985 | Martin et al. ................ 452/172 |
| 4,635,317 | A | * | 1/1987 | van der Eerden ........... 452/167 |
| 4,811,457 | A | * | 3/1989 | Lindert ........................ 452/136 |
| 5,001,812 | A | * | 3/1991 | Hazenbroek ................. 452/135 |
| 5,067,927 | A | * | 11/1991 | Hazenbroek et al. ....... 452/136 |
| 5,123,872 | A | * | 6/1992 | Tieleman et al. ........... 452/149 |
| 5,173,077 | A | * | 12/1992 | van den Nieuwelaar et al. 452/163 |
| 5,176,562 | A | * | 1/1993 | Martin et al. ................ 452/136 |
| 5,186,680 | A | * | 2/1993 | Conaway et al. ........... 452/125 |
| 5,203,736 | A | * | 4/1993 | Schulte et al. .............. 452/135 |
| 5,228,881 | A | * | 7/1993 | Sekiguchi ................... 452/172 |
| 5,401,210 | A | | 3/1995 | Mammoto et al. |
| 5,494,479 | A | * | 2/1996 | Lindert et al. .............. 452/135 |

(Continued)

FOREIGN PATENT DOCUMENTS

DE    93 09 847.2    8/1993

(Continued)

*Primary Examiner*—Peter M. Poon
*Assistant Examiner*—David Parsley
(74) *Attorney, Agent, or Firm*—Kristin J. Doyle; Kilpatrick Stockton LLP

(57) ABSTRACT

In a method and device for processing a poultry leg which is hanging from a carrier and comprises at least a drumstick, the operations are carried out: cutting into the drumstick substantially around the drumstick in the vicinity of the tarsal joint by means of at least one incision; and at least partially separating a part of the leg which comprises the at least one incision. The carrier is moved onwards during the cutting.

79 Claims, 32 Drawing Sheets

U.S. PATENT DOCUMENTS 5,542,879 A * 8/1996 Kunig et al. ............... 452/135
5,947,811 A * 9/1999 Hazenbroek et al. ....... 452/167
5,961,383 A * 10/1999 Janssen et al. ............. 452/135

FOREIGN PATENT DOCUMENTS

| EP | 0 442 554 A1 | 8/1991 |
|---|---|---|
| EP | 0 594 934 A2 | 5/1994 |
| EP | 0 858 739 A2 | 8/1998 |
| EP | 0 898 894 A2 | 3/1999 |
| GB | 2 124 883 A | 2/1984 |
| NL | 9301238 | 2/1994 |
| WO | WO 93/09675 | 5/1993 |
| WO | WO 94/28730 | * 12/1994 |
| WO | WO 00/59311 A3 | 10/2000 |

* cited by examiner

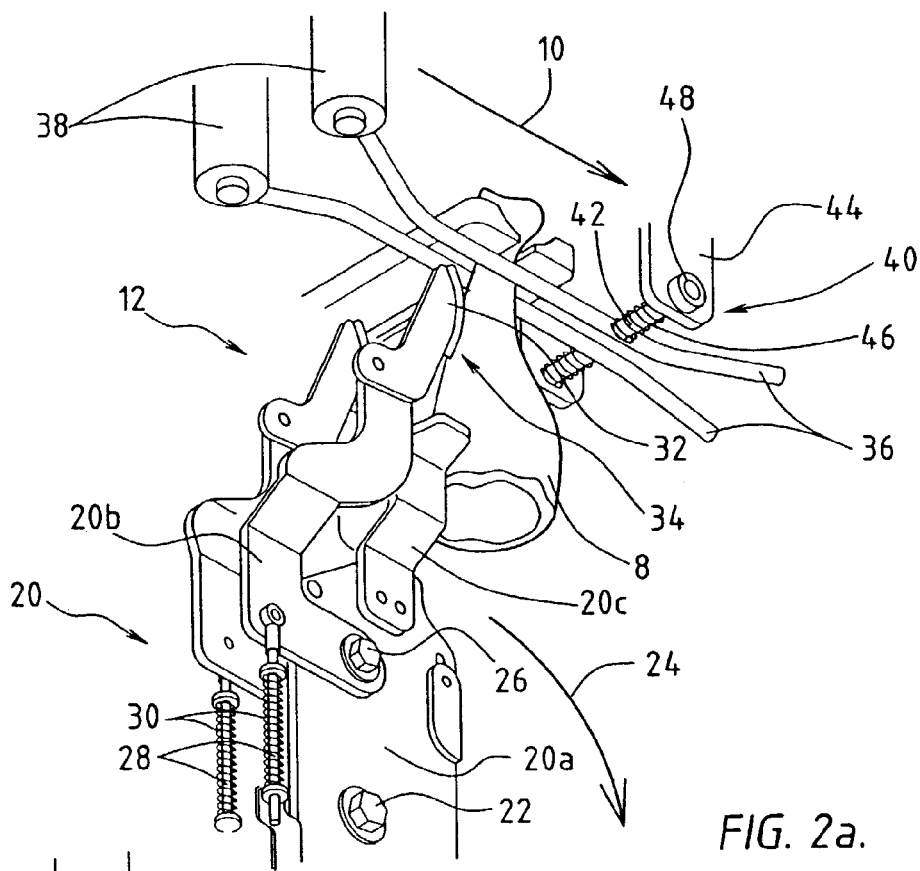
FIG. 2a.
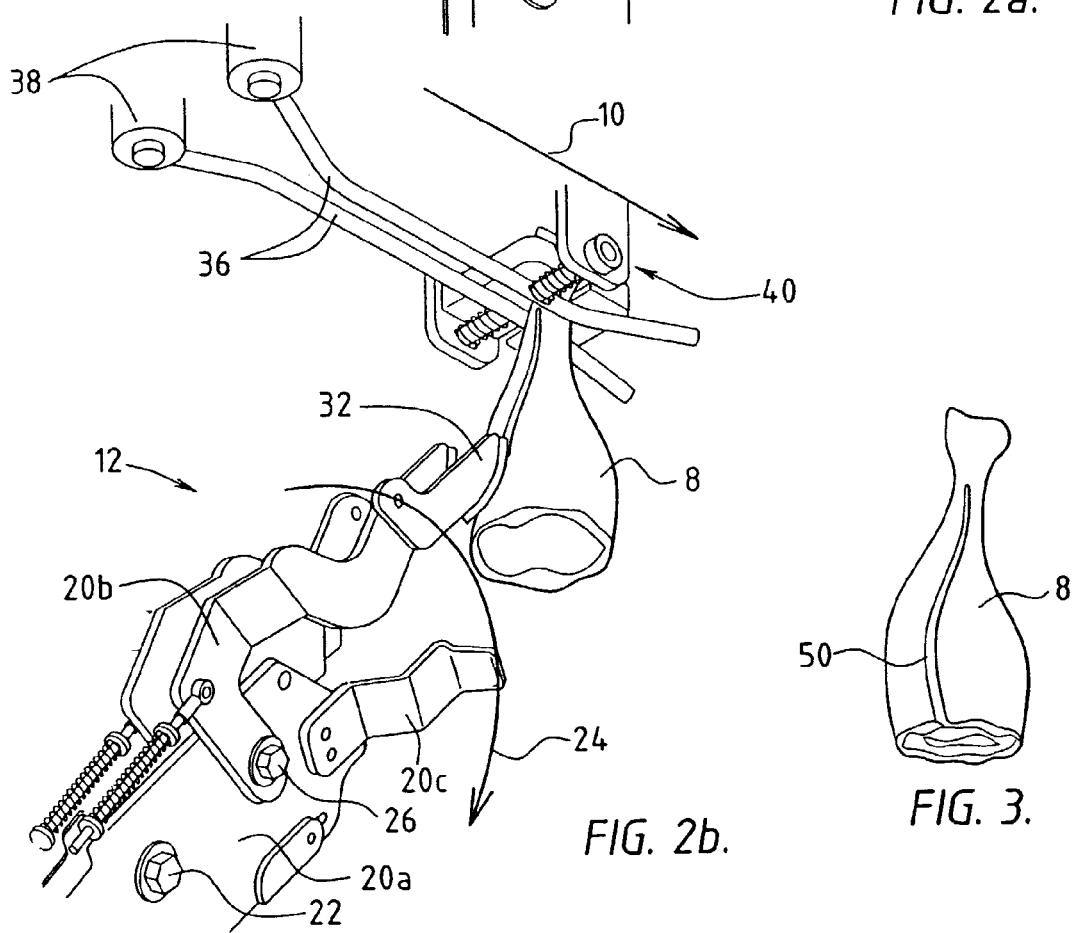
FIG. 2b.
FIG. 3.

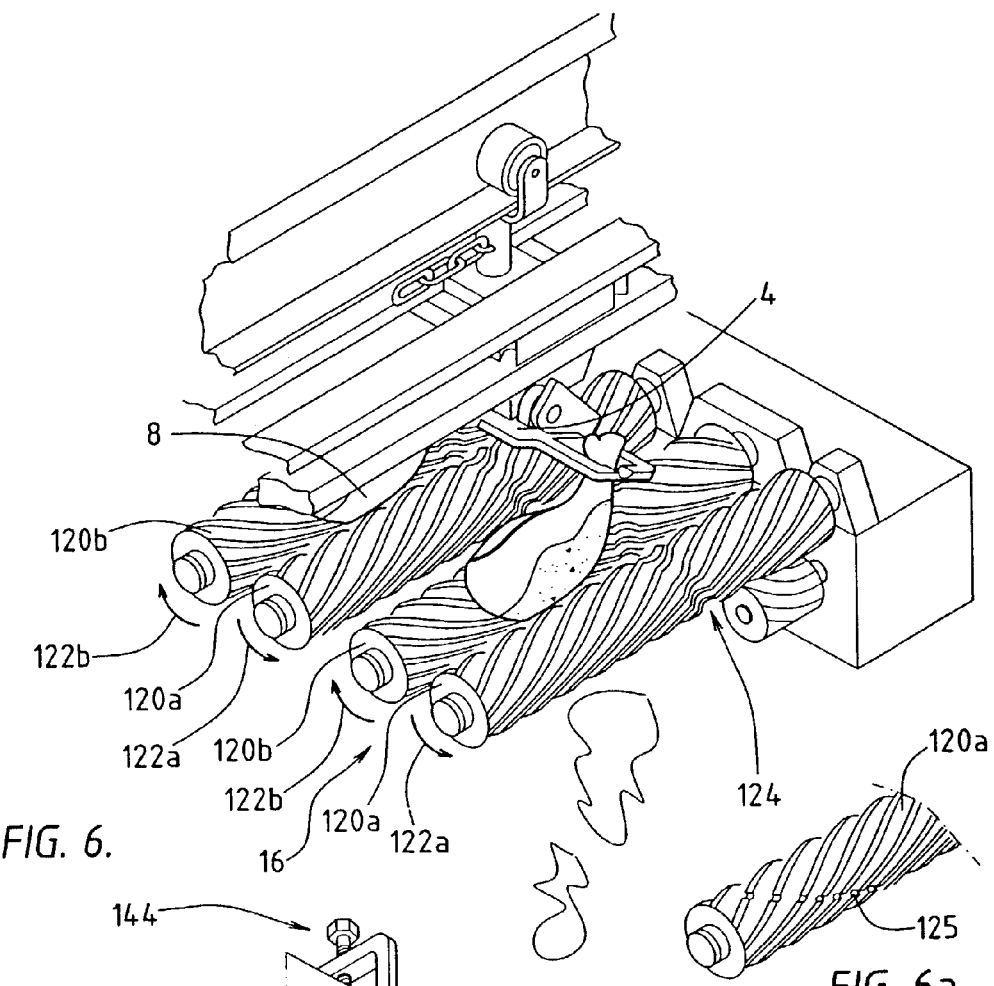
FIG. 6.
FIG. 6a.
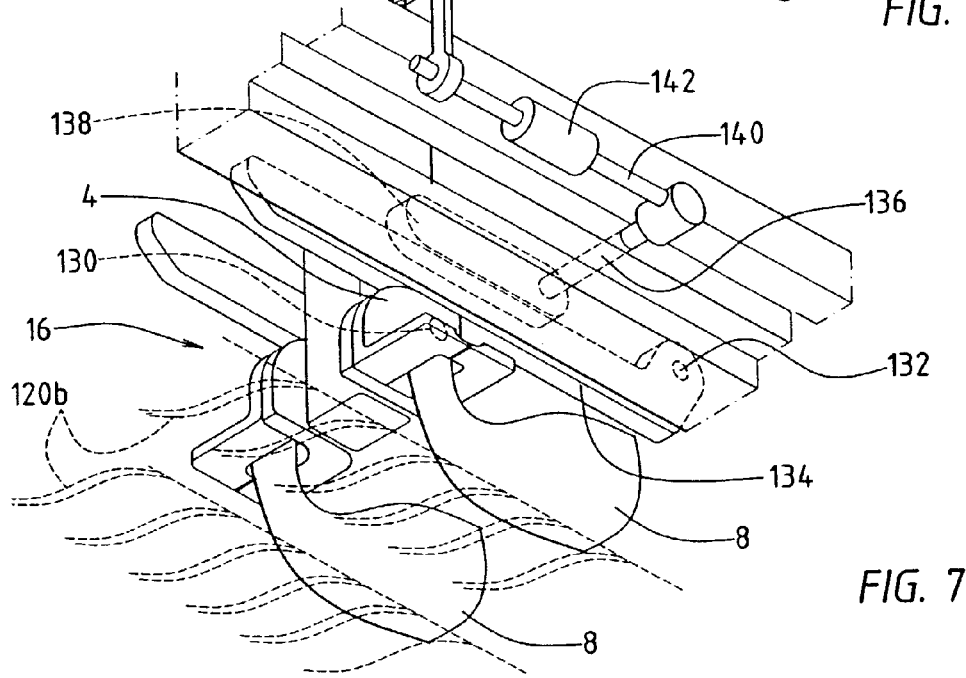
FIG. 7.

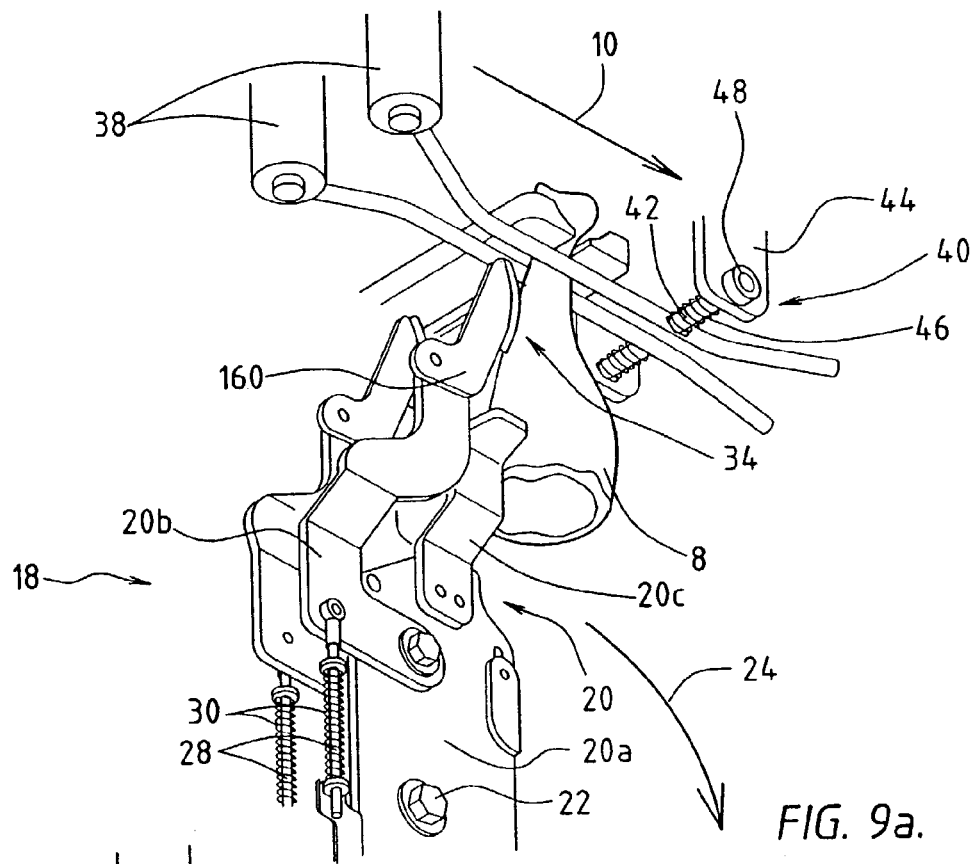
FIG. 9a.
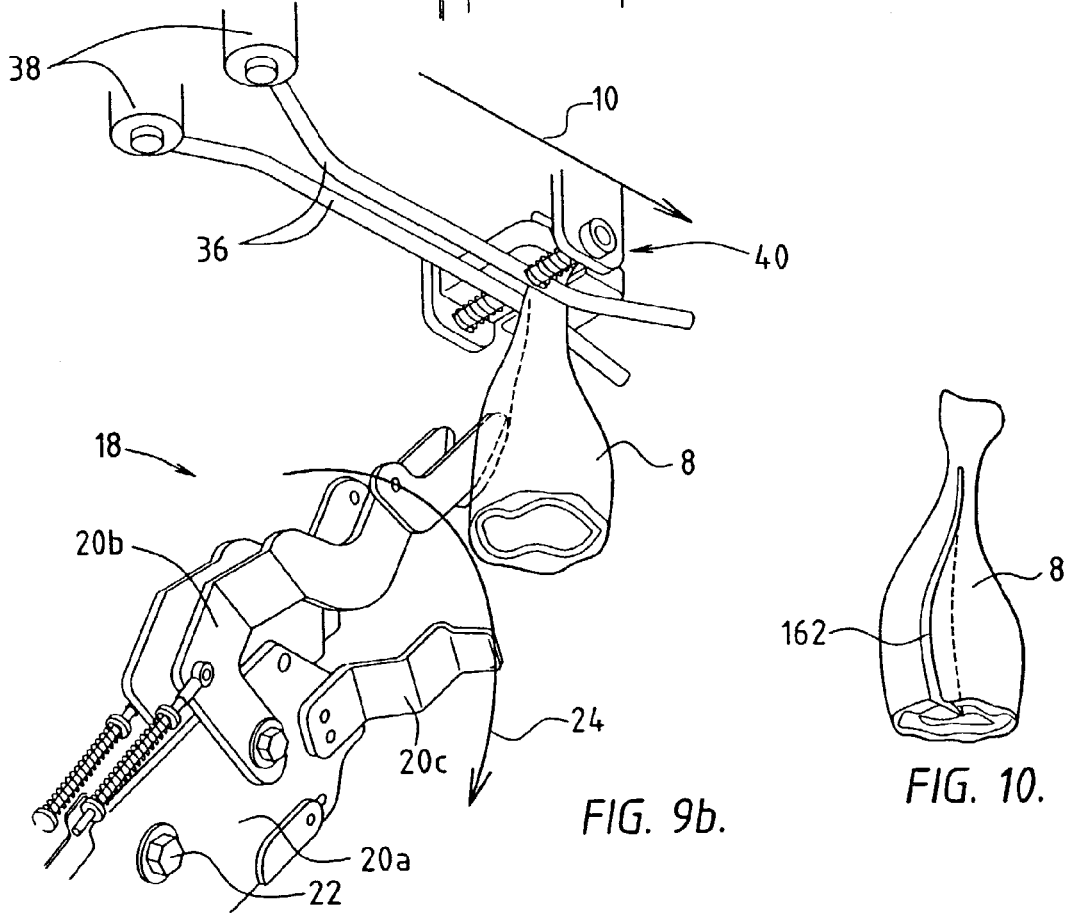
FIG. 9b.
FIG. 10.

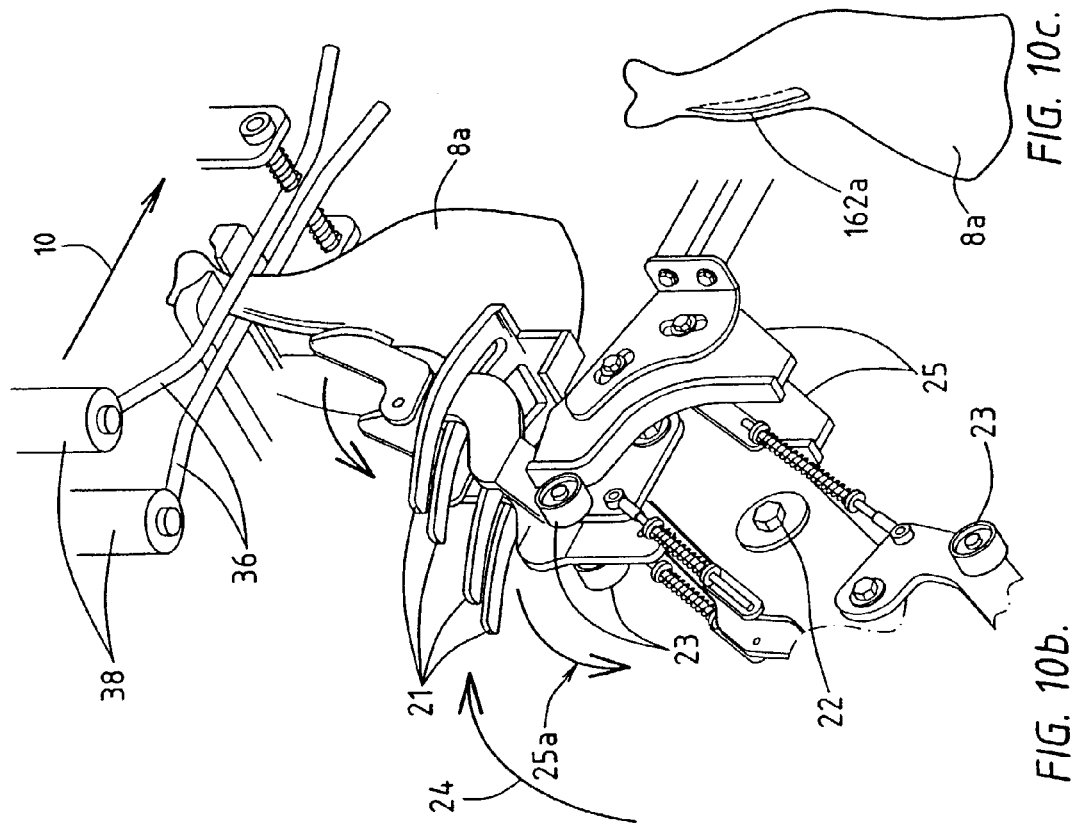
FIG. 10b.
FIG. 10c.
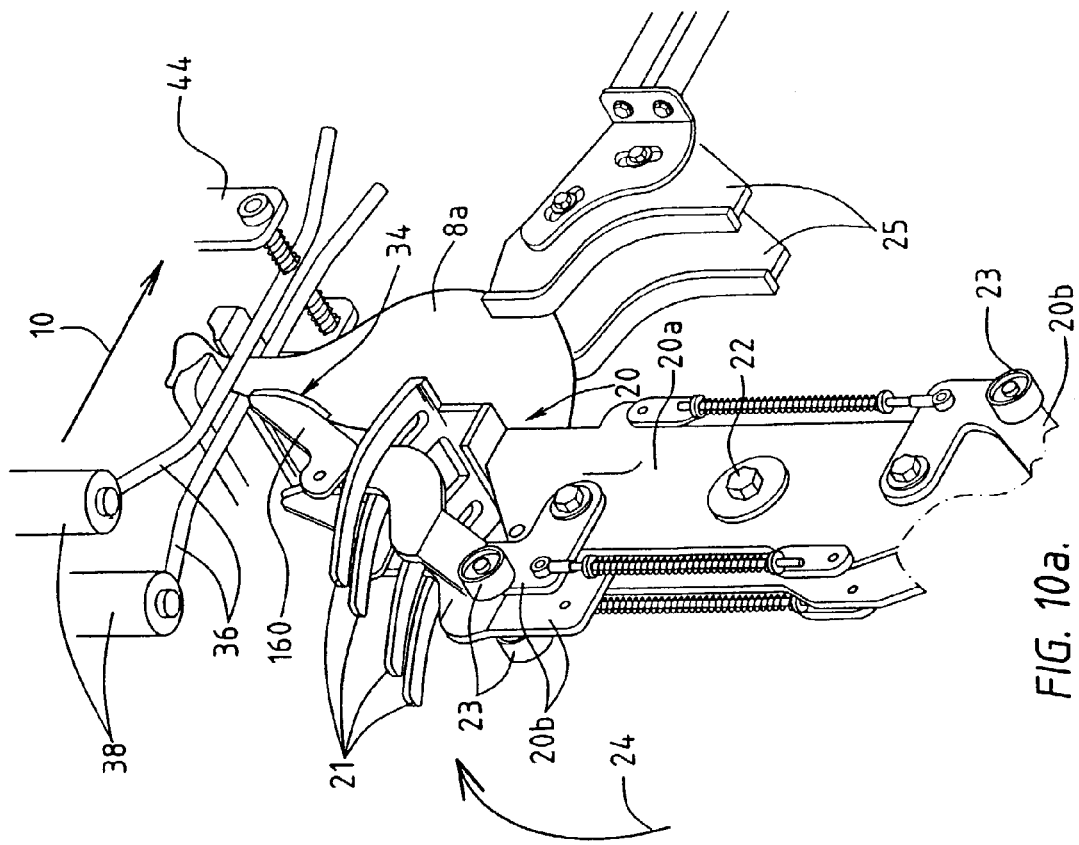
FIG. 10a.

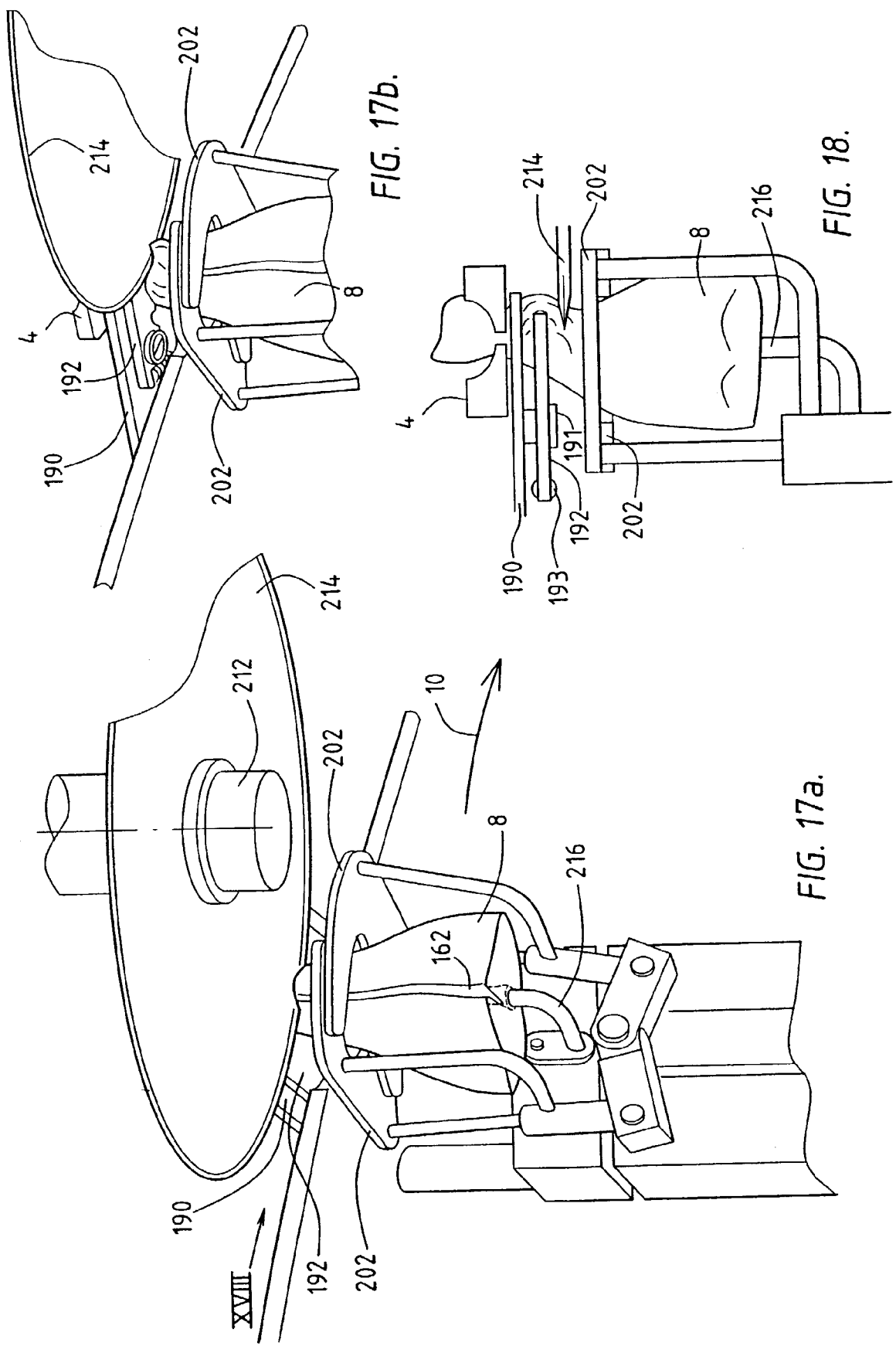

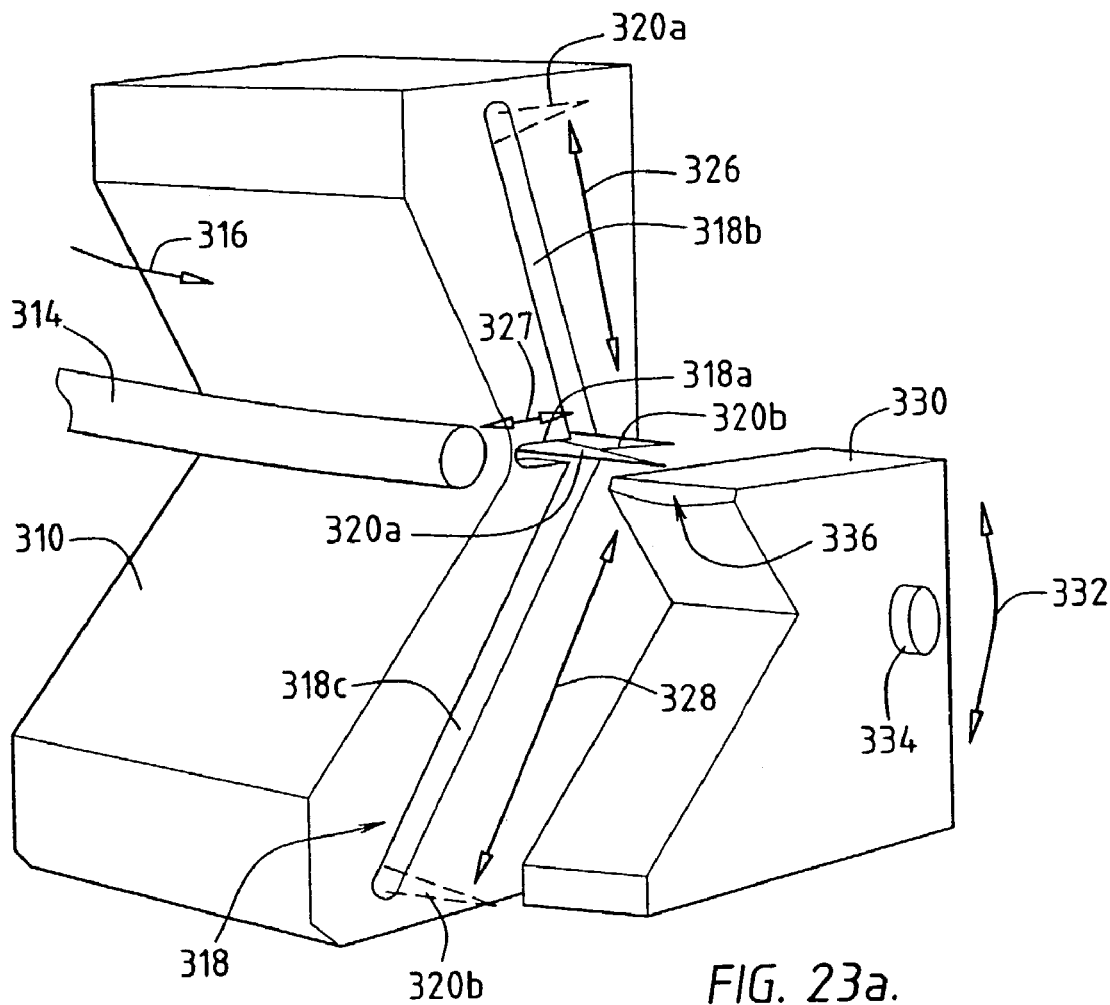
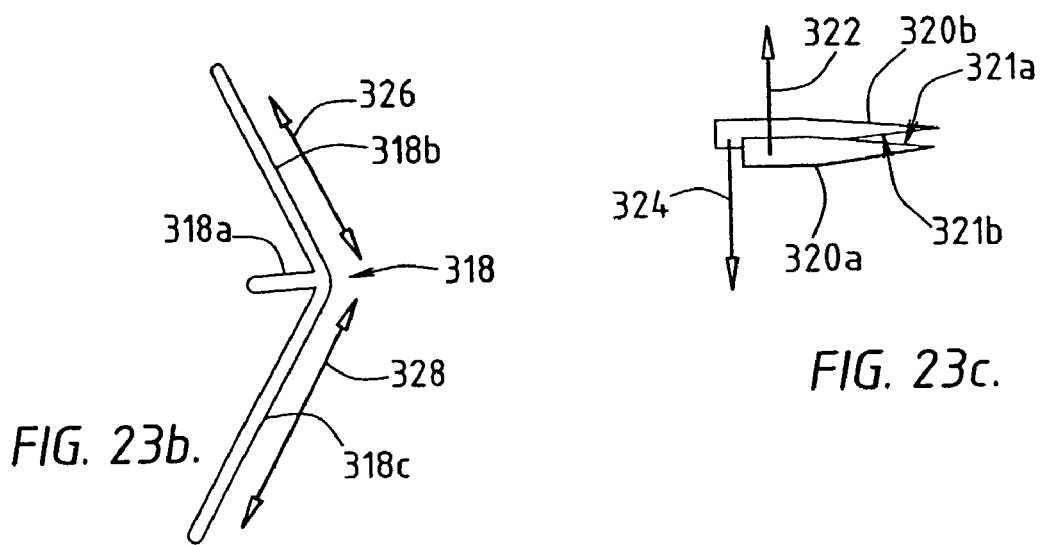
FIG. 23a.
FIG. 23b.
FIG. 23c.

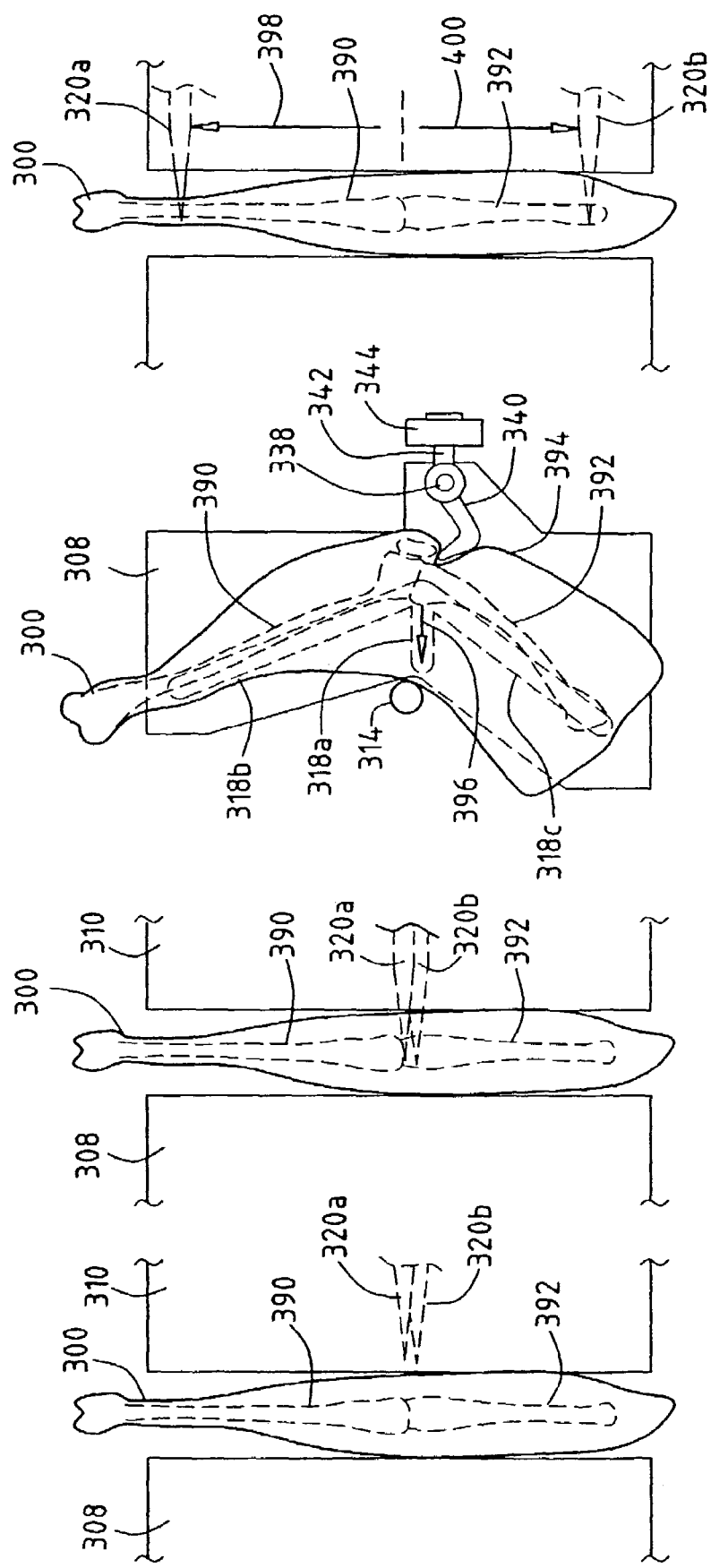

METHOD AND DEVICE FOR PROCESSING A POULTRY LEG

CROSS-REFERENCE TO RELATED APPLICATION

This application is a continuation application of U.S. patent application Ser. No. 09/971,501, filed Oct. 5, 2001, the entire contents of which are incorporated herein by reference.

This is a continuation application of PCT/NL00/00224 filed 5 Apr. 2000, herein incorporated by reference.

FIELD OF THE INVENTION

The invention relates to a method and device for processing a poultry leg which is hanging from a carrier and comprises at least a drumstick, in which the operations are carried out: cutting into the drumstick substantially around the drumstick in the vicinity of the tarsal joint by means of at least one transverse incision; and at least partially separating a part of the leg which comprises the at least one incision.

In the following, cutting into the drumstick around the drumstick in the vicinity of the tarsal joint is understood to mean breaking connective tissue (connective skin, tendons and/or meat) in the abovementioned area by means of at least one incision. If this is a single incision, the start and end of the incision may optionally coincide, be at a distance from one another or overlap one another. If there are a number of incisions, the start or end of a first incision may coincide with, be at a distance from or overlap the start or end of a second incision.

As is customary in the technical field, the drumstick is understood to mean that section of the leg which extends from the knee joint to the tarsal joint.

BACKGROUND OF THE INVENTION

A method and device as described above are known from NL-A-9301238, which describes the removal of bone from meat of a complete poultry leg. In this case, the area around the tarsal joint is clamped, and an incision is made around the drumstick in the vicinity of the tarsal joint in such a manner that the bone is reached. In a subsequent operation, the meat on the drumstick is pulled apart or stripped off the drumstick bone with the aid of a stripper mechanism. After a drumstick tendon has been severed in the vicinity of the knee joint, the meat is stripped off further in the vicinity of the knee joint, after which a thigh tendon is severed in the vicinity of the knee joint. Then, the thigh meat is stripped off the thigh bone and separated from the leg.

The known operation of removing bone from meat of an entire poultry leg takes place in a bone-removal device having a number of processing stations, in each of which at least one of the separate operations is carried out on the leg. The legs are supplied resting freely on a conveyor to a table and are hung in a clamping-head mechanism by an operator. The clamping head can move over the table, the latter subsequently being displaced between the various processing stations located above the table. During the processing in each processing station, the clamping head is stationary and cutting and meat-stripping tools are moved towards and away from the leg. The resultant meat which has been separated from the bone is discharged using a second conveyor.

One drawback of the known bone removal is that the operations provided for this purpose take place in an independent bone-removal device to which loose legs have to be supplied in an arbitrary orientation. Since the legs, prior to the bone removal, are generally situated in a conveyor of a slaughter line which is also used in earlier operations, such as halving the body of the bird and separating the legs from the body of the bird, transferring the legs from this conveyor to the conveyor of the bone-removal device requires certain logistic features, and hanging the legs in the clamping-head mechanisms of the bone-removal device requires the use of at least one operator, which facts increase costs and reduce the reliability of the bone-removal process.

SUMMARY OF THE INVENTION

An object of the invention is to eliminate the abovementioned drawbacks, and to this end the invention provides a method for processing a poultry leg according to the preamble of this description, which is characterized in that the carrier of the poultry leg is moved onwards during the operation of cutting into the drumstick around the drumstick in the vicinity of the tarsal joint. This measure makes it possible to carry out a skinning operation or a bone removal in the same slaughter line as other partial operations carried out on the bird, eliminating the need to supply separate legs to an independent device. The relative movement between the leg and an incision means which is required to make the incision is produced by moving the leg with respect to one or more substantially stationary incision means, such as blades, water jets or the like, instead of moving the incision means with respect to a substantially stationary leg as in the prior art.

A device according to the invention for carrying out the method according to the invention comprises: a conveyor with a carrier for carrying the leg by its tarsal joint; transverse incision means for cutting into the drumstick substantially around the drumstick in the vicinity of the tarsal joint by means of at least one transverse incision; and separation means for at least partially separating a part of the leg which comprises the at least one incision, and is characterized in that the conveyor and the transverse incision means are adapted to cut while the leg is being conveyed along a conveyor path in a conveying direction.

With the method and device according to the invention, it is possible to obtain high processing speeds using means which are not technically complex.

In general, an operation carried out on a poultry leg will comprise both a skinning operation and a boning operation. The order in which these operations take place can in principle be selected as desired. Preference, incidentally, is given to carrying out skinning before boning, since in that case—by contrast to the reverse order—during the skinning operation the underlying meat is still joined to the bone parts in the leg, and therefore the risk of the meat becoming deformed and meat being lost as a result of skinning is minimal. In addition, different processing sequences can be adopted for different parts of the leg: for example, it is possible firstly to remove a thigh bone and/or kneecap and only then to skin and bone the drumstick.

In a preferred embodiment, a transverse incision is made from one side of the leg in opposite circumferential directions towards an opposite side of the leg. In this case, the risk that the tissue which is to be cut into, such as the skin, meat and/or tendons, will be undesirably displaced as a result of the incisions being made is minimal.

According to the invention, a device for cutting into the skin, meat and/or tendons around the drumstick according to the selected incision depth comprises transverse incision means with two blades which are arranged on opposite sides of the conveyor path, are preferably provided with convex cutting edges and can move in to and out of the conveyor path. Preferably, the blades can each pivot about a substantially vertically oriented pin, more particularly from a position in which the blades are located in the conveyor path of the leg to a position lying further outwards, to which they can be moved counter to a biasing force. In such a device, the front side of a leg being conveyed by the conveyor runs onto the cutting side of the blades, which are then pressed outwards by the leg while forming an incision around the drumstick. As seen in the conveying direction of the leg, the blades may be arranged one behind the other, but preferably they are arranged next to one another in order to form a device which is as compact as possible. If the blades are not at identical heights, for example because they are arranged next to one another and partly cross and overlap one another, the respective incisions which have been made in the leg by the blades will not merge into one another; however, a residual tissue connection between the incisions may be kept very small, so that this connection can be broken easily and in a predetermined manner during a subsequent operation.

The efficiency and reliability of a skin removal operation is increased by using longitudinal incision means to cut into the skin substantially in the longitudinal direction of the leg between the tarsal joint and the knee joint or hip joint, in particular in the direction away from the tarsal joint towards the knee joint or hip joint, before the skin is pulled off the leg. In addition, in a preferred embodiment of the method according to the invention, it is possible, before the operation of cutting into the drumstick in the vicinity of the tarsal joint substantially around the drumstick, at the same time as this operation, after this operation or independently of this operation, to cut into the meat of the drumstick, or of the drumstick and the thigh, or only of the thigh, preferably all the way to the bone, with the aid of longitudinal incision means in the longitudinal direction thereof between the tarsal joint and the knee joint or between the tarsal joint and the hip joint or between the knee joint and the hip joint, in particular from the tarsal joint to the knee joint or from the tarsal joint to the hip joint or from the knee joint to the hip joint. In this way, it is possible to inspect the meat and/or the bone, and the removal of the meat from the drumstick bone and/or the thigh bone is also facilitated. If both a transverse incision and a longitudinal incision are made, the transverse incision is preferably made from that side of the leg which is facing away from the longitudinal incision, in opposite circumferential directions, towards the side of the leg bearing the longitudinal incision, in particular in such a manner that the transverse incision and the longitudinal incision cross one another.

Preferably, the longitudinal incision means comprise at least one arm with a free end which is provided with a blade, the blade being moved in a vertical plane and away from the tarsal joint in order to make the incision. The use of an arm provided with a blade offers various possibilities of forming a desired longitudinal incision in the leg while the leg is being moved onwards in a conveyor. In an advantageous embodiment, the blade is moved substantially in the conveyor path at the rear side of the leg which is to be processed, in which case, in a simple and inexpensive structure, the arm can rotate or pivot synchronously with the carrier, in particular about a horizontal pin which is located at a distance from the blade. Particularly in the rotating design, two arms which extend in opposite directions are preferably mounted on the same pin, resulting in a very effective, balanced construction.

An optimum longitudinal incision is obtained if the arm is divided between the blade and the pin, the parts being pivotably connected to one another, and a part which lies on the side of the blade being able to pivot with respect to another part lying on the side of the pin counter to a biasing force. The blade located at the end of a rotating or pivoting arm can thus be moved into the skin or the meat in the vicinity of the tarsal joint, after which the force which is required for the incision is determined not primarily by a drive of the arm but by the biasing force, which can be selected appropriately.

To allow the incision depth to be controlled appropriately, the longitudinal incision means preferably comprise a stop which is arranged on the arm, interacts with the blade and is adapted to position the leg with respect to the blade.

Hanging a leg from a carrier by its tarsal joint usually offers freedom allowing the leg to pivot in certain transverse directions (for example in the conveying direction or in the opposite direction, or else in other directions) with respect to the hanging point by exerting a transverse force on the leg above or below the point where it is hung.

Firstly, cutting into the leg around the drumstick in the vicinity of the tarsal joint generates a transverse force of this nature, which without special measures would cause the leg to pivot counter to the conveying direction, in a manner which is undesirable for the incision. To prevent this, the invention provides leg support means beneath the conveyor which can move parallel to and synchronously with the latter, in the conveying direction for supporting the leg on its rear side. The leg support means may, for example, be designed as plates or rods which are arranged on an endless conveyor belt or chain, in which case the interval between the plates or rods is equal to that between the carriers.

Secondly, making a longitudinal incision in the leg on its rear side generates a transverse force on the leg, which without special measures would cause the leg to pivot in the conveying direction in a manner which is undesirable for the longitudinal incision. To prevent this, the invention provides two guides which are arranged on either side of the conveyor path of the leg and substantially parallel thereto, interact with the longitudinal incision means and can be moved apart counter to a biasing force, and the smallest distance between which is selected in such a manner that it is smaller than the transverse dimensions of the leg at the level of the guides. Owing to the biasing forces, the guides press on the conveyed leg causing a frictional force which offers a resistance to the cutting force caused by the longitudinal incision means.

When carrying out a skinning operation according to the invention on a poultry leg hanging from a carrier while it is being moved onwards, the skin is cut into substantially around the drumstick in the vicinity of the tarsal joint by means of at least one incision substantially to a depth which is equal to the thickness of the skin (in some cases slightly less deep or slightly deeper), and is then pulled off the leg.

To obtain an effective cut with a pleasing appearance, the skin is preferably stretched, prior to the at least one incision around the drumstick, by the skin being engaged at one or more locations between the tarsal joint and the knee joint, in particular at two locations on either side of the drumstick, and by the engaged skin section being moved away from the tarsal joint. As a result, the skin is stretched, or at least more or less pulled taut, in the area of the tarsal joint, thus facilitating the cutting.

To allow the skin to be removed with a high level of reliability, an incision is made in the skin around the drumstick in the vicinity of the tarsal joint and a longitudinal incision is made in the skin between the tarsal joint and the knee joint or hip joint, in such a manner that these incisions cross one another.

To ensure simple, reliable skin removal, the skin is preferably engaged on that side of the leg which is facing away from the incision between the tarsal joint and the knee joint or hip joint.

In a preferred embodiment of a skinning operation carried out on a drumstick or a complete leg, after the skin has been cut into around the drumstick in the vicinity of the tarsal joint and before the skin is pulled off the leg, the skin is engaged at one or more locations between the tarsal joint and the knee joint or hip joint, and the engaged skin section is moved away from the tarsal joint. This is also known as a "skin correction". In this case, the skin is preferably engaged on that side of the leg which is facing away from a longitudinal incision in the skin of the leg, if a longitudinal incision of this nature is present.

Any skin which has been displaced in an undesirable manner, for example in the direction of the tarsal joint, during prior operations can be returned to its natural position as far as possible using the abovementioned skin correction. In the context of a skinning operation, it is therefore made certain that skin to be engaged is located at a specific location on the leg and thus can actually be engaged, for example by skinning rollers which are known per se. A skin correction (engaging the skin at one or more locations between the tarsal joint and the knee or hip joint and moving the engaged skin section away from the tarsal joint) may also be used independently, without the skin being cut into beforehand around the drumstick in the vicinity of the tarsal joint, in any processing process for drumsticks or complete legs, for example in order to improve the presentation thereof.

The invention also provides a set of elongate skinning rollers which are each provided with helical toothing, the diameter of the toothing over a section of the length of the skinning rollers being smaller than the diameter of the toothing over the remaining part of the length. Instead of, or in addition to the section of the toothing with a reduced diameter, it is also possible to provide a set of elongate skinning rollers which are each provided with helical toothing, the toothing being provided over a section of the length of the skinning rollers with a helical groove with a pitch which is directed oppositely to that of the toothing. That section of the skinning rollers which has a reduced diameter or the helical groove enables the skinning rollers to better engage the product which is to be skinned. Incidentally, the skinning rollers according to the invention may also be used in a skinning device according to the prior art, both for skinning a drumstick and for skinning an entire leg which comprises a thigh and a drumstick.

Moreover, it is also possible for the skin correction to be used independently in a known skinning process. It is also possible for the skin correction to be used independently in the context, for example, of a packaging or presentation operation of a skin-comprising leg, so that a pleasant product appearance is obtained and the shelf life of the leg meat located beneath the skin is improved.

The skin correction is preferably carried out by a number of brushing elements which are arranged in the conveyor path of the drumstick and can be moved apart transversely with respect to the conveyor direction counter to a biasing force. Brushing elements of this nature are preferably made from metal, but may also be made from flexible, resilient material, for example may be designed as a rubber flap or the like. The brushing elements may be arranged on one end of one or more arms which are arranged on a substantially horizontal pin extending transversely to the conveyor path in such a manner that they can pivot beneath the conveyor path counter to a biasing force.

Preferably after the skinning operation, but possibly also during or before the skinning operation, or entirely independently thereof, for the purpose of boning the poultry leg and obtaining at least some of the meat located thereon, the following operations are preferably carried out: cutting into the drumstick in the vicinity of the tarsal joint on a first side of the drumstick; and severing the tendons of the drumstick in the vicinity of the tarsal joint. Since the tendons in the vicinity of the tarsal joint extend on all sides of the drumstick bone substantially in the longitudinal direction thereof, the severing of the tendons is preferably preceded by the operation of moving the tendons to a second side, located opposite the first side of the drumstick, for example by pushing them around the drumstick bone from the first side of the drumstick in two opposite directions. Then, the tendons which have been brought together can easily be severed by a cutting means which is situated along the conveyor path of the drumstick and which in fact produces a cutting operation on tendons around the drumstick in the vicinity of the tarsal joint. In this case, it is also possible to dispense with the step of cutting into the drumstick in the vicinity of the tarsal joint on a first side of the drumstick, irrespective of whether or not the drumstick contains skin. It will also be clear that the procedure of bringing tendons which are located all the way around the bone and are connected to pieces of meat together on one side of a bone part may in principle also be applied to any other bone parts of this nature.

Then, the meat is preferably at least partially scraped off the bone between the tarsal joint and the knee joint, in particular along a path from the tarsal joint to the knee joint, with the aid of separation means. It is advantageous for at least part of the scraping path to be passed through twice, to ensure that the meat is scraped completely off the bone. This is because it has been found that if conventional scraper elements are used (which usually consist of a set of plate-like elements provided with edge recesses, the edge recesses together forming a scraping opening, the dimensions of which can vary by moving the scraper elements towards one another under a biasing force), when the scraping path is passed through the first time the bone membrane around the bone passes between the scraper elements, with the result that residual meat connected to the bone membrane continues to adhere to the bone. When the scraping path is passed through for the second time, the bone membrane has been found to largely come off the bone, so that it can be removed together with the meat by the scraping operation. If scraping were only carried out once, as is customary in the prior art, substantial scraping forces have to be used if the bone membrane is to be directly detached from the bone. In this case, there is a considerable risk that the fibula will also be scraped off the bone membrane, and will then join the scraped-off meat, so that it has to be removed by hand. Therefore, if, according to the invention, at least part of the scraping path is passed through twice, it is possible to use considerably reduced scraping forces, so that the bone membrane is scraped off but the fibula is not.

After the scraper elements have passed the knee joint part of the drumstick, so that they are pressed apart counter to the spring biasing, they are forced to a short distance apart and are moved further in the scraping direction. Due to this measure, the meat to a large extent tears off the knee joint owing to the "lever action" which is exerted on the meat around the knee joint part by the scraper elements via the meat.

Preferably, the knee joint is supported on the side facing away from the tarsal joint by means of at least one knee support during at least part of the scraping, so that scraping forces exerted by the scraper elements are absorbed as compressive forces in the bone, and consequently the risk of the bone breaking during the scraping operation is minimal. The support for the knee joint is particularly advantageous if the scraper elements pass the knee joint, which is larger than the tibiotarsus, since this results in the greatest scraping forces. The risk of the bone breaking is reduced still further by lifting the leg up through the support out of its suspension from the carrier during scraping, thus simply and effectively preventing tensile forces from being generated on the bone between the tarsal joint and the scraper elements, which may cause the bone to break.

After the scraping operation, the meat can be separated from the bone, preferably by cutting through the meat on that side of the knee joint facing away from the tarsal joint.

According to the invention, to bone a poultry leg which comprises a thigh and a drumstick, the following are provided:

thigh incision means for making at least one incision along the thigh bone in the longitudinal direction thereof, substantially on the rear side and that side of the thigh bone which faces towards the inner side of the thigh, and preferably from the knee joint; drumstick incision means for making at least one incision, preferably from the knee joint, along the drumstick bone in the longitudinal direction thereof; and knee incision means for cutting into tendons of the knee joint, in particular in the area between the kneecap and the back of the knee, and between the thigh bone and the drumstick bone. To bone the poultry leg, it is possible, although not necessary, to make an incision around the drumstick in the vicinity of the tarsal joint. In a preferred embodiment, the knee incision means comprise two at least partially overlapping blades which can be moved in such a manner that they are moved from one side of the poultry leg behind the kneecap at least partially between opposite ends of the thigh bone and the drumstick bone and are then moved apart so that they each separately form the thigh incision means and the drumstick incision means. When making the knee incision, the overlapping blades execute a snipping movement which delivers cutting forces which act substantially on the leg parts which are to be cut into but have scarcely any effect on the poultry leg as a whole.

During the cutting operations on the poultry leg, the leg is supported on at least one of its sides by means of a support surface, in the back of its knee by means of a rod directed transversely to the poultry leg, and on its front side by means of a support surface which is to be placed against the thigh, and the kneecap is preferably also positioned by means of a kneecap stop which is to be arranged against it.

The support surface for the side, in particular the inner side, of the poultry leg is provided with one or more slots to allow the thigh incision means, the drumstick incision means and/or the knee incision means to pass through.

In another embodiment, the poultry leg is positioned by means of a pin, one end of which is intended to be moved from one side into the poultry leg behind the kneecap and between opposite ends of the thigh bone and the drumstick bone.

In a further preferred embodiment of the device according to the invention for processing a poultry leg, thigh bone removal means are provided for taking the thigh bone out of the thigh meat via a thigh incision made using the thigh incision means. The thigh bone removal means are adapted to exert a force on the thigh bone in the vicinity of the condyle on the side of the knee joint, which force is directed substantially transversely with respect to the thigh bone.

The carrier for the poultry leg preferably comprises a pin, one end of which is intended to be arranged from one side of the poultry leg behind the kneecap between opposite ends of the thigh bone and the drumstick bone. A carrier of this nature can be used independently for conveying and/or positioning a poultry leg for the purpose of any operation which is to be carried out thereon. The pin comprises a first elongate section, of which the said end forms part, which first elongate section is connected to a second elongate section which is oriented transversely thereto, the second section being attached to a first element which is arranged, in such a manner that it can rotate about a pin oriented parallel to the second elongate section, on a second element which is arranged rotatably on a third element which is arranged rotatably on a fourth element which can move along a predetermined path.

The operations according to the invention may take place both in an automatic processing line, in which other operations also take place, and in an independent processing unit. The automatic processing line may include one or more processing units for carrying out a specific operation, both in a linear or quasi-linear arrangement, and, for example, in a carousel arrangement.

The claims and advantages will be more readily appreciated as the same becomes better understood by reference to the following detailed description and considered in connection with the accompanying drawings in which like reference symbols designate like parts or parts having similar functions.

BRIEF DESCRIPTION OF THE DRAWINGS

FIGS. 2a and 2b show enlarged perspective details of the device shown in FIG. 1 in various processing stages;

FIG. 3 shows a perspective view of the result of an incision made in a drumstick in the manner illustrated with reference to FIGS. 2a and 2b;

FIG. 6 shows a perspective view of a skinning operation carried out in the device shown in FIG. 1; FIG. 6a shows a perspective view of an alternative design of a skinning roller;

FIG. 7 shows a perspective view of a detail of the skinning operation shown in FIG. 6, seen from another side;

FIGS. 9a and 9b show perspective details of the device shown in FIG. 1 in various processing stages;

FIG. 10 shows a perspective view of the result of an incision made in a drumstick in the manner illustrated with reference to FIGS. 9a and 9b;

FIGS. 10a and 10b show perspective details of an alternative embodiment of the device shown in FIG. 1 in various processing stages;

FIG. 10c shows a perspective view of the result of an incision made in a complete leg in the manner illustrated with reference to FIGS. 10a and 10b;

FIG. 17a shows a perspective view of the construction shown in FIG. 16 in a subsequent processing stage;

FIG. 17b shows a perspective view of a detail from FIG. 17a;

FIG. 18 shows a side view, in the direction of arrow XVIII, of the construction shown in FIG. 17;

FIG. 23a shows a perspective view of interacting components of the device shown in FIG. 21;

FIG. 23b shows a side view of a slot in a cutting block shown in FIG. 23a;

FIG. 23c shows a plan view of blades in the cutting block shown in FIG. 23a;

FIG. 24 shows an alternative embodiment of the components shown in FIG. 23a;

FIG. 25 shows a cut-away perspective view of the cutting block shown in FIG. 23a;

FIG. 26a shows a side view of the device shown in FIG. 24 for processing a poultry leg;

FIGS. 26b, 26c and 26d show a rear view of various processing stages carried out on the poultry leg in accordance with FIG. 26a;

FIG. 27b shows a rear view of the processing of a poultry leg as shown in FIG. 27a;

DESCRIPTION OF THE PREFERRED EMBODIMENTS

Figure 1:
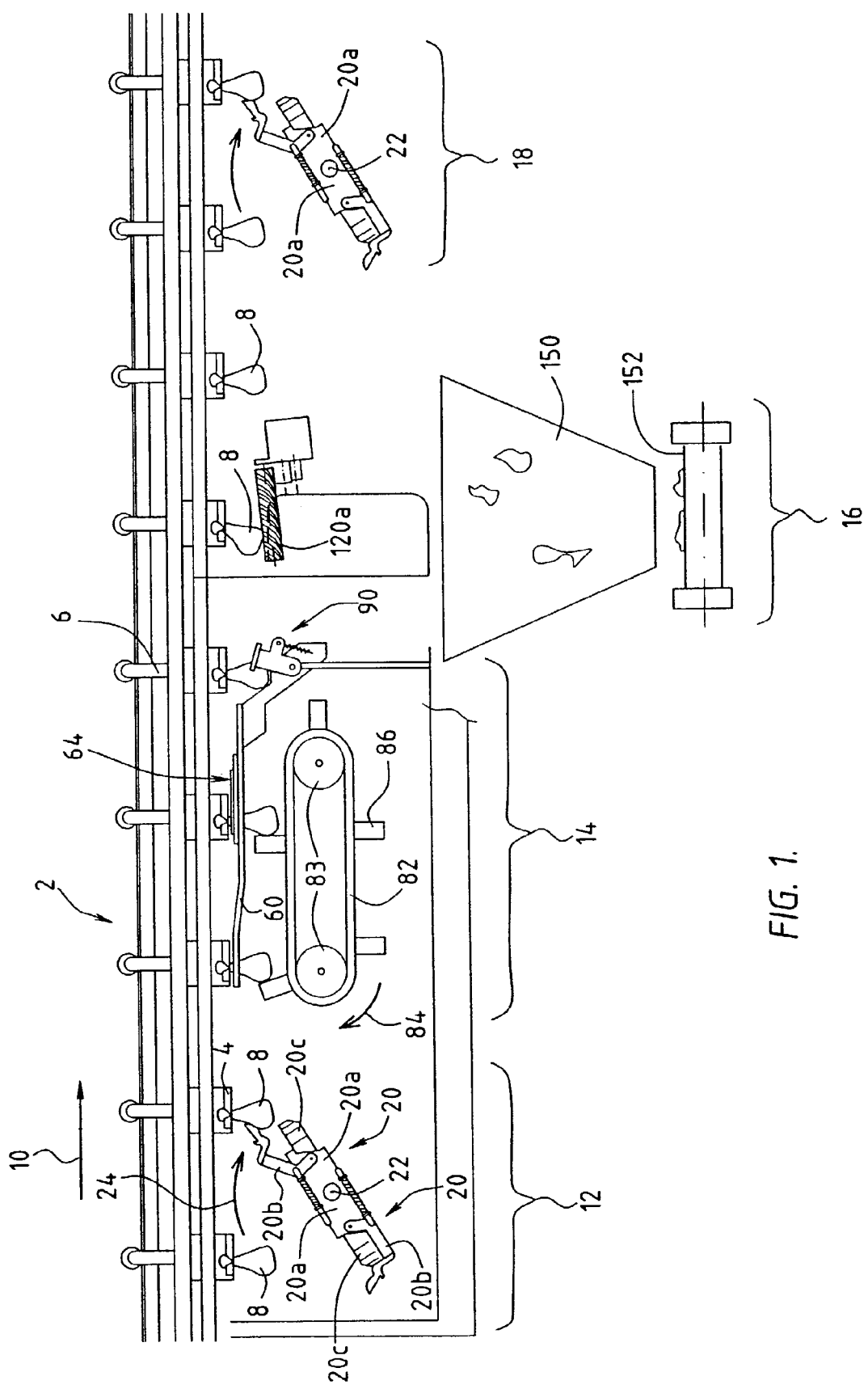
FIG. 1 shows a diagrammatic side view of a first section of a device according to the invention.

FIG. 1 shows a device for cutting into poultry legs and skinning them. Wherever FIG. 1 and subsequent figures show only drumsticks, it is also possible to process entire legs, comprising both a drumstick and a thigh. The device is adapted to process pairs of legs hanging next to one another; only one leg of each pair can be seen in FIG. 1.

The device, of which, for the sake of clarity, only a few frame parts are shown while other frame parts which are intended to support components have been omitted, comprise various sections for carrying out various operations, which sections are arranged one behind the other in a dividing line. The illustrated order of the sections, and therefore of the operations carried out therein, is not essential. It is also possible for one or more of the sections to be absent or to be considered independent of the others. The sections, which will be discussed in more detail below, are arranged along a conveyor path along which, with the aid of a conveyor 2 with trolleys 6, which are connected to one another and are provided with carriers 4 with drumsticks 8 hanging from them by their tarsal joints, are conveyed in the direction of arrow 10.

In a first section, which is denoted by reference numeral 12, a longitudinal incision is made through the skin of the drumstick 8. In a second section, which is denoted by reference numeral 14, in succession the drumstick skin is stretched, two transverse incisions are made in the vicinity of the tarsal joint and a skin correction is carried out on the drumstick 8. In a third section, which is denoted by reference numeral 16, the skin is removed from the drumstick 8 and taken away. In a fourth section, which is denoted by reference numeral 18, a longitudinal incision is made through the skin of the drumstick 8.

FIGS. 1, 2a and 2b show the first section 12. For each poultry leg, the section 12 comprises two arms 20 which form a unit and extend in opposite directions from a pin 22, about which the arms 20 can rotate in the direction of the arrow 24. Each arm 20 comprises a section 20a and a section 20b, which sections can pivot with respect to one another about a pin 26. A stop 20c is fixedly connected to the section 20a. A compression spring 30, which is arranged on a rod 28 which is connected pivotably and displaceably to the section 20a and pivotably to the section 20b, supplies a biasing force which pushes the section 20b against the stop 20c. That end of the section 20*b* which is facing away from the pin 26 bears a blade holder 32 with a blade, the sharp edge of which is denoted by the reference numeral 34. The blade holder 32 extends behind the sharp edge 34 transversely with respect to the surface of the blade, over a sufficient distance to limit the depth of incision formed by the blade to at most the thickness of skin situated around the drumstick.

As shown in particular by FIGS. 2*a* and 2*b*, guides 36 are arranged beneath the carrier 4 on either side of the conveyor path of each drumstick 8, which guides at one end are each mounted pivotably about a pin 38 and, at a distance from the said end, are driven towards the opposite guide 36 with the aid of a compression spring structure 40 which supplies a biasing force. The compression spring structure 40 comprises a pin 42 which is fixedly connected to the guide 36 and fits through a wide hole in a support 44. A compression spring 46 is situated on the pin 42 between the guide 36 and the support 44. On that side of the support 44 which is facing away from the guide 36, the pin 42 is provided with a thickened section 48 which determines the at-rest position of the guide 36. If two associated guides 36 are both in the at-rest position, the distance between them is smaller than the transverse dimensions of that section of the drumstick 8 which is intended to pass between the guides 36.

The movement of the conveyor 2 is synchronized with the rotation of the arms 20. When a drumstick 8 is moved into the working area of the section 12, the drumstick 8 moves in between the guides 36, as shown in FIG. 2*a*, the guides 36 exerting a clamping force on the drumstick 8. If one of the arms 20 extends vertically upwards, the stop 20*c* comes into contact with the rear side of the drumstick 8, while the sharp edge 34 of the blade comes into contact with and cuts into the skin of the drumstick 8. As illustrated in FIG. 2*b*, as the arm 20 rotates further the stop 20*c* comes off the drumstick 8, while the sharp edge 34 of the blade makes a longitudinal incision in the skin of the drumstick. The longitudinal incision can be made due to the fact that the drumstick 8 is clamped securely between the guides 36 and consequently cannot pivot away. The section 20*b* comes off the stop 20*c*, the spring force in the compression spring 30 determining the cutting force exerted by the blade. The result of the longitudinal incision operation, a skin incision SO, is shown in FIG. 3 for a separate drumstick 8.

Figures 4, 5:
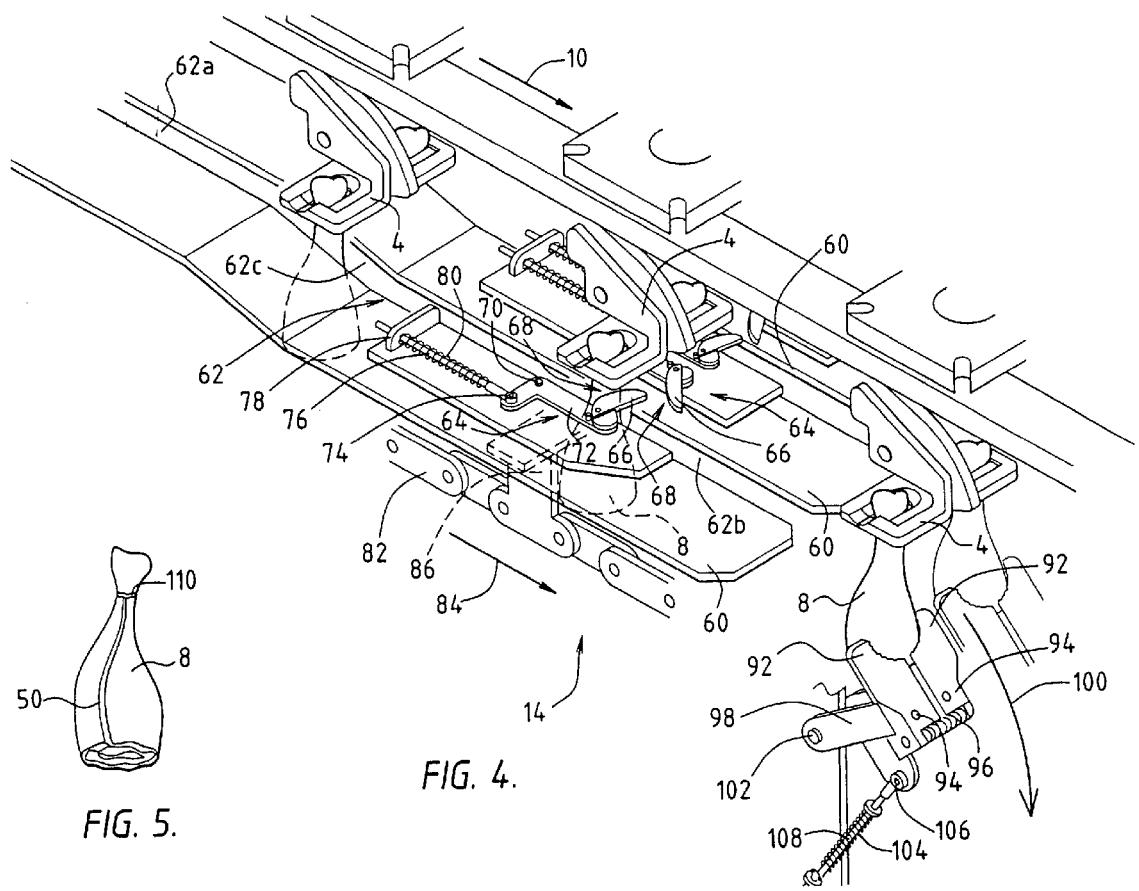
FIG. 4 shows perspective details of the device shown in FIG. 1.
FIG. 5 shows a perspective view of the result of an incision made in a drumstick in the manner illustrated with reference to FIG. 4.

FIGS. 1 and 4 show the second section 14. The section 14 comprises, for each drumstick 8 or poultry leg which is to be processed, a slot 62 which is formed by plates 60 and the width of which in an area 62*a* is greater than the transverse dimensions of the drumstick 8 at the same level, while the (constant) width of the slot 62 in an area 62*b* is smaller than the transverse dimensions of the drumstick 8 at the level of the slot 62. Consequently, the edges of the slot 62 grip the skin of the drumstick 8 in a transition area 62*c* and pull this skin downwards. The skin is then subject to longitudinal stress in the area 62*b*.

On either side of the slot 62, cutting means 64 are arranged in its area 62*b*. The cutting means 64 comprise two blade holders 66 which are each provided with a blade, the sharp edge of which is denoted by the reference numeral 68. Each blade holder 66 extends behind the sharp edge 68, transversely with respect to the plane of the blade, over a sufficient distance to limit the incision depth of the blade to at most the thickness of skin located around the drumstick in the vicinity of its tarsal joint.

Each blade holder 66 is attached to one end of a bent arm 72 which can pivot about a substantially vertically oriented pin 70. In the vicinity of another end of the arm 72, the arm 72 is connected, in such a manner that it can pivot about a pin 74, to a pin 76, of which the end which is facing away from the pin 74 fits through a hole in a stop 78. A compression spring 80 is arranged on the pin 76 between the arm 72 and the stop 78, ensuring that the sharp edge 68 of the blade is driven above the slot 62 under a biasing force. Above each slot 62 there are two blades which, as seen in the conveying direction 10 of the drumstick 8, are situated at the same height and one behind the other.

Beneath the area 62*b* of the slot 62 there is an endless chain 82 which runs around wheels 83 and is driven, in a manner not shown in more detail, in the direction of arrow 84. Plates 86 are mounted on links of the chain 82. The speed of movement of the chain 82 is selected in such a manner that the plates 86 move synchronously with the carriers 4 of the drumsticks 8.

If the drumsticks 8, with the skin stretched beneath the tarsal joint, pass through the area 62*b* of the slot 62, they are moved onwards by both the carriers 4 and the plates 86. In the area 62*b*, the drumstick 8 butts against the edges 68 of the abovementioned blades, which each make an incision, in opposite directions, over approximately half the circumference of the drumstick when the blades are pushed sideways by the drumstick 8 as it moves past and are forced to follow the circumference of the drumstick 8 by the compression springs 80. Together, the two incisions approximately form a complete incision around the drumstick 8.

After the end of the slot 62, a skin correction device 90 is arranged in the conveyor path of the drumstick 8, comprising a set of brushing elements 92 which can pivot apart about pins 94, counter to a biasing force generated by a compression spring 96. The brushing elements 92 are in turn arranged on one end of a double arm 98 which can pivot in the direction of arrow 100 about a pin 102, counter to a biasing force generated by a compression spring 104. The compression spring 104 is arranged on a pin 108 which is connected to the arm 98 in such a manner that it can pivot about a pin 106.

While it is being conveyed, the drumstick 8 butts against the brushing elements 92 and moves in between them, as illustrated by FIG. 4. Due to the fact that the brushing elements 92 can move apart slightly, drumsticks 8 of different transverse dimensions can be processed effectively. The ongoing conveying of the drumstick 8 causes the arm 98 to pivot in the direction of the arrow 100, the skin of the drumstick 8 moving along the brushing elements 92. In the process, the skin is pulled smoothly over the drumstick 8, so that the skin as far as possible covers the front side of the drumstick 8.

The result of the operations carried out in the second section 14, namely a skin incision 110 in addition to the skin incision 50 made in the first section 12, and a skin correction, is shown in FIG. 5 for a separate drumstick 8.

FIGS. 1, 6, 7 and 8 show the third section 16. For each drumstick 8, the third section 16 comprises a pair of skinning rollers 120*a*, 120*b* which are driven, in a manner not shown in more detail, in directions indicated by arrows 122*a* and 122*b*, respectively. Toothing is formed on the skinning rollers 120*a*, 120*b* in such a manner that skin of drumsticks 8 conveyed over the skinning rollers 120*a*, 120*b* is pulled between the skinning rollers 120*a*, 120*b* and is discharged beneath them. The skinning rollers 120*a*, 120*b* are arranged at a height which is such that the drumsticks 8 strike the ends of the skinning rollers 120*a*, 120*b* and are then pulled onto the skinning rollers 120*a*, 120*b* by the carriers 4, during which process the drumsticks 8 tilt. In the process, the ends of the toothing at the ends of the skinning rollers 120*a*, 120*b* have the opportunity to grip the skin which comes into contact therewith and to crease up the skin in that area. The creased-up skin section, once the drumsticks 8 are on the skinning rollers 120a, 120b, offers an excellent point of engagement for the toothing of the skinning rollers 120a, 120b, resulting in a high level of reliability of skin removal. This reliability is enhanced still further by the fact that the skinning rollers 120a, 120b are provided over a part 124 of their length with toothing of a smaller diameter than that of the toothing arranged over the remainder of the length. A drumstick 8 which passes the part 124 therefore moves a short distance downwards in that area, with the result that skin which has not previously been gripped by the toothing can still be gripped securely between the skinning rollers 120a, 120b.

As an alternative to the part 124 of reduced diameter, the skinning rollers 120a, 120b may each be provided, in their upstream section, with a helical groove 125, as illustrated in FIG. 6a. The pitch of the groove is directly oppositely to that of the toothing of the skinning roller 120a, 120b, so that the toothing is cut through by the groove 125. At these locations, more or less sharp edges are formed, providing additional points of engagement for the skinning rollers 120a, 120b on skin moving past.

FIG. 7 shows a carrier 4 which, as is known from the prior art, in principle can pivot through a small angle about a pin 130. Without special measures, a carrier 4 of this nature would cause the drumstick 8 to "dance" on the skinning rollers 120a, 120b, which would lead to poor results of the skinning operation. However, FIG. 7 shows how, in the case of the pivoting carrier 4, the drumstick 8 can be pressed onto the skinning rollers 120a, 120b with a certain force, so that this "dancing" no longer occurs. For this purpose, an upwardly directed guide surface of the carrier 4, in the area of the skinning rollers 120a, 120b, slides along a rod 134 which can pivot about a pin 132. The rod 134 is pressed downwards by the free end of a lever 138 which can pivot about a pin 136 and is connected thereto at one end. The other end of the pin 136 is connected to a lever 140, along which a weight 142 can be displaced in order to adjust the force to be exerted by the lever on the rod 134 and thus adjust the force with which the drumsticks 8 are pressed onto the skinning rollers 120a, 120b. An adjustable stop 144 ensures that with small angular rotations of the carrier 4 by the lever 138 no force is exerted on the rod 134.

Figure 8:
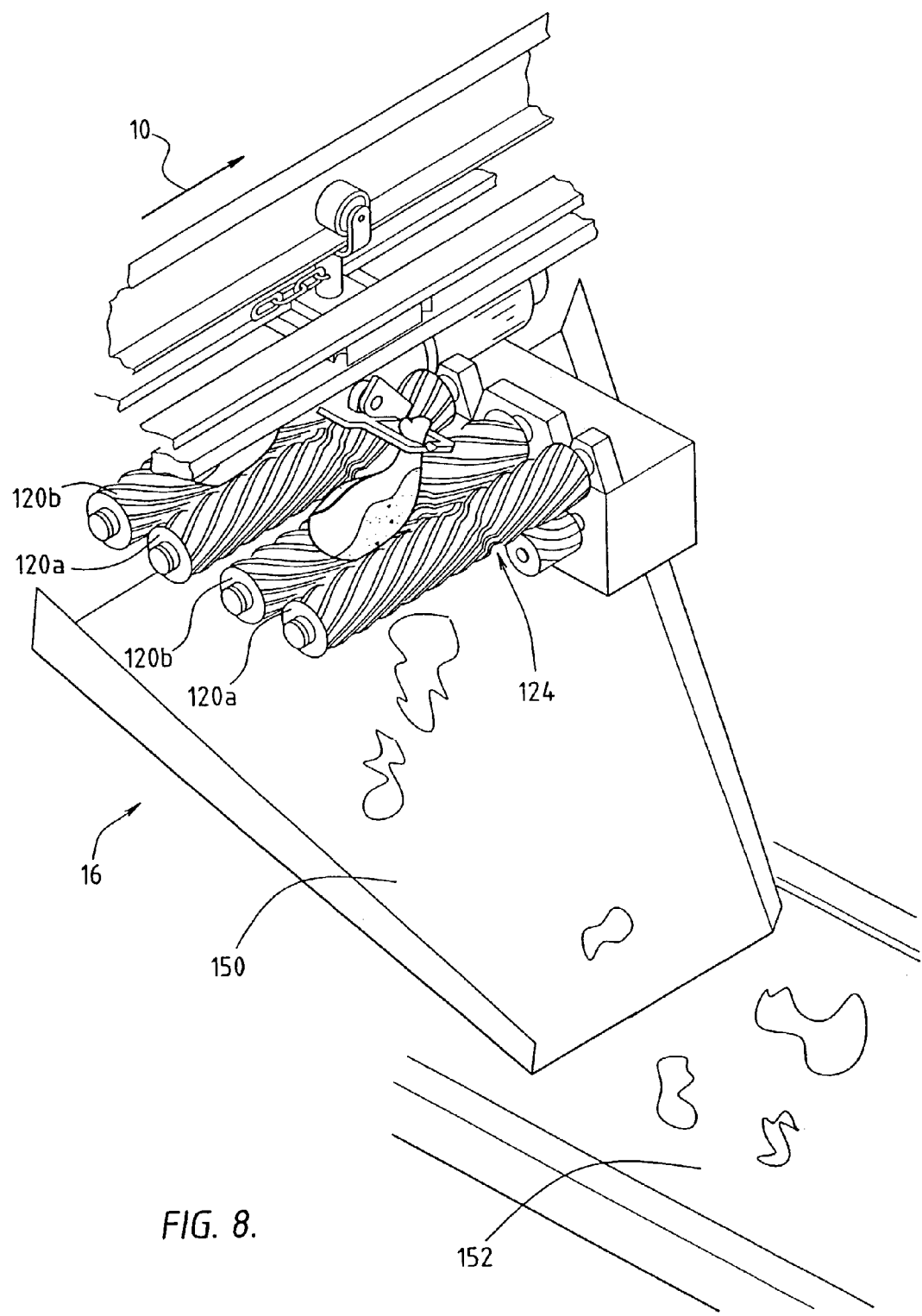
FIG. 8 shows a perspective view of an outlet from the device section shown in FIG. 6.

As shown by FIG. 8, skins which have been removed by the skinning rollers 120a, 120b, but also broken legs which have come off the carrier 4 and have been pulled through between the skinning rollers 120a, 120b, are discharged via a slideway 150 to a belt conveyor 152. This will be returned to later on in this description.

FIGS. 1, 9a and 9b show the fourth section 18. The fourth section 18 substantially corresponds almost entirely to the first section 12, with the exception of the shape of the blade holder, so that the depth of the incision made by the corresponding blade is different. In section 12, the cutting depth was limited by the shape of the blade holder 32. By only allowing the blade holder 160 of the fourth section 18 to project slightly transversely with respect to the plane of the blade mounted therein, the blade cuts deep into the drumstick 8, for example all the way to the drumstick bone. The result of this longitudinal cutting operation—a meat incision 162—is shown in FIG. 10 for a separate drumstick 8.

FIGS. 10a and 10b show an alternative embodiment for the sections 12 and 18 for use with complete legs 8a. The sections 20b of the arms 20 are each supported in the transverse direction on either side by curved guides 21, in the vicinity of the blade holders 160. Freely rotatable guide rollers 23 are arranged on the sections 20b. Stationary roller guides 25 are arranged in the path of the guide rollers 23. As shown in FIG. 10a, the sharp edge 34 of the blade mounted on the section 20b cuts into the skin of the leg 8a (if FIG. 10a shows a section 12) or into the leg all the way to the drumstick bone (if FIG. 10a shows a section 18). As shown in FIG. 10b, the sharp edge 34 of the blade, in the vicinity of the knee joint/the back of the knee of the leg 8a, is pushed away from the leg 8a in the direction of arrow 25a due to the fact that the guide roller 23 which is connected to the section 20b comes into contact with the roller guide 25 and is guided along a curved edge thereof. As shown in FIG. 10c, the result is that a skin incision or a deeper incision 162a in the leg 8a extends only over the length of the drumstick of the leg 8a, while the thigh of the leg 8a remains substantially intact.

Figure 11:
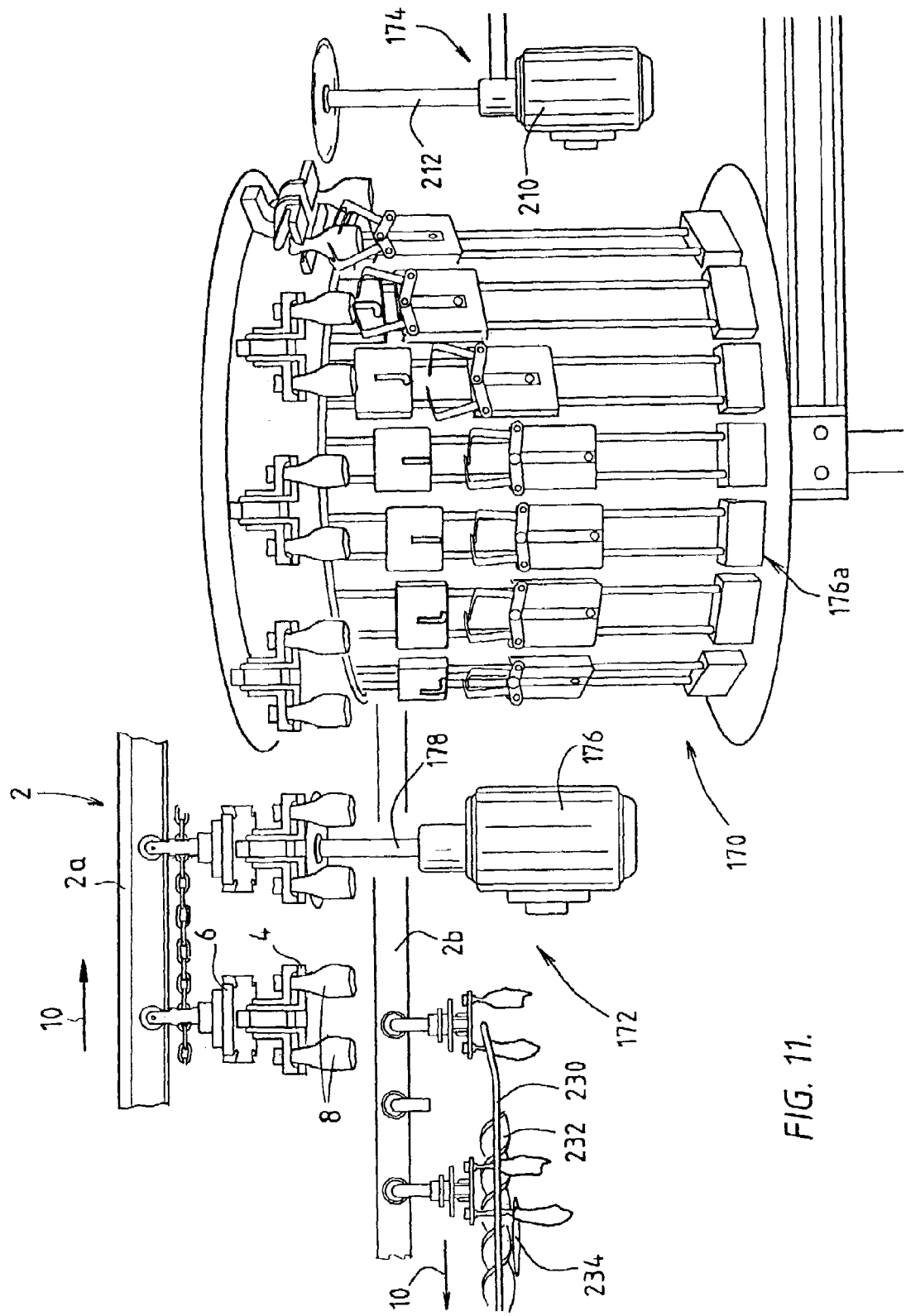
FIG. 11 diagrammatically depicts a perspective view of a second section of the device according to the invention.

FIG. 11 shows a section of the conveyor 2, a part 2a of which supplies drumsticks 8, hanging in carriers 4 of trolleys 6, to a boning device 170, and another part 2b of which removes the drumsticks 8, which have been virtually completely boned, from the boning device 170. The carriers 4 can rotate in a controllable manner, through predetermined angles, about a substantially vertical pin, in particular through angles of ±90° or a multiple thereof, so that a predetermined side of the drumsticks 8 can be directed towards a processing device arranged along the conveyor path of the drumsticks 8.

The boning device 170, non-essential parts of which have been omitted for the sake of clarity, comprises cutting devices 172 and 174, and also a number of scraper stations 176a which are in a carousel arrangement and can be moved synchronously with the carriers 4 of the conveyor 2 in a controllable manner.

The part 2a of the conveyor 2 adjoins section 18 of the device discussed with reference to FIGS. 1–10c.

Incidentally, it should be noted here that it is not essential, for the operations carried out in the boning device, for skinning and incision operations of the type illustrated with reference to FIGS. 1–10c to have taken place beforehand; the boning device 170 can also process drumsticks 8 which have not undergone any skinning and incision operations or which have only undergone a skinning operation.

The part 2a of the conveyor 2 comprises a turning station, which is not shown here in more detail and is known per se, for turning the carrier 4a through 90° at the location of carrier 4a, with the result that the drumsticks 8 hanging from the carrier 4a, as seen in the conveying direction 10, are moved from a position next to one another to a position one behind the other. Then, the drumsticks 8 positioned one behind the other are subjected to operations in the boning device 170, beginning with an incision operation carried out by the cutting device 172, as will be discussed in more detail below with reference to FIGS. 12 and 13.

Figure 12:
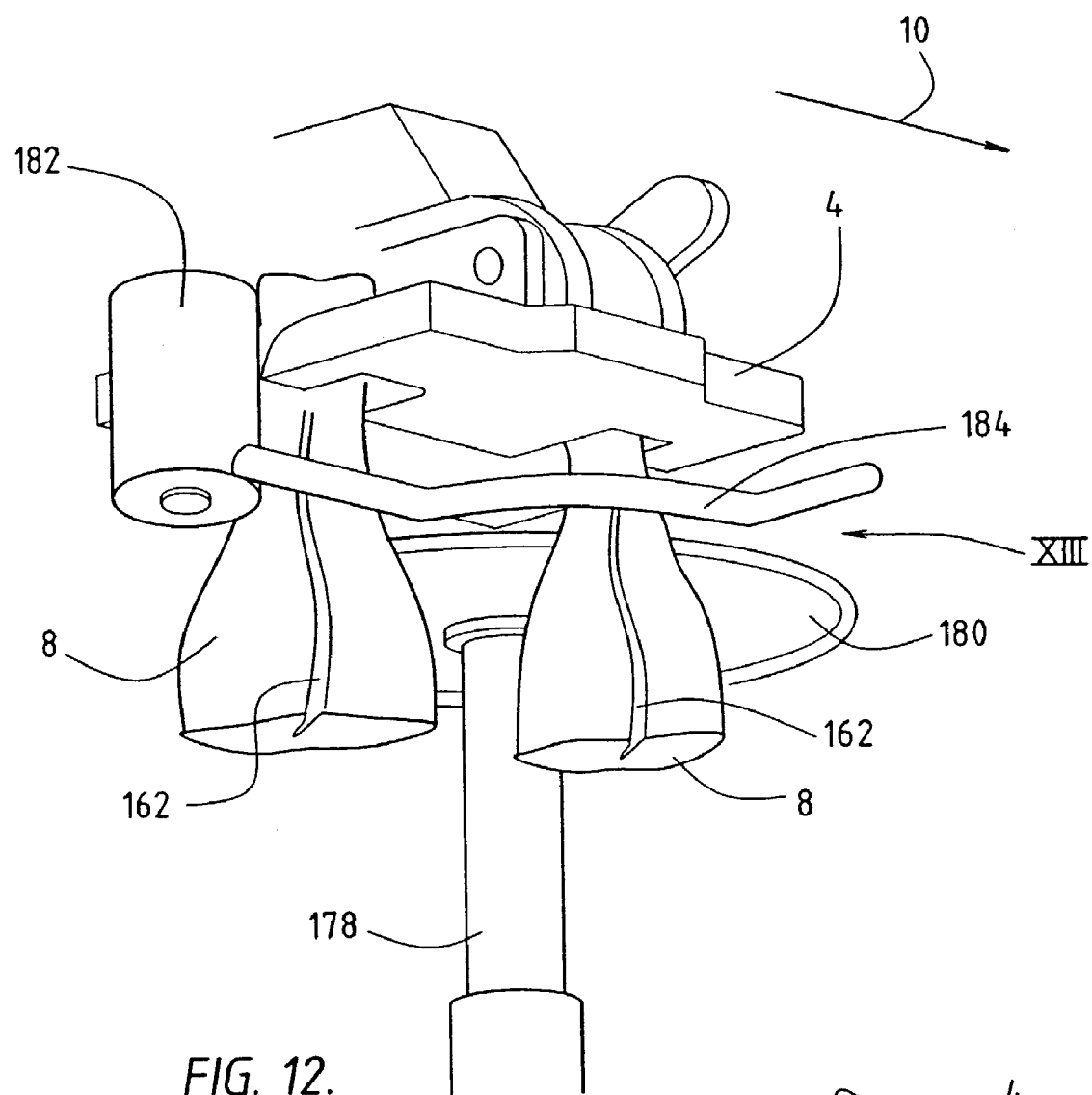
FIG. 12 shows an enlarged perspective view of a detail of the device shown in FIG. 1.

FIG. 12 shows two drumsticks which are hanging from the carrier 4 by their tarsal joints, and in the sections 12, 14, 16 and 18 discussed previously have undergone skinning and incision operations.

Figure 13:
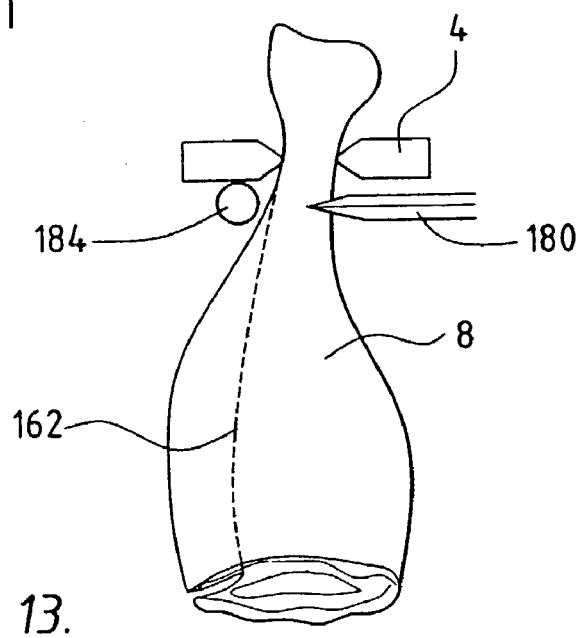
FIG. 13 shows a side view of a section of the construction shown in FIG. 12 in the direction of arrow XIII.

A blade 180, which is driven in rotation by a motor 176 (FIG. 11) via a pin 178, is arranged in the conveyor path of the drumsticks 8, an arm 184 which can pivot about a pin 182 bringing the drumsticks 8 into contact, under a predetermined preload, with the cutting edge of the rotating blade 180 which is moving in the direction of the arrow 10. Thus, the blade 180, on that side of the drumstick 8 which is facing away from the longitudinal incision 162, makes a transverse incision in the vicinity of the tarsal joint, as illustrated by FIG. 13. As a result of the friction between the drumstick 8 and the arm 184 and the friction between the drumstick 8 and the blade 180, the drumstick 8 will rotate through an angle about its longitudinal axis.

Figure 14:
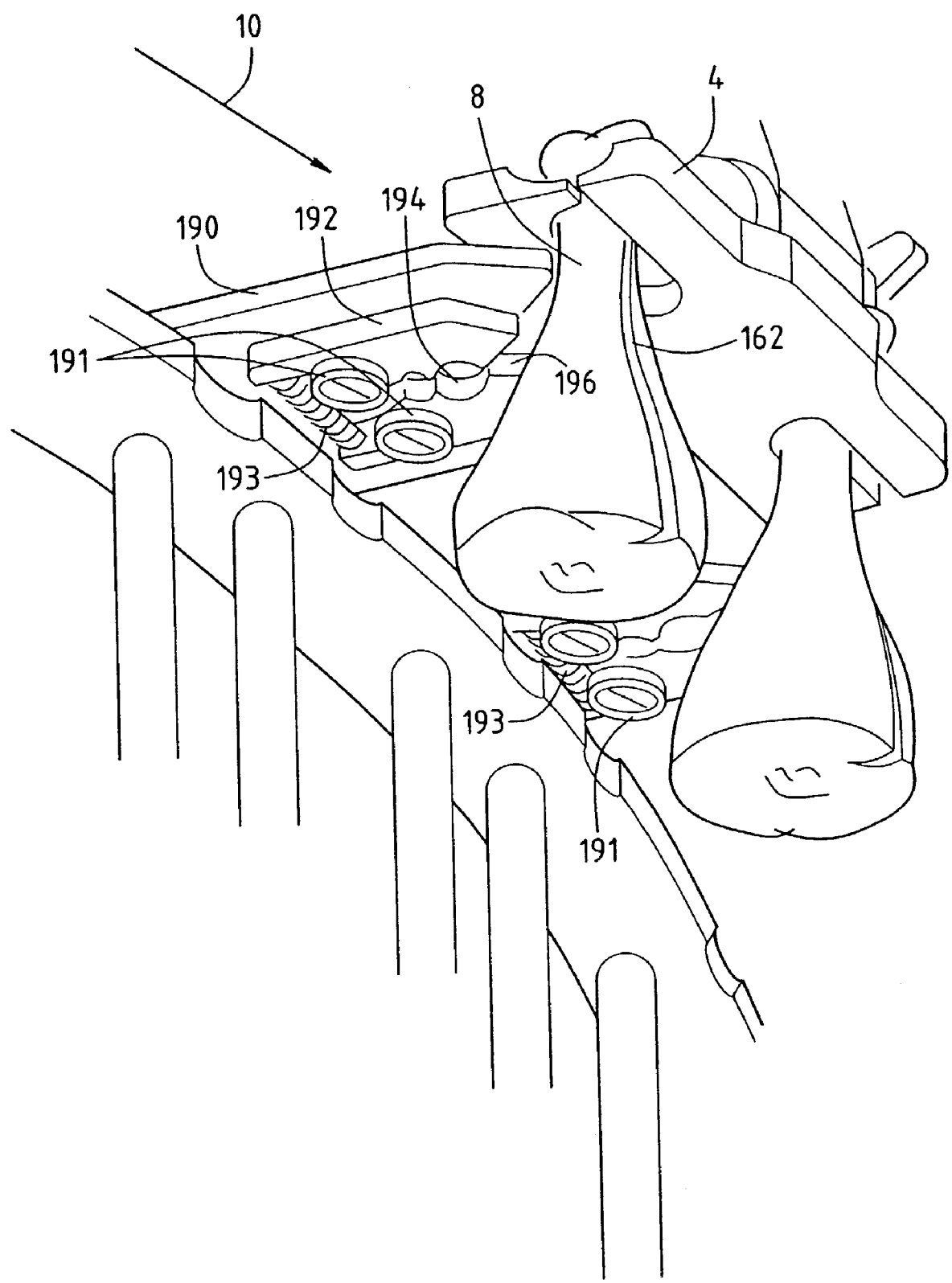
FIG. 14 shows an enlarged perspective view of a detail of the device shown in FIG. 11.

As shown in FIG. 14, the drumsticks 8 are then guided between plates 190 which are also moving in the conveying direction 10 and are provided with a recess. Beneath each plate 190 there are two interacting tendon support elements 192 which, in a manner not shown in more detail, can be moved towards and away from one another with the aid of rollers 191 moved by stops and a biasing spring 193. Each tendon support element contains a recess 194. When the tendon support elements 192 are placed against one another, the opposite recesses 194 form an opening, while adjoining edges 196 of the tendon support elements 192 then form a substantially V-shaped recess.

Figure 15:
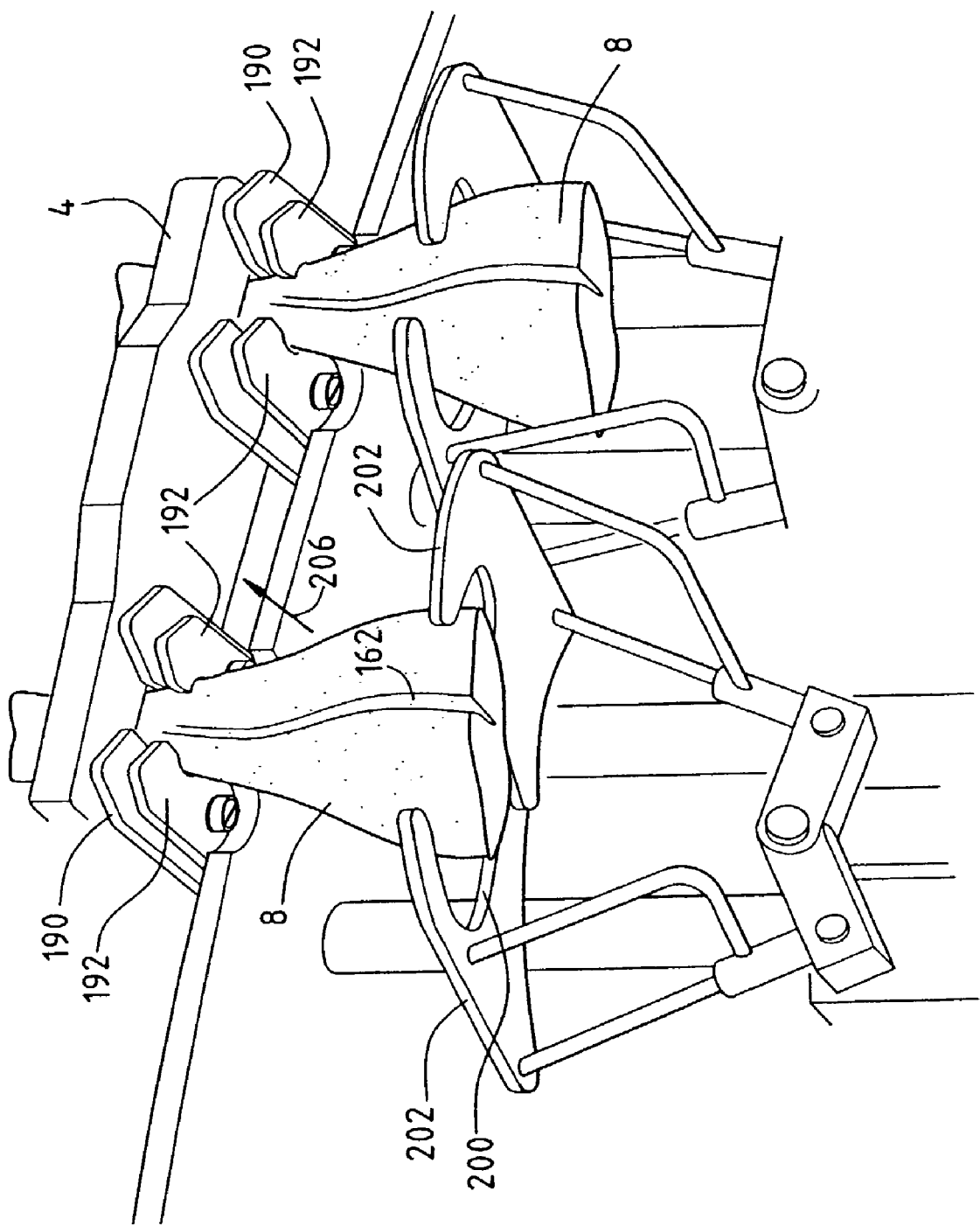
FIG. 15 shows a perspective view of the construction shown in FIG. 14 in a subsequent processing stage.
Figure 15A:
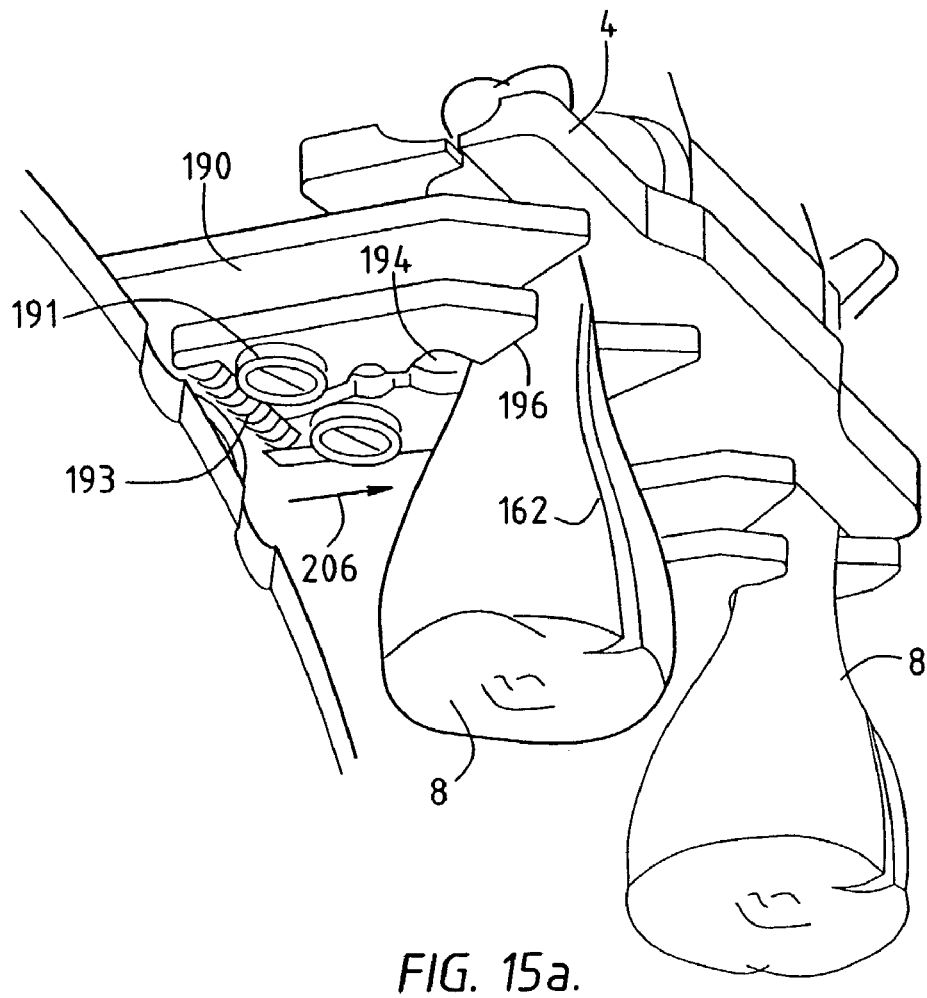
FIGS. 15a and 15b respectively show a perspective view and a view from below of details of the operation shown in FIG. 15.
Figure 15B:
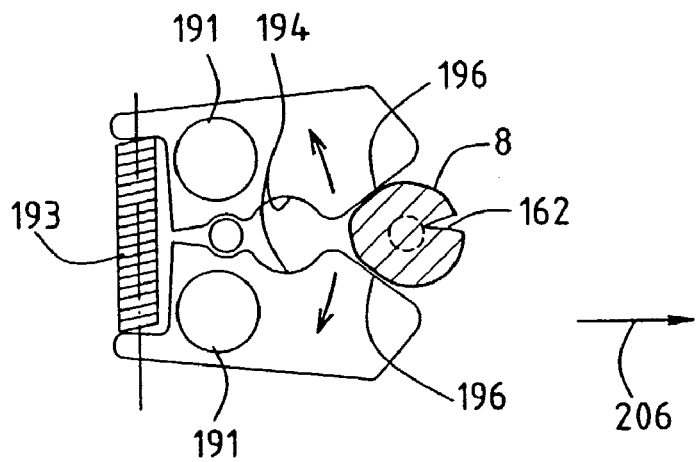

As illustrated by FIGS. 15, 15a and 15b, the tendon support elements 192 are displaced in the direction of arrow 206, during which movement they can be moved apart counter to the biasing force of the spring 193. During such displacement of the tendon support elements 192, tendons which are situated around the drumstick bone in the vicinity of the tarsal joint are moved to one side of the drumstick 8 by the rear sections of the edges 196, specifically to that side where the longitudinal incision 162 is located. The tendon support elements 192 then close around the drumsticks 8 in the vicinity of their tarsal joints, the drumstick bone moving into the opening defined by the recesses 194. More or less at the same time, scraper elements, comprising scraper plates 202 provided with recesses 200, are moved upwards in a controlled manner into an open position, i.e. a position in which they are at a distance from one another, during which process the drumstick 8 moves into the recesses 200.

Figure 16:
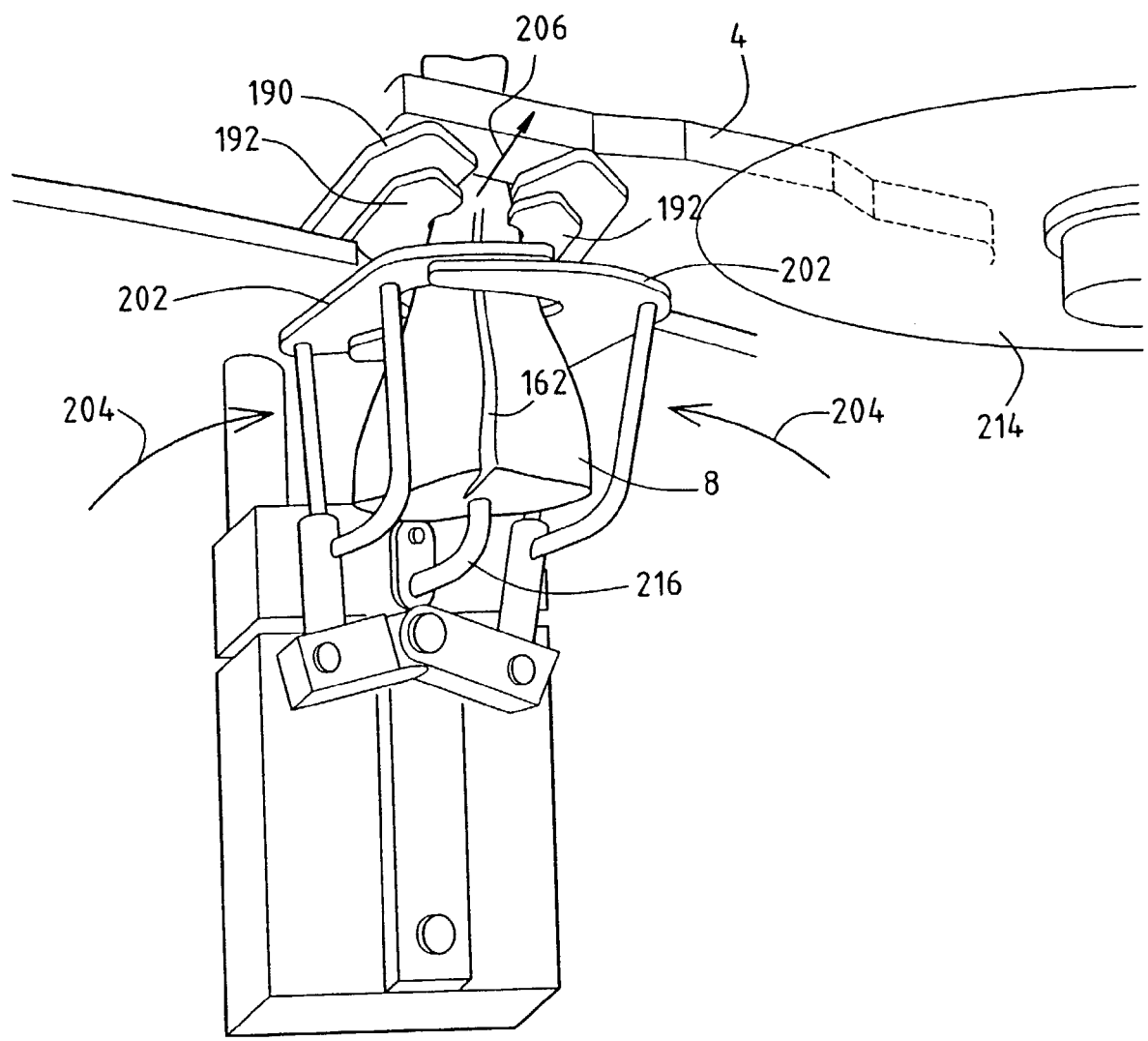
FIG. 16 shows a perspective view of the construction shown in FIGS. 14 and 15 in a subsequent processing stage.

As illustrated by FIG. 16, the scraper plates 202 are then moved towards one another in the direction of arrows 204, with the result that the drumstick 8 is fixed in place, in addition to being suspended in the carrier 4.

Then, as illustrated in FIGS. 16, 17a, 17b and 18, the side of the drumstick 8 on which the tendons are located is guided past the cutting edge of a blade 214 which is driven in rotation by a motor 210 (FIG. 11) via a pin 212, during which process the tendons are severed. In this stage of the processing, a support element 216 is also placed beneath the knee joint of the drumstick 8.

Figure 19:
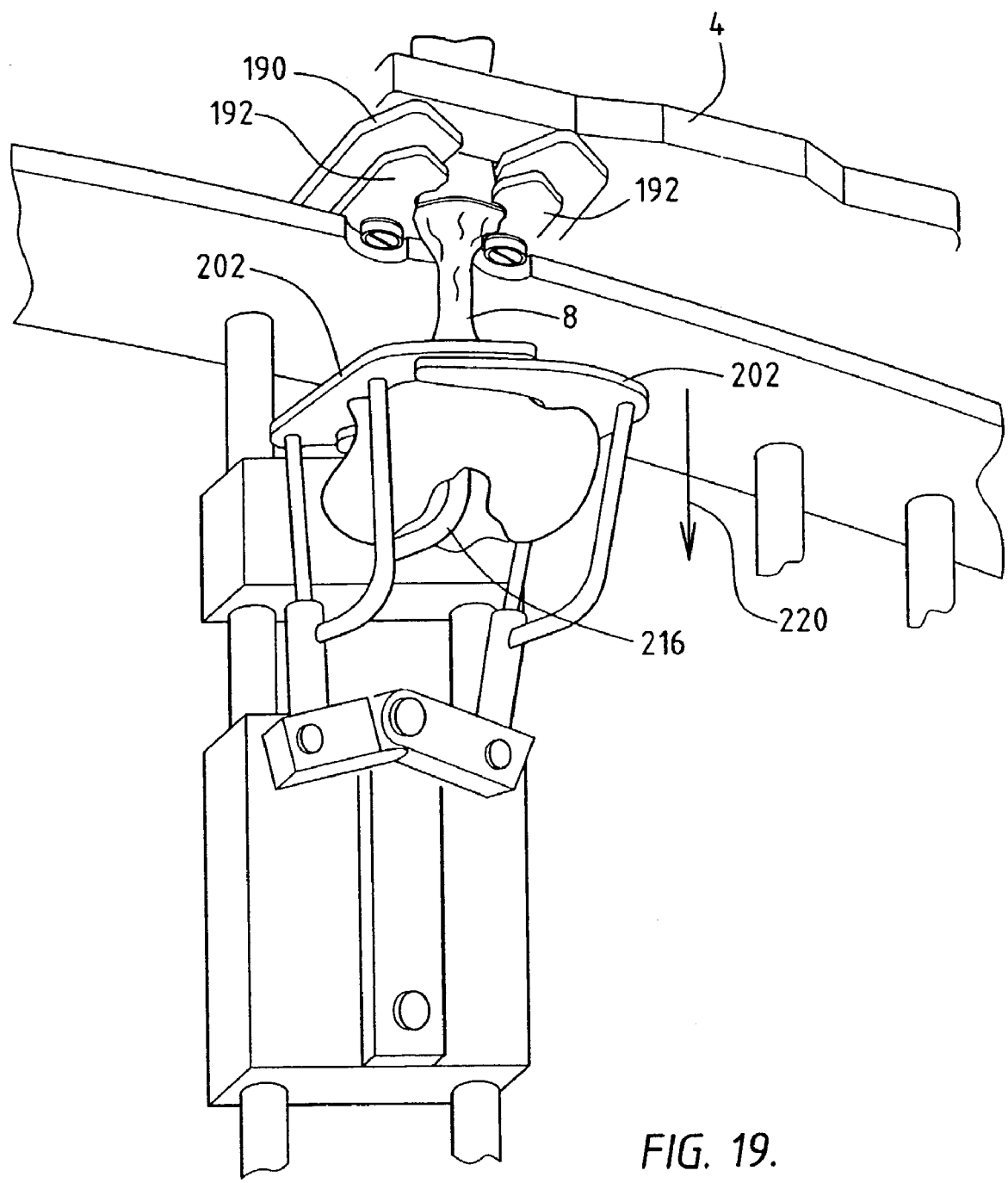
FIG. 19 shows a perspective view of the construction shown in FIGS. 17 and 18 in a subsequent processing stage.

As illustrated in FIG. 19, after the tendons of the drumstick 8 have been severed in the vicinity of its tarsal joint, the scraper plates 202, under a preload, for example generated by a spring, are moved as far over one another as possible to make the scraper opening defined by the recesses 200 as small as possible. Then, the scraper plates are moved in the direction of arrow 220, during which movement of the meat is scraped off the drumstick bone. Preferably, the scraper plates 202, after part of the scraping path has been covered, are moved apart, moved upwards again, moved towards one another again and are moved in the direction of the arrow 220 once again, so that a section of the scraping path is passed through twice, providing a higher meat yield.

The support element 216 supports the knee joint of the drumstick bone while the meat is being scraped off, in particular when the scraper plates 202 move past the knee joint of the drumstick bone, since this is when the highest scraping forces are generated. The support element 216 ensures that during scraping substantially longitudinal compressive forces are generated in the drumstick bone, forces which are easy to absorb. The position of the support element 216 may also be selected in such a manner that the tarsal joint comes free of its suspension from the carrier 4, thus effectively preventing longitudinal tensile forces from being generated in the drumstick bone during the scraping. After the knee joint has been passed, the scraper plates 202 are moved as far as possible over one another until only a small scraping opening defined by the recesses 200 remains. The scraper plates 202 are blocked in this position while they are moved further downwards in the direction of the arrow 220. The forces generated on the tendons and the meat around the knee joint which are generated by the small scraping opening ensure that the connective meat and connective tendons tear off effectively and more successfully than was usual in the prior art.

Returning to FIG. 11, the meat is separated from the drumstick bone along the part 2b of the conveyor by moving the drumstick bone between a guide 230 and a rotating worm wheel 232, and then cutting the meat off the drumstick bone below the knee joint with the aid of a stationary, moving and/or rotating blade which is only diagrammatically depicted.

Figure 20:
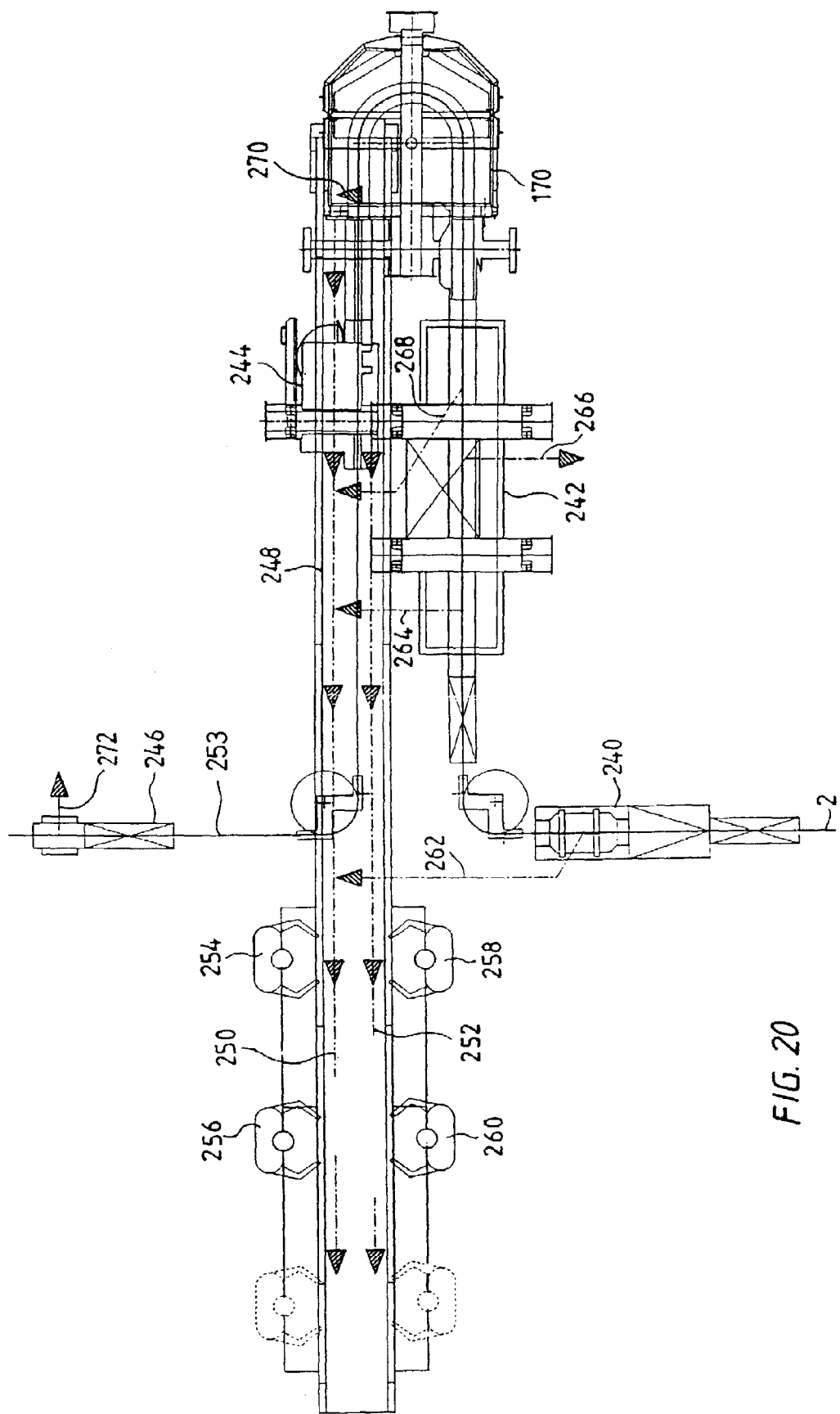
FIG. 20 diagrammatically depicts a plan view of the devices shown in FIG. 1 and FIG. 11, incorporated in a dividing line.

FIG. 20 shows a section of a dividing line with a conveyor 2, in which dividing line there are an unloading station 240, a skinning and cutting station 242 comprising the sections 12, 14, 16 and 18, the boning device 170, a meat-collecting station 244 and an unloading station 246. From the boning device 170, a belt conveyor 248 extends past the meat collecting station 244, on which conveyor two product streams 250, 252, which are indicated by dot-dashed lines, are conveyed, in the direction of the hatched arrows, past operators 254, 256, 258, 260. A third product stream is discharged to the unloading station 246 along the section 253 of the dividing line.

In the prior art, it is customary to remove deviant products, such as products containing broken bones, which are formed during the processing of a starting product, from a dividing line at various locations, to collect them and then to process them in batches. The object of this processing is to obtain as many of the desired products as possible from the deviant products by carrying out manual operations.

In the arrangement shown in FIG. 20, a new approach is used, in which deviant products are not removed and discharged from the stream of normal products, but rather the streams of normal products and deviant products are kept together as far as possible. As a practical embodiment of this concept, the belt conveyor 248 in FIG. 20 conveys a stream 250 of deviant products (in this case drumstick meat with bone parts) and a stream 252 of normal products (in this case drumstick meat). The section 253 of the dividing line conveys drumstick bones. The operators 254-260 monitor the stream 252 of normal products and process the deviant products in the stream 250, so that the latter, following their in-line processing to form normal products, can be incorporated into the stream 252. The streams 250 and 252 therefore remain separate until deviant products have been processed to form normal products. The operator 254 checks whether drumstick bones with drumstick meat are still present in the section 253 of the dividing line. If so, the drumstick bones with drumstick meat are removed and guided into the stream 250.

There is no longer a batch processing of deviant products, but rather a continuous and flexible processing thereof, which considerably simplifies logistics.

In FIG. 20, the dot-dashed line 26 symbolizes the transfer of drumsticks with a broken drumstick bone, which have been unloaded in the unloading station 240, to the stream 250 of deviant products. A similar transfer of similar products is symbolized by the dot-dashed line 264. The dot-dashed line 266 symbolizes the discharge of skin from the section 16. The dot-dashed line 268 symbolizes the transfer of skinned drumsticks with a broken drumstick bone to the stream 250, for example with the aid of the belt conveyor 152 shown in FIG. 8. The hatched arrow 270 symbolizes the discharge of partially scraped products with a broken drumstick bone to the stream 250. The dot-dashed line 272 symbolizes the discharge of drumstick bones from the dividing line.

The arrangement shown in FIG. 20 relates to the processing of drumsticks. The principle explained with reference to FIG. 20 of as far as possible bringing and keeping together a stream of normal products and a stream of deviant products may, however, be applied to numerous processes which take place in a meat-processing factory, such as the processing of carcasses, innards, front halves, rear halves, entire legs and the like.

Figure 21:
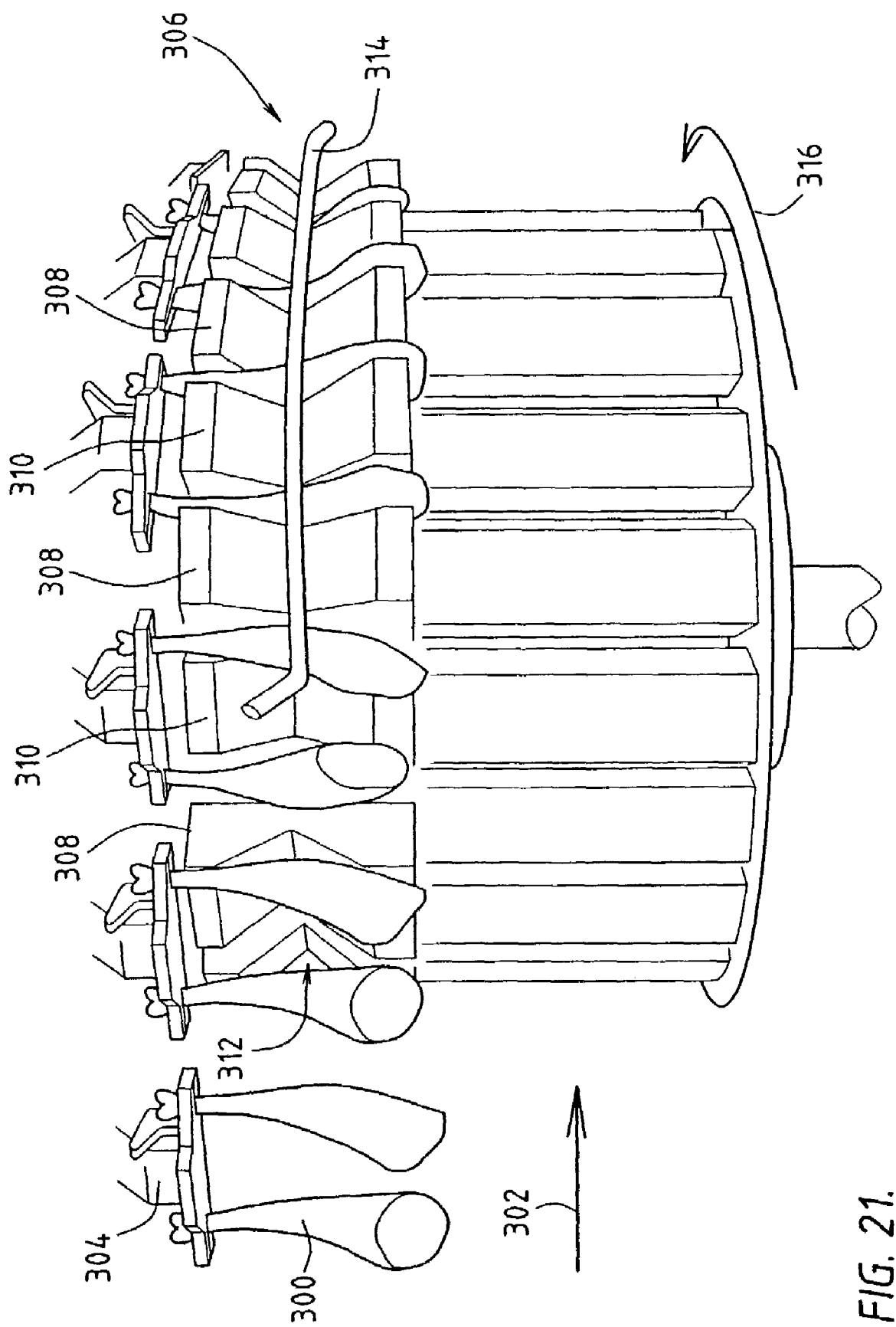
FIG. 21 shows a perspective view of an entry section of a boning device for poultry legs hanging from carriers.
Figure 22:
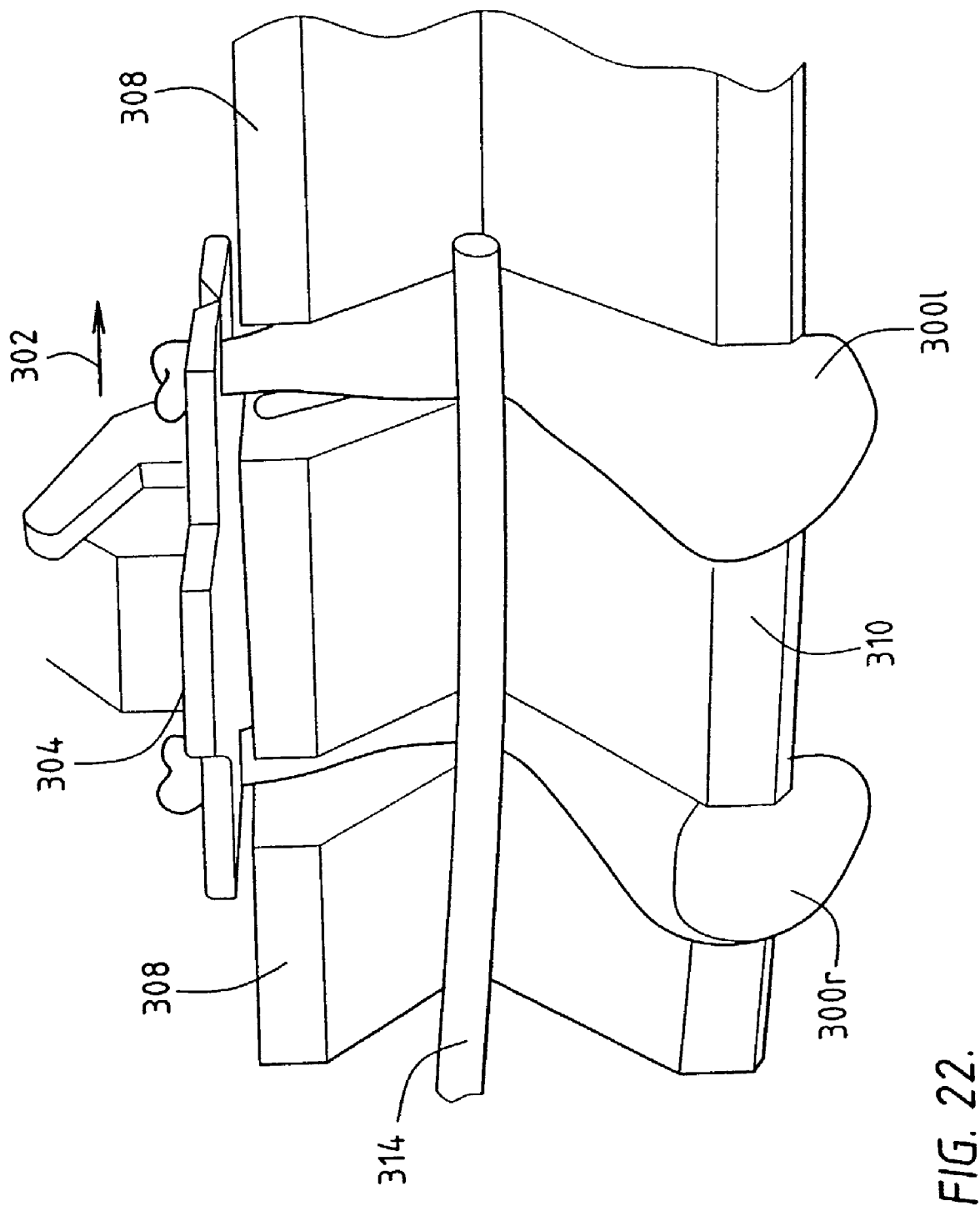
FIG. 22 shows a perspective view of a detail of the device shown in FIG. 21.

FIG. 21 shows poultry legs 300 which are hung from carriers 304 which are moving onwards in the direction of arrow 302 along a predetermined path with the aid of a conveyor (not shown in more detail). In the path of the poultry legs 300 there is a boning device 306 which comprises a number of support blocks 308 and cutting blocks 310 arranged alternately next to one another. The arrangement of the support blocks 308 and the cutting blocks 310 is along an imaginary circular line, so that the boning device 306 is of the carousel type. However, it is also possible for the support blocks 308 and the cutting blocks 310 to be arranged along a different curved or straight line. Between each support block 308 and the adjoining cutting block 310, a space is available with a width which is at least as great as the width of the widest poultry leg 300 to be processed. The support blocks 308 and the cutting blocks 310 are each provided, on their front side, with a substantially V-shaped recess 312. A guide 314, which is connected to a frame (not shown in more detail), is arranged in the recesses 312. Where the paths of the poultry legs 300 and the support blocks 308 and the cutting blocks 310 cross one another, the support blocks 308 and the cutting blocks 310 are moved synchronously, in the direction of the arrow 316, onto the poultry leg 300 in such a manner that the latter automatically move in between the support blocks 308 and the cutting blocks 310 and, in the process, are enclosed by the guide 314. This situation is shown in more detail and on an enlarged scale in FIG. 22. In this figure, a right poultry leg 300*r* is hanging from one side of the cutting block 310, and a left poultry leg 300*l* is hanging from the other side of the cutting block 310.

As illustrated by FIGS. 23*a*, 23*b* and 23*c*, the cutting block 310 contains, on its side, a slot 318 substantially in the shape of a double V, comprising slot parts 318*a*, 318*b* and 318*c*. Two blades 320*a*, 320*b* which project out of the side of the cutting block 310 and have sharp edges 321*a* and 321*b* can be moved to and fro in the slot part 318*a*, in a controllable manner which is to be explained in more detail with reference to FIG. 25, in the directions of double arrow 327. It is also possible for only one of the blades 320*a*, 320*b* to be moved to and fro, or to use another blade (not shown in more detail) for the intended cut. In addition, the blade 320*a* can be moved in a controllable manner, which is to be explained in more detail with reference to FIG. 25, past the blade 320*b* and in the slot part 318*b*, in the directions of double arrow 326, and the blade 320*b* can be moved in a controllable manner, which is to be explained in more detail with reference to FIG. 25, past the blade 320*a* and in the slot part 318*c*, in the directions of double arrow 328. When they are moved over one another, the blades 320*a*, 320*b* execute a snipping movement which, when the blades 320*a*, 320*b* are then moved part, changes into a cutting movement. The blades 320*a*, 320*b* thus move through cutting surfaces which are defined by the slot parts 318*a*, 318*b* and 318*c* for making incisions from the inner side of a poultry leg 300*l* located against the corresponding side of the cutting block 310. The opposite side of the cutting block 310 is likewise provided with a slot 318 containing movable blades 320*a*, 320*b* for making cuts on the inner side of a poultry leg 300*r*. When the poultry legs 300 are moving in between the cutting block 310 and adjoining support blocks 308, the blades 320*a*, 320*b* are located entirely inside the cutting block 310, and are only moved out of the cutting block 310 and, if appropriate, pivoted about the longitudinal axis thereof in order to make the desired incisions, after the legs have been moved in. Before the abovementioned cuts are made, a cut has usually already been made around the drumstick in the vicinity of the tarsal joint, although it is not necessary.

It should be noted that it is also possible to provide a cutting block with blades 320*a*, 320*b* on only one side. It is also possible for only one blade to be moved in the slot 318, which blade may cut either on one side or two sides.

FIG. 23*a* also shows a knee support 330 which is arranged between a cutting block 310 and an adjacent support block 308. The knee support 330 can tilt about a pin 334 in the directions of double arrow 332 and is intended to support the knee joint of a poultry leg 300 and to position this joint by acting on the kneecap. The function of the knee support 330 will be explained in more detail below.

For the desired positioning of the knee joint, an edge 336 of the knee-support block 330, while the poultry leg 300 is being arranged against the cutting block 310, is positioned in such a manner that the support edge 336 is located beneath the kneecap irrespective of the dimensions of the individual poultry leg 300. Then, the knee-support block 330 is tilted, in a manner not shown in more detail, to a predetermined angular position, in such a manner that the support edge 336 moves upwards. Thus, the kneecap of the poultry leg 300, and consequently the knee joint, is accurately positioned with respect to the cutting block 310 and the blades 320*a*, 320*b* which move with respect to the latter. The knee-support block 330 may also be arranged in a stationary position with respect to the cutting block 310, in which case the path of the guide 314 with respect to the position of the support edge 336 ensures that the kneecap of a poultry leg 300 is positioned in the desired manner on the support edge 336.

Figure 24:
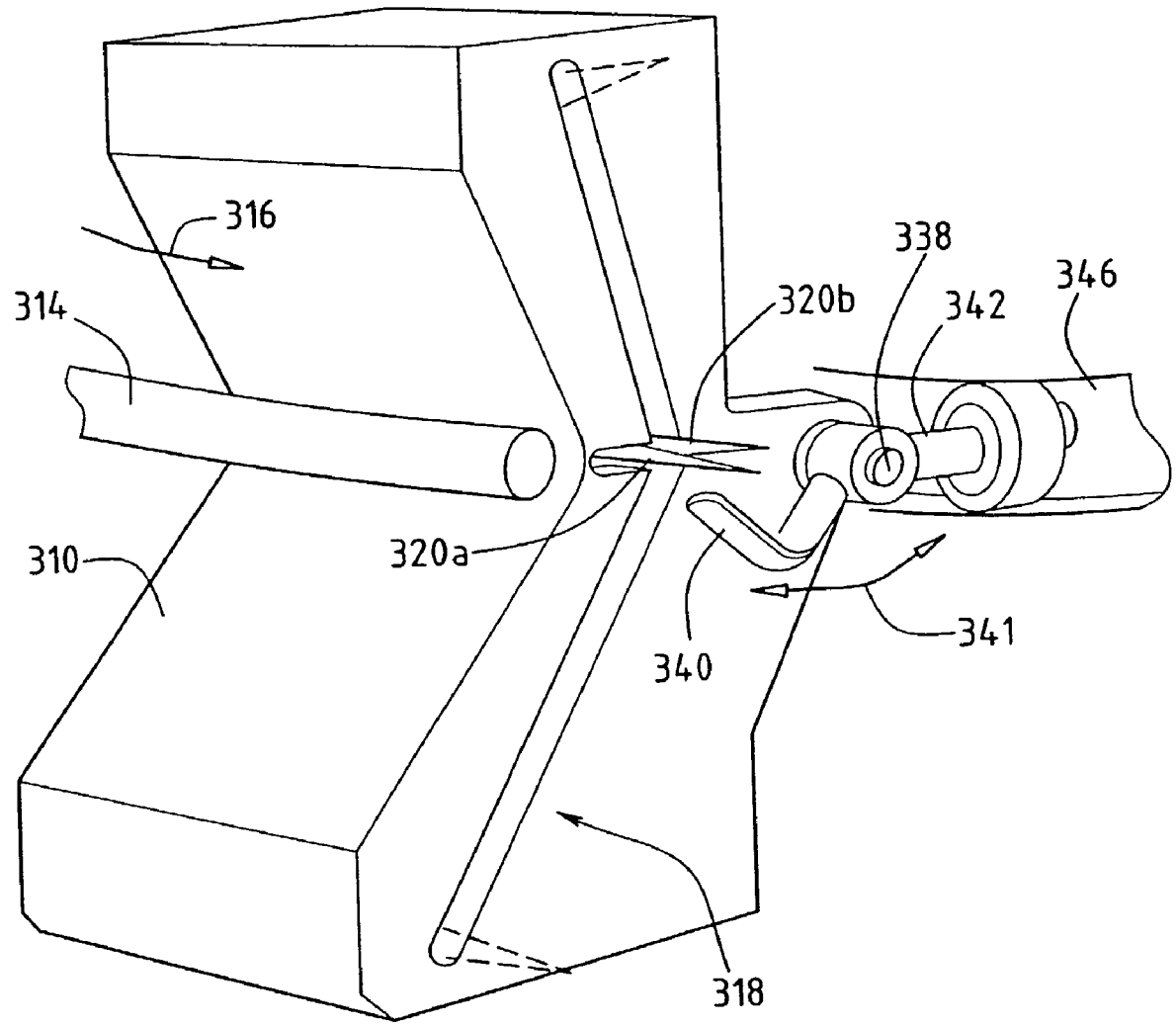

As illustrated in FIG. 24, the function of the knee-support block 330 shown in FIG. 23*a*, namely that of positioning the kneecap, may also be carried out by an arm 340 which is attached in such a manner that it can pivot about a pin 338, which is attached to the cutting block 310, in the directions of the double arrow 341. The arm 340 may be fixedly connected to a drive arm 342 which is provided with a roller 344. In the event of the cutting block 310 moving in the direction of the arrow 316 along a cam track 346, the roller 344, by suitably selecting the path of the cam track 346, can be displaced in a suitable manner with respect to the cutting block 310 to ensure desired displacement of the arm 340.

Figure 25:
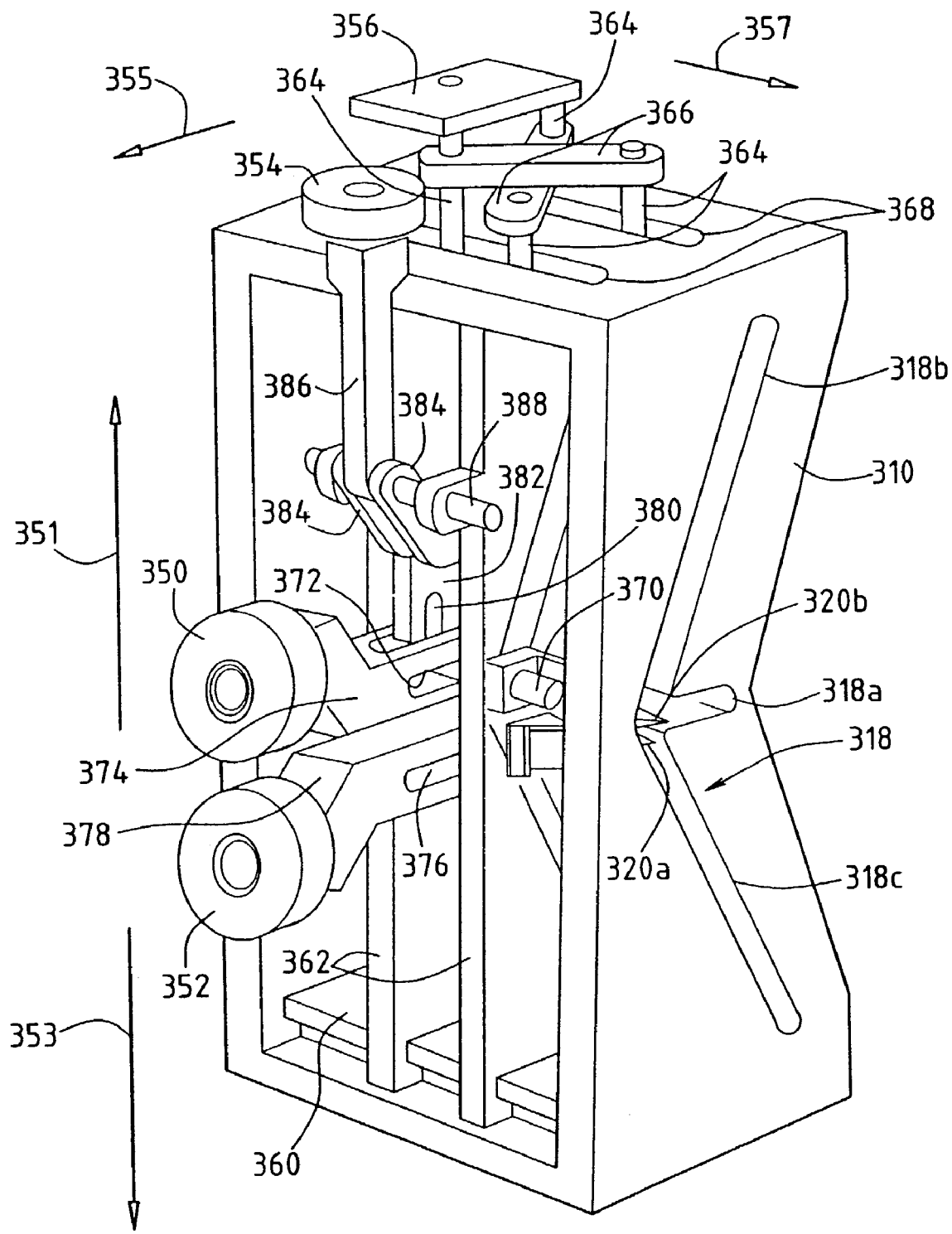

As shown in more detail by FIG. 25, the cutting block 310 contains a mechanism for controlling the movements of the blades 320*a* and 320*b*. A first roller 350 is provided, which from the position shown can be moved in the direction of arrow 351 and back, with the aid of a cam track, which interacts with the roller 350 and is not shown in more detail, for moving the blade 320*a* along the slot part 318*b*, as is a second roller 352, which from the position shown can be moved in the direction of arrow 353 and back with the aid of a cam track, which interacts with the roller 352 and is not shown in more detail but differs from the cam track mentioned above, for moving the blade 320*b* along the slot part 318*c*, a third roller 354 which, from the position shown, can be moved in the direction of arrow 355 and back with the aid of a cam track, which interacts with the roller 354 and is not shown in more detail but differs from the cam tracks mentioned above, for moving the blades 320*a* and 320*b* along the slot part 318*a*, and an actuating plate 356 which, from the position shown, can be moved in the direction of arrow 357 and back with the aid of an actuating member, which interacts with the actuating plate 356 and is not shown in more detail, for moving the blades 320*a*, 320*b* out of and into the cutting block 310. Guides 360 are arranged in the interior of the cutting block 310 on the bottom side and the top side (not visible), along which guides guide plates 362, which are coupled to one another in a manner not shown and are provided with suitable guide recesses, can be moved with the aid of the actuating plate 356, which is connected to the guide plates 362 via arms 364 and straps 366. The arms 364 fit through slots 368 in the top wall of the cutting block 310. The guide plates 362 are provided with similar V-slots to the slot 318. The blades 320*a*, 320*b* are attached to rods 370 which fit through the V-slots of the guide plates 362. The rod 370 which is connected to the blade 320*a* fits through a slot 372 of an arm 374 connected to the first roller 350, while the rod 370 (not shown) which is connected to the blade 320*b* fits through a slot 376 of an arm 378 connected to the second roller 352. The rods 370 also fit through a slot 380 of an arm 382 which is pivotably connected to arms 384 which, in turn, are fixedly connected to an arm 386 connected to the third roller 354. The arms 384 and 386 can pivot about a pin 388 which is mounted on the guide plates 362.

FIGS. 26*a*–26*d* show a poultry leg 300 which is positioned between a support block 308 and a cutting block 310 with blades 320*a*, 320*b*, the poultry leg 300 being supported in the back of the knee by the guide 314. For the sake of clarity, a drumstick bone 390, a thigh bone 392 and a kneecap 394 are illustrated by dashed lines in the leg. The kneecap 394 is moved into the correct position with respect to the blades 320*a*, 320*b* by the arm 340.

In accordance with FIG. 26*c*, the blades 320*a*, 320*b* are inserted into the leg at the level of the transition between the drumstick bone 390 and the thigh bone 392, from the inner side of the poultry leg 300, directly behind the knee joint. As illustrated by FIG. 26*a*, the blades 320*a*, 320*b* are then moved in the direction of arrow 396 and back in order to cut through meat and tendons. In a subsequent step, the blades 320*a*, 320*b* are used, after a snipping movement at the knee joint, to make cuts on the inner side of the poultry leg 300 and along the rear side of the drumstick bone 390 and the thigh bone 392 along the drumstick bone 390 and the thigh bone 392, in the direction of arrows 398 and 400. The order in which the cuts are made along the knee joint, the drumstick bone 390 and the thigh bone 392 is not essential, incidentally. The cut along the drumstick bone 390 could also be omitted in order to produce intact drumsticks.

Figure 27B:
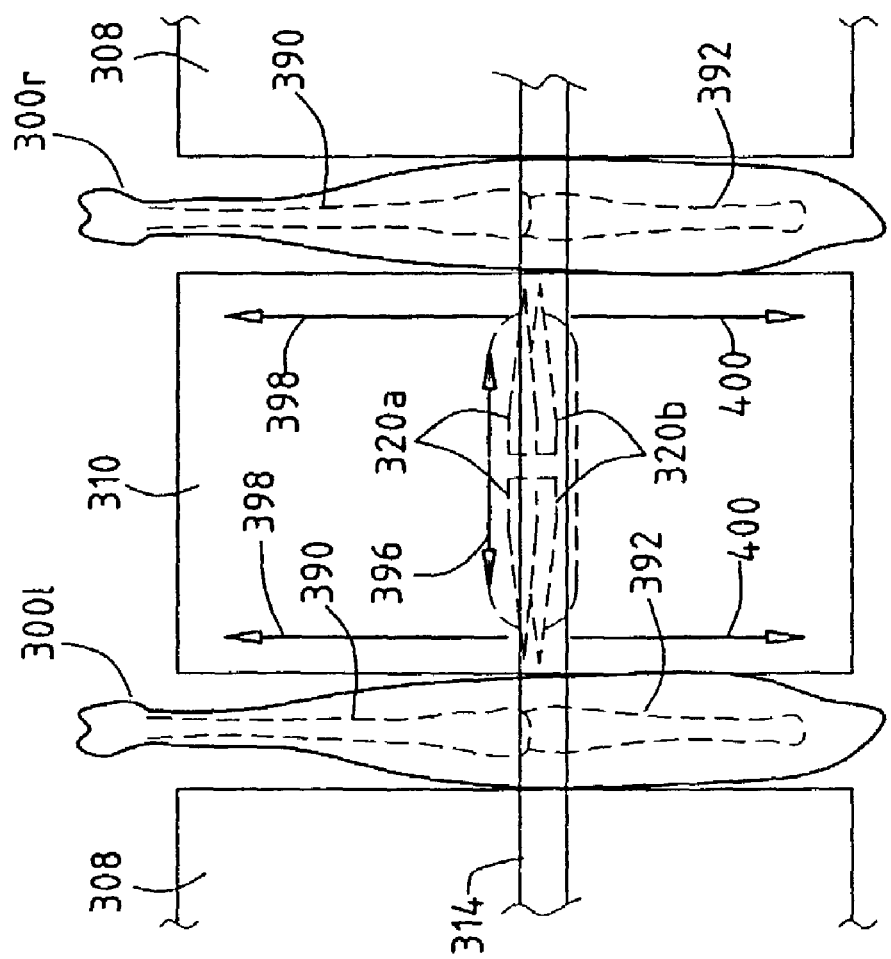
Figure 27A:
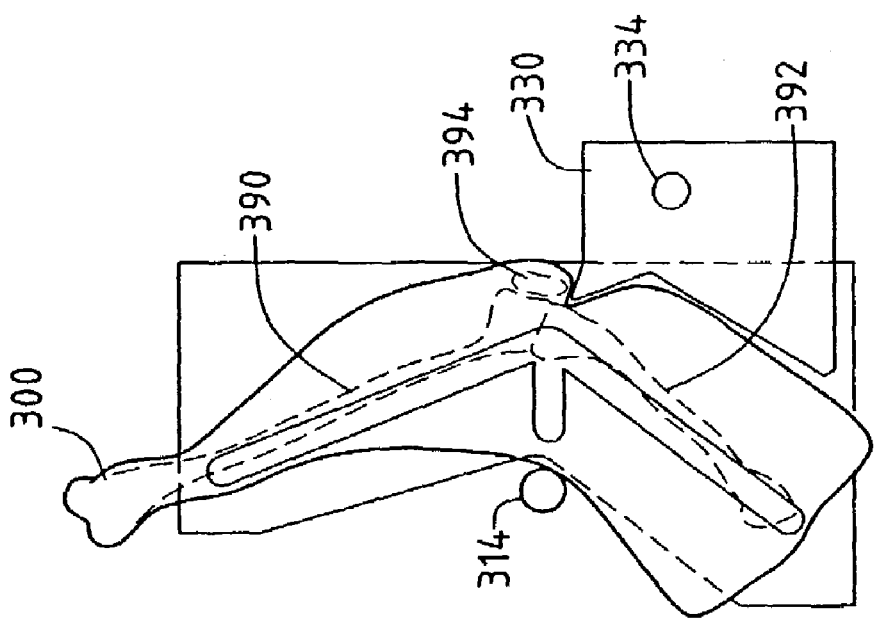
FIG. 27a shows a side view of the device shown in FIG. 23a for processing a poultry leg.

By way of alternative knee joint positioning method, FIG. 27*a* illustrates the use of the knee-support block 330.

FIG. 27*b* illustrates the way in which a cutting block 310 which acts on two sides is used to make cuts substantially simultaneously in a left and a right poultry leg 300*l* and 300*r*, respectively.

Figure 28:
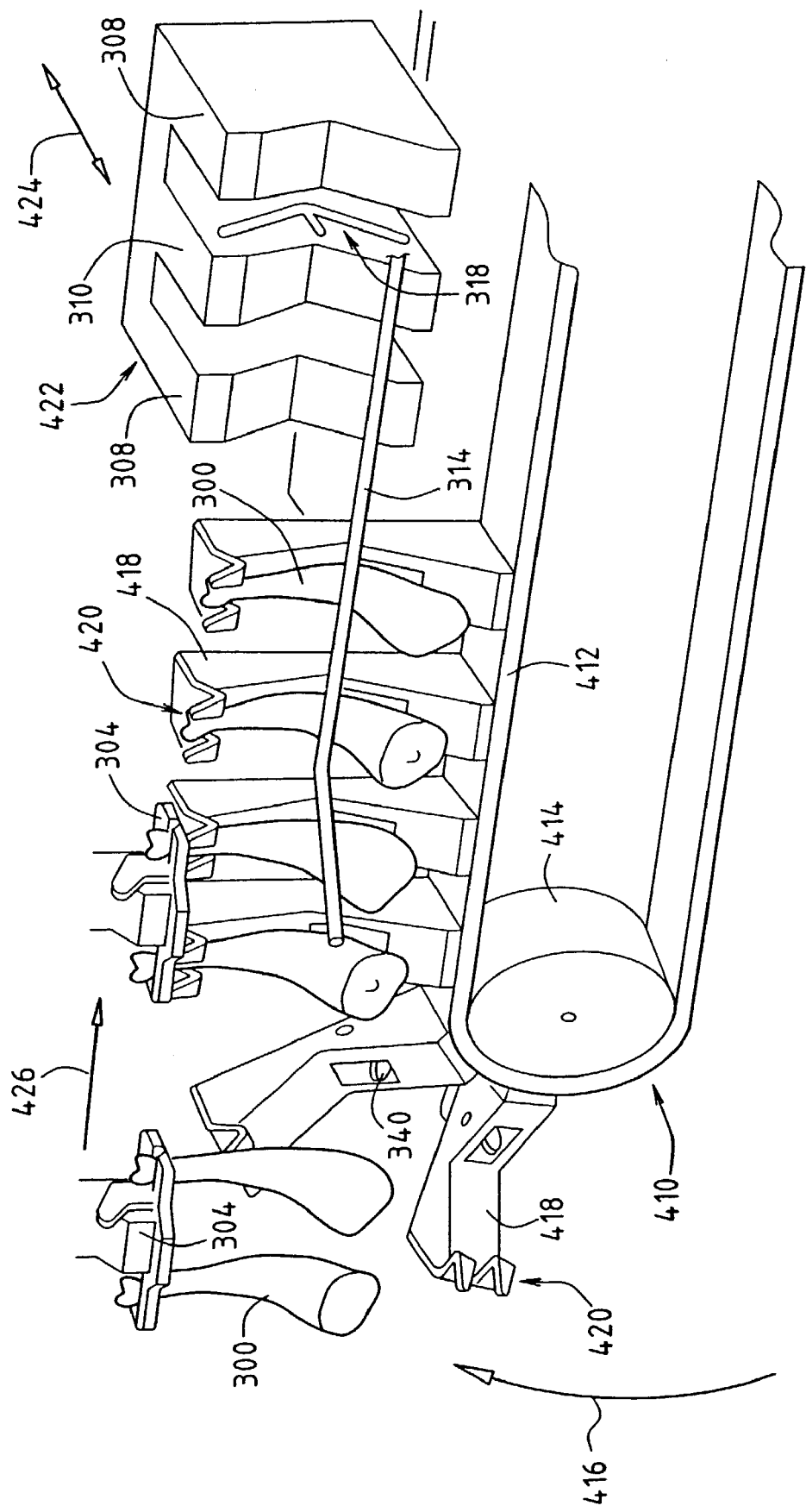
FIG. 28 shows a perspective view of a section of a boning device for poultry legs hanging from carriers.

The boning device shown in FIG. 28 comprises a diagrammatically depicted conveyor 410 with an endless belt 412 which is guided over rollers 414 to produce intermittent movement in the direction of arrow 416. Positioning blocks 418 are arranged on the belt 412 at a distance from one another. The positioning blocks 418 are each provided with a carrier 420 with a recess for carrying a poultry leg 300, and an installed arm 340 for positioning the knee joint via the support for the kneecap. The arm 340 is actuated in a similar manner, not shown in more detail in FIG. 28, to that explained with reference to FIG. 24. The guide 314 is used to press the poultry legs 300 against the positioning blocks 418 and the arms 340. A cutting unit 422 comprises a cutting block 310 which acts on two sides and two support blocks 308 which are arranged on either side of the cutting block, and the cutting unit can be moved in the directions of double arrow 424, in a manner not shown in more detail, in order, while the intermittently moving conveyor 410 is at a standstill, to move the cutting block 310 and the support blocks 308 of the cutting unit 422 between the positioning blocks 418 in such a manner that the cutting block 310 acts on the inner side of a left and a right poultry leg 300, which are then hanging in a still position. Then, the cutting unit 422 is taken out of the path of the positioning blocks 418, the positioning blocks 418 are displaced by twice the interval between the positioning blocks 418 in the direction of the arrow 416, and the cutting block 310 and the support blocks 308 of the cutting unit 422 are moved back between the positioning blocks 418 in order to cut into two subsequent poultry legs 300. The poultry legs 300 are transferred, on the carriers 420 of the positioning blocks 418, out of the carriers 304 which are moving in the direction of arrow 426.

FIGS. 29–33 illustrate the way in which the thigh bone 392 is pressed out of the thigh meat after the blades 320*a*, 320*b* have made a cut 430 at the knee joint, a cut 432 along the drumstick bone and a cut 434 along the thigh bone 392.

Figure 29:
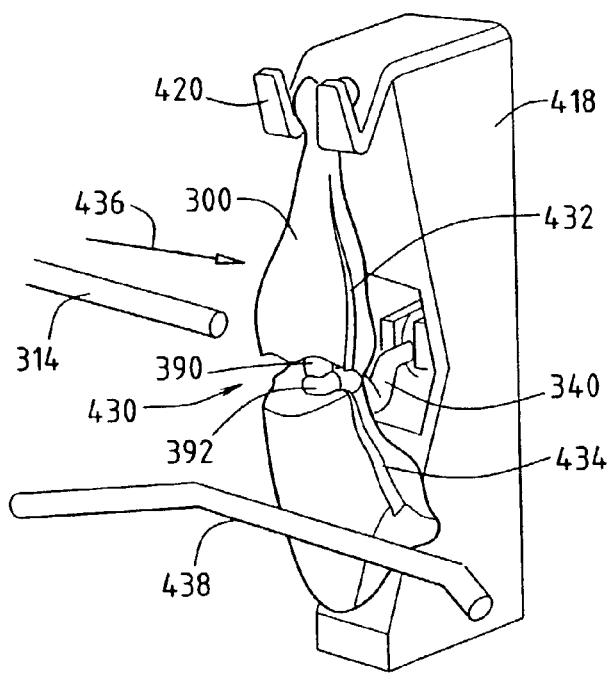
FIG. 29 shows a perspective view of a first section of a device for boning a thigh of a poultry leg hanging from a carrier.
Figure 30:
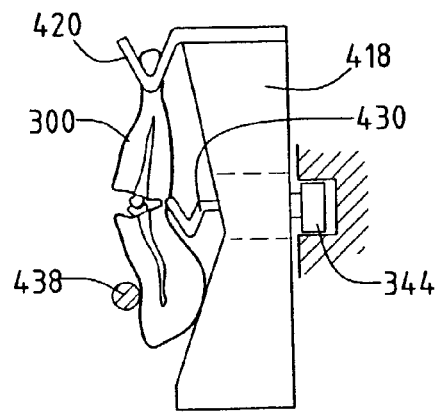
FIG. 30 shows a side view of the device shown in FIG. 29.

As illustrated by FIGS. 29 and 30, the positioning block 418 together with a poultry leg 300 which has been provided with cuts 430, 432 and 434 is moved along a guide 438 in the direction of arrow 436. In the process, the guide 438 supports the poultry leg 300 at the thigh, and the arm 340 rests against the poultry leg 300 at the level of its knee joint.

Figure 31:
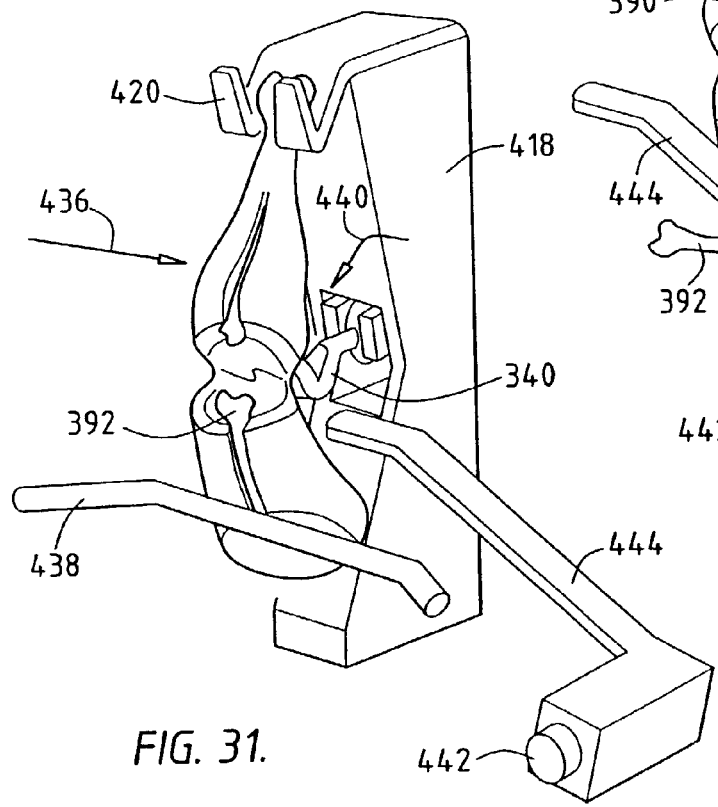
FIG. 31 shows a second section of the device shown in FIG. 29 in a subsequent processing stage.
Figure 32:
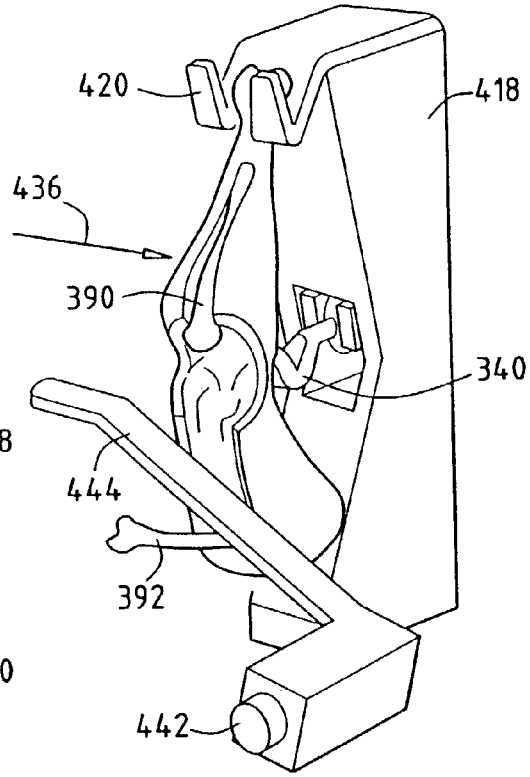
FIG. 32 shows the device shown in FIG. 29 in a subsequent processing stage.
Figure 33:
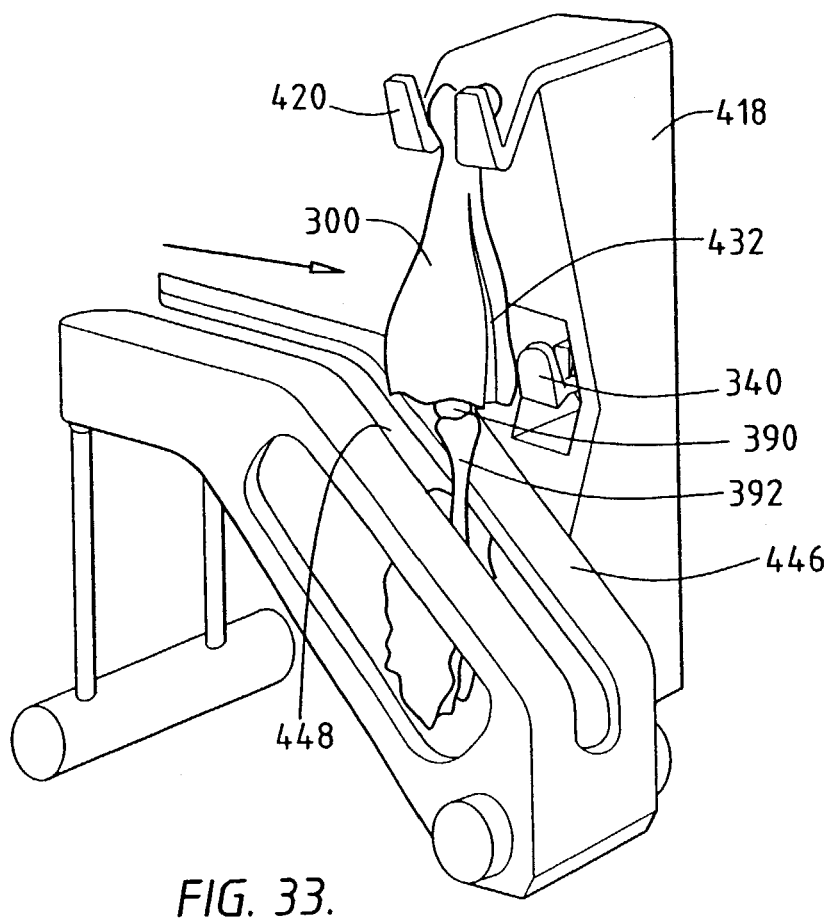
FIG. 33 shows a perspective view of an alternative device for boning a thigh of a poultry leg hanging from a carrier.

As a result of the arm 340 then being moved outwards and/or downwards in the direction of arrow 440 with the aid of a suitable control arrangement, that section of the thigh bone 392 which adjoins the knee joint is pressed out of the thigh meat, as illustrated in FIG. 31. A guide 444 which is arranged in a fixed position or can pivot about a pin 442 and is directed downwards then presses the thigh bone 392 further out of the thigh meat as the positioning block 418 moves onwards in the direction of the arrow 436, as illustrated by FIG. 32. As an alternative, FIG. 33 shows the use of a fixedly or movably arranged guide 446 in which there is a partially downwardly directed slot 448 for removing the thigh meat from the thigh bone 392 when the positioning block 418 moves in the direction of the arrow 436, the thigh bone 392 remaining connected to the drumstick bone 390.

Figure 34:
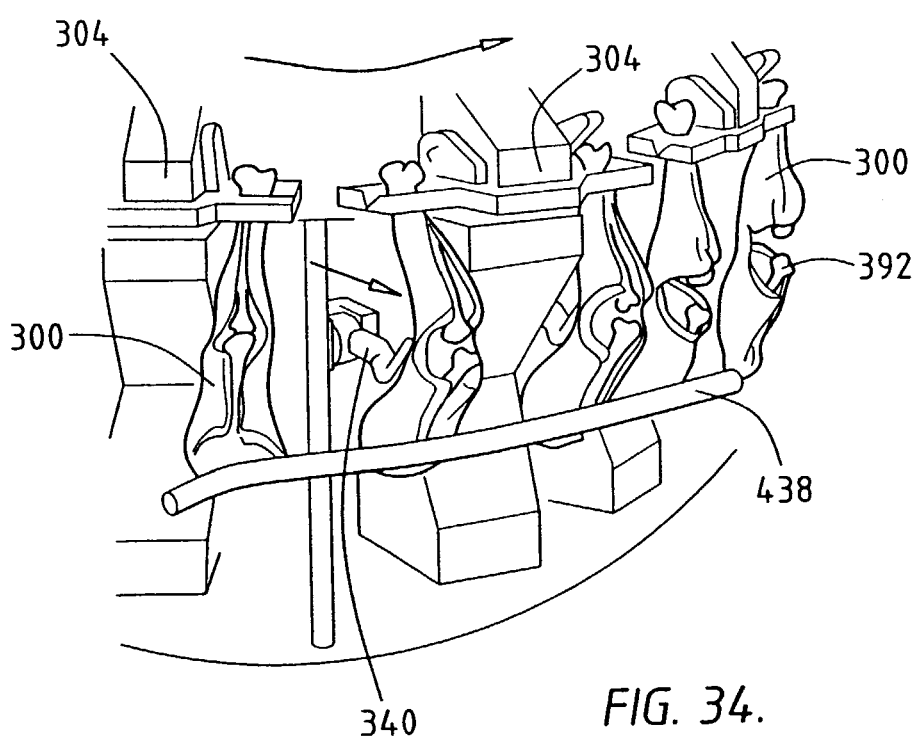
FIG. 34 shows a perspective view of an alternative for processing in accordance with FIG. 31 with the aid of the device shown in FIG. 21.

In a similar manner to FIG. 31, FIG. 34 illustrates how thigh bones 392 of poultry legs 300 which are hanging from carriers 304, are moving in the direction of arrow 450 and have been provided with cuts 430, 432 and 434 can be pressed partially out of the thigh meat in a carousel device using forwardly moving arms 340 and a guide 438, after which, if desired, the thigh bones 392 can be pushed further out of the thigh meat with the aid of a guide of the type shown in FIG. 32 and denoted by reference numeral 444.

Figure 35:
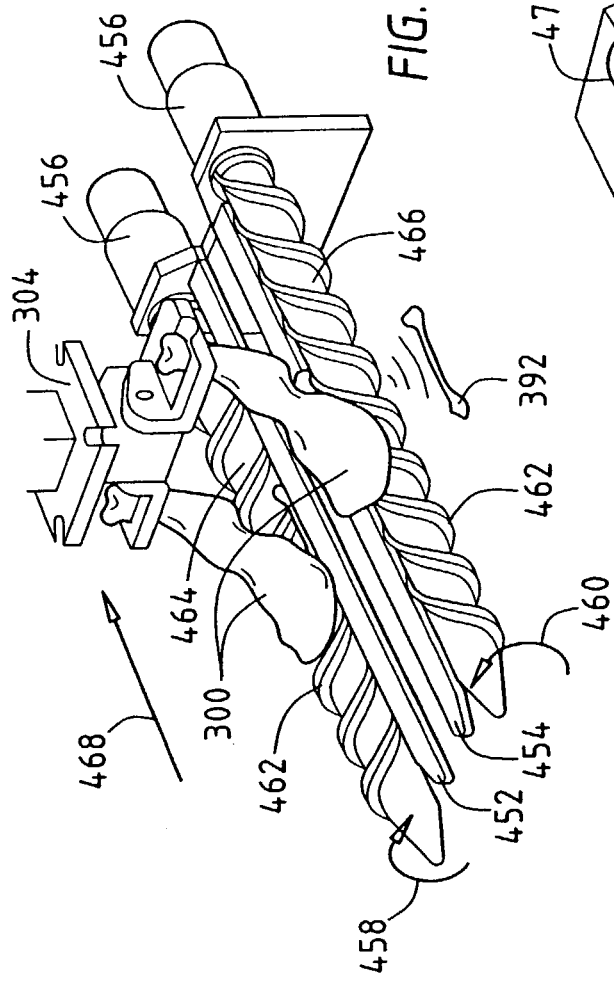
FIG. 35 shows a perspective view of another device for boning a thigh of a poultry leg.

FIG. 35 shows a boning device with a set of fixedly arranged guides 452, 454 and a set of rollers 464 and 466 which are driven in rotation with the aid of motors 456 in the directions of arrows 458, 460 and are provided with a helical rib 462. Between the guide 452 and the roller 464 there is a gap, and there is also a gap between the guide 454 and the roller 466. Poultry legs 300 which are hanging from a carrier 304 and have undergone an operation for partially taking the thigh bone 392 out of the thigh meat (explained above with reference to FIGS. 31, 32 and 34) are each conveyed in the direction of arrow 468 along a path which is such that the thigh bone 392 moves into the gap between the guide 452 and the roller 464 or between the guide 454 and the roller 466. The rib 462 of each roller 464, 466 then pushes the thigh bone 392 further through the gap and thus separates the thigh bone 392 from the thigh meat. After this operation, the drumstick meat and the thigh meat form a single unit.

Figure 36:
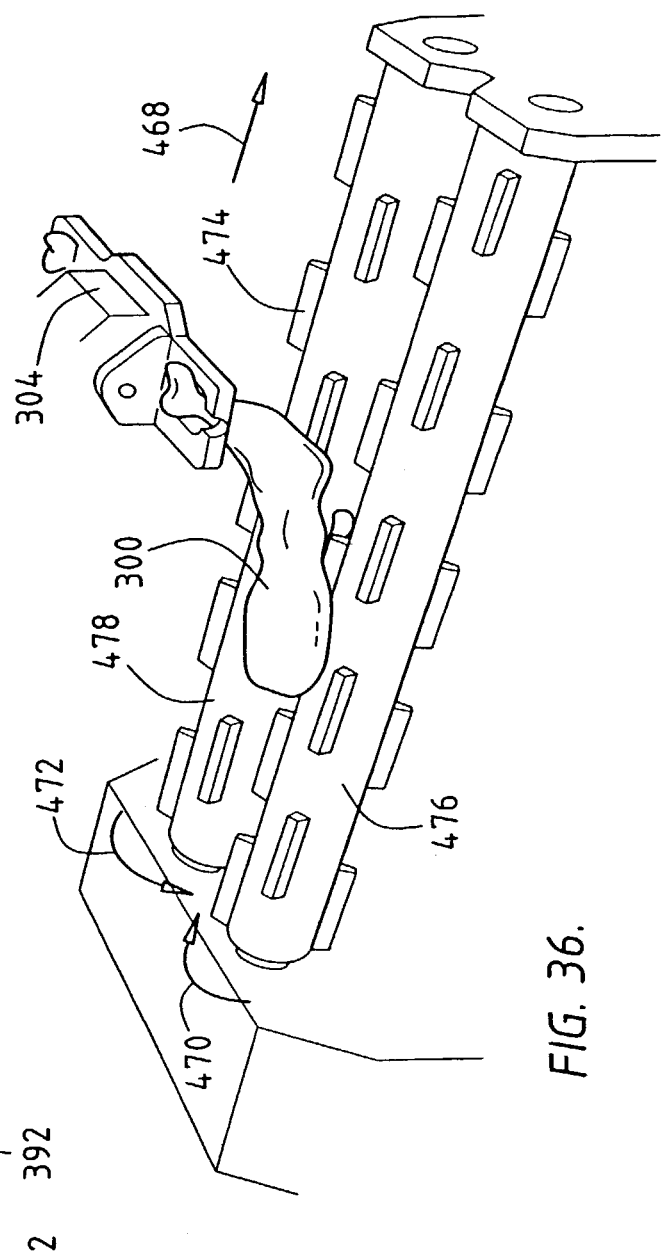
FIG. 36 shows a perspective of yet another device for boning a thigh of a poultry leg.

FIG. 36 shows a boning device with two parallel rollers 476 and 478, which are arranged at a distance from one another, are driven in rotation in the direction of arrows 470, 472 and are provided with series of projections 474. A poultry leg 300 which is hanging from a carrier 304 and has undergone an operation for partially taking the thigh bone 392 out of the thigh meat (explained above with reference to FIGS. 31, 32 and 34) is conveyed in the direction of the arrow 468 along a path which is such that the thigh bone 392 moves between the rollers 476, 478 at the level of the gap. The projections 474 on the rollers 476, 478 then push the thigh bone 392 through the gap between the rollers 476, 478 and thus separate the thigh bone 392 from the thigh meat. After this operation, the drumstick meat and the thigh meat form a single unit.

Figure 37:
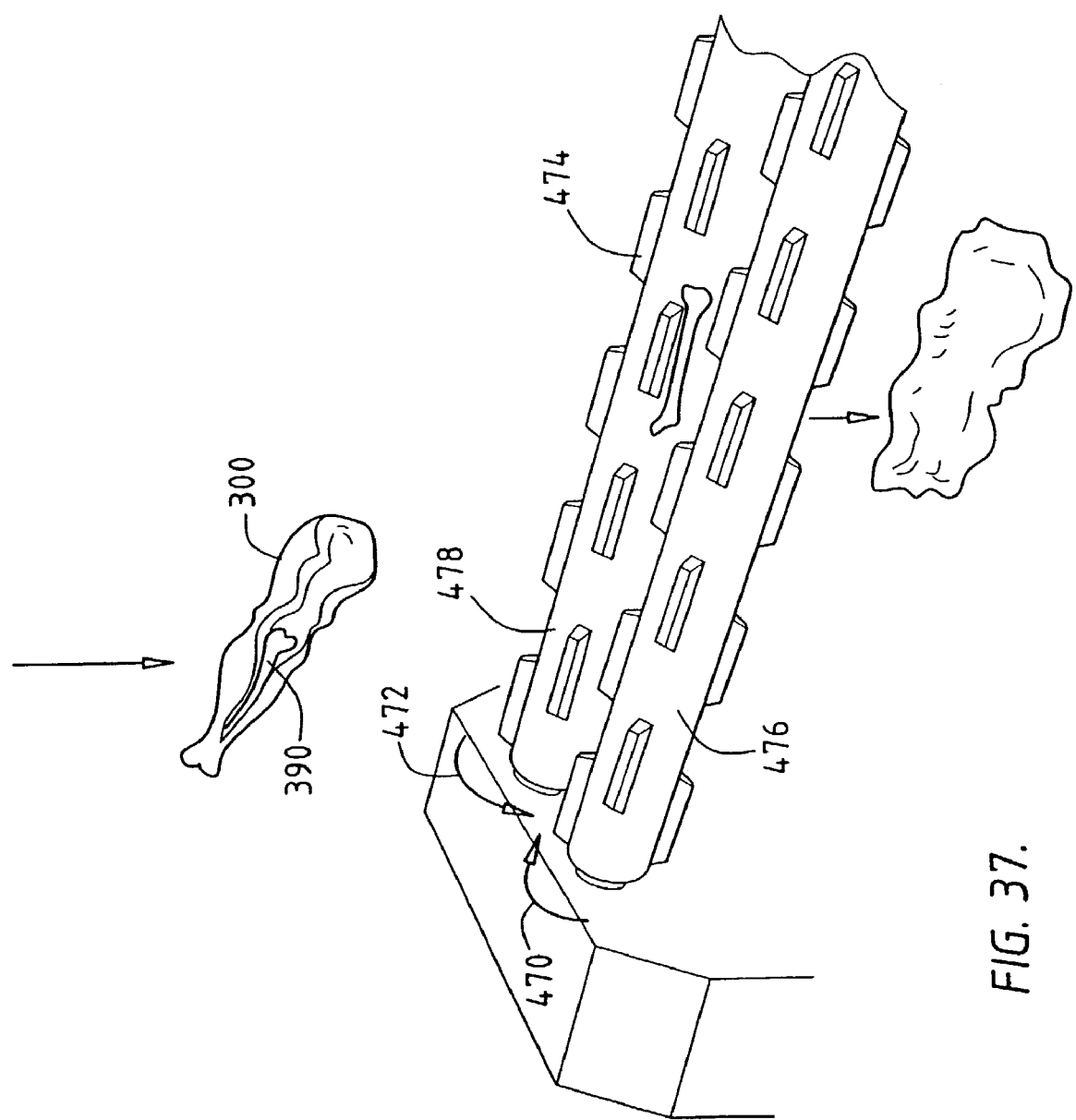
FIG. 37 shows a perspective view of the boning of a poultry leg from which the thigh bone has already been removed.

As illustrated in FIG. 37, the device shown in FIG. 36, given an amended arrangement of the rollers 476, 478 with respect to one another (smaller gap width), can also be used to separate a drumstick bone 390 from a poultry leg 300 from which the thigh bone 392 has already been removed. For this purpose the poultry leg 300 from which the thigh bone 392 has been removed is placed onto the rollers 476, 478 at the location of the gap between them. The meat is pulled through the gap by the projections 474, while the drumstick bone 390 cannot pass through the gap.

Figure 38:
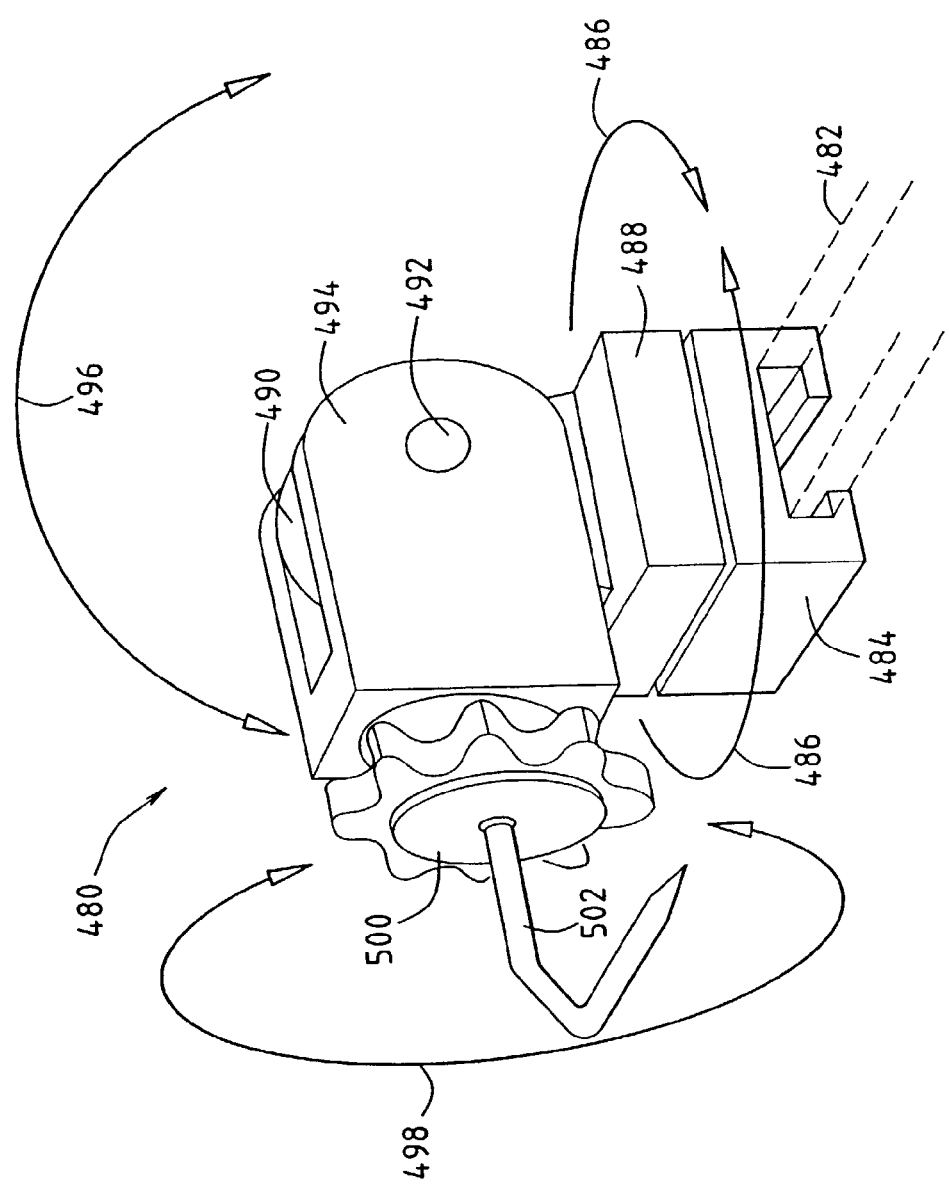
FIG. 38 shows a perspective view of a carrier for a poultry leg.

FIG. 38 shows a conveyor member 480 which, in a manner not shown in more detail, can be displaced along a rail 482 indicated by dot-dashed lines. For this purpose, a running section 484 is provided. A carrying section 488 is connected to the running section 484 in such a manner that it can rotate in the direction of arrows 486. The carrying part 488 bears a lip 490 which is provided with a pin 492. A substantially U-shaped pivot part 494 can pivot through approximately 180° about the pin 492, as indicated by double arrow 496. A toothed section 500, which can rotate in the directions of double arrow 498 and is provided with a sharp bent pin 502, is mounted on the pivot part 494. The various rotating and pivoting movements of the conveyor member 480 are controlled by means which are not shown in more detail and are arranged along the rail 482, acting on components (in some cases not shown in more detail) of the conveyor member 480.

The conveyor member 480 can be used to convey and/or position a poultry leg, the leg being arranged on the pin 502 in such a manner that the pin 502 is directed into the knee joint of the leg between the thigh bone and the drumstick bone from one side of the leg to the other side, and is arranged behind the kneecap of the leg. It is thus possible for the leg to be conveyed, for one or more operations, such as making cuts and the boning operation, to a suitable processing device, such as the devices which are shown in FIGS. 23a, 24 and 25, where it can be positioned for the operation to be carried out.

Figure 39:
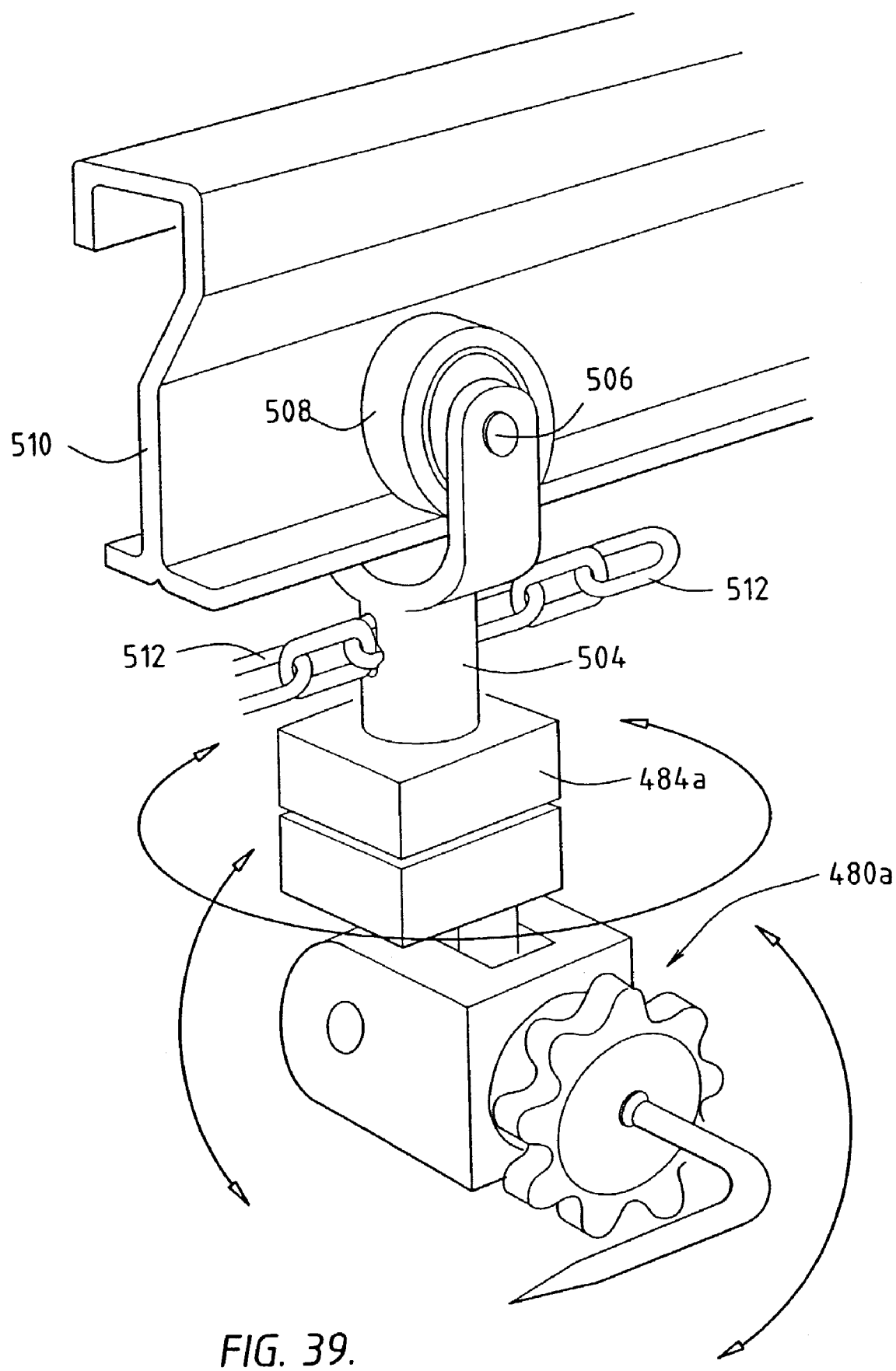
FIG. 39 shows a perspective view of another carrier for a poultry leg.

FIG. 39 shows a similar conveyor member to that shown in FIG. 38, except that the running section 484a of the conveyor member 480a shown in FIG. 39 is connected to a substantially Y-shaped bearing fork 504 which is provided, at its ends, with rollers 508 which can rotate freely about a pin 506 and run over flanges of a profiled section 510. By means of a chain 512, the bearing fork 504 is connected to other bearing forks 504 of other conveyor members 480a.

It should be noted here that the conveyor member 480 or 480a may also be provided with a pin 502 which is arranged immovably with respect to the running section 484 or 484a.

Figure 40:
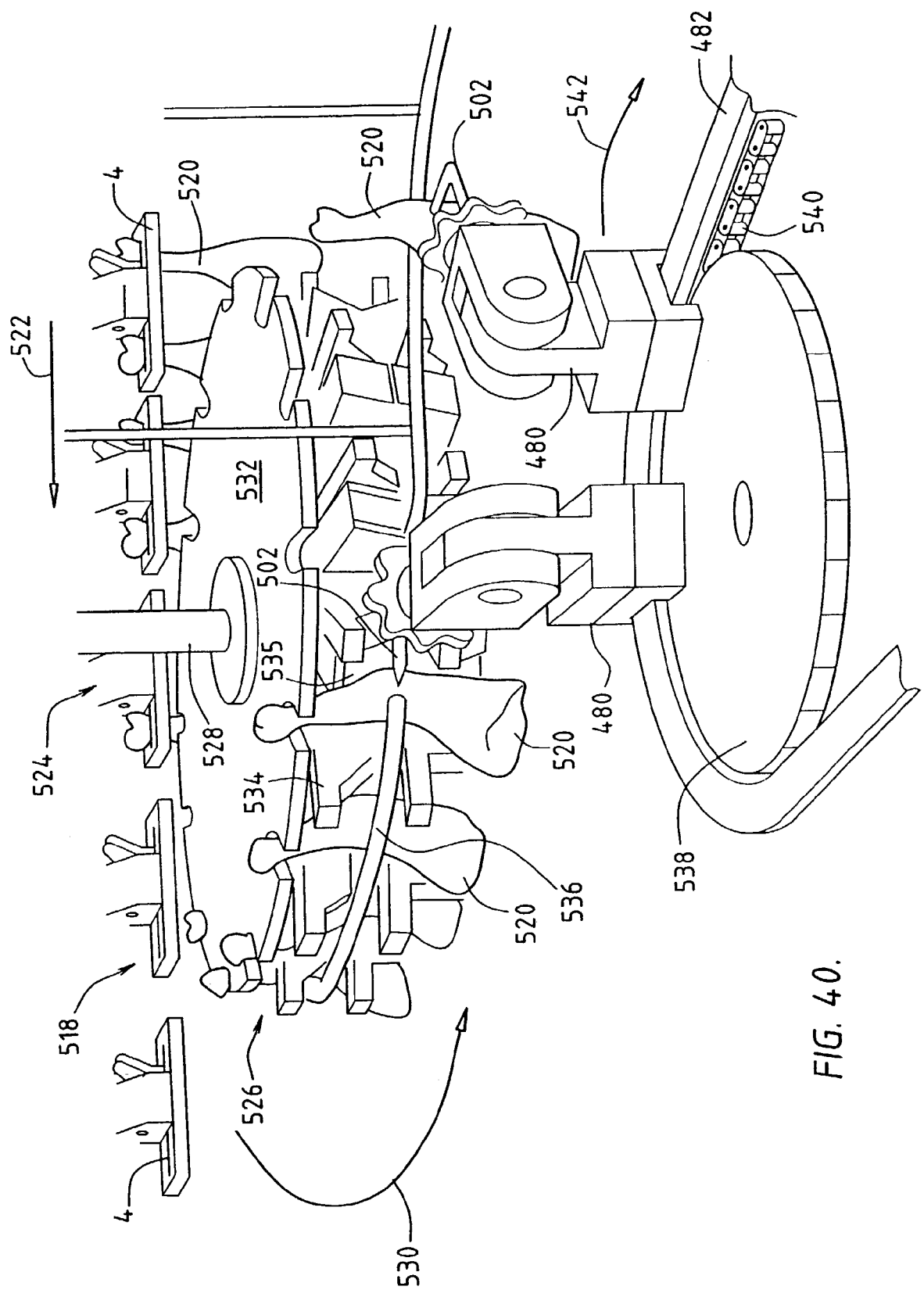
FIG. 40 shows a perspective view of the transfer of a poultry leg from an overhead conveyor to a carrier in accordance with FIG. 38.

FIG. 40 shows an overhead conveyor 518 in which legs 520 of poultry which are suspended from carriers 4 by the tarsal joint are conveyed in the direction of arrow 522. At the location indicated by an arrow 524, the legs 520 are transferred, in a manner not shown in more detail, into a processing device 526. The processing device 526 comprises a carrying disc 532, which rotates about a pin 528 in the direction of arrow 530, for carrying the legs 520 by their tarsal joints in recesses therein, leg support elements 434 for supporting the legs 520 on one side, and leg support elements 535 for supporting the legs 520 on the front side. A guide 536, which forms a stop intended to support the legs 520 at the back of the knee, is arranged along a section of the circumference of the processing device 526. In the vicinity of the downstream end of the guide 536, there is a guide wheel 538 of a conveyor with conveyor members 480, along which guide wheel 538 the conveyor members 480 are conveyed in the direction of arrow 542 with the aid of a chain 540. In this case, the pins 502 of the conveyor members 480 are directed backwards. The movements of the processing device 526 and the conveyor members 480 are synchronized, the speed of the legs 520 being higher than the speed of the pins 502.

In the vicinity of the downstream end of the guide 536, the leg 520 which is present in that area at that time meets a pin 502 of a conveyor member 480, the point of the pin 502 being located at the level of the knee joint of the leg 520. The leg 520 is pressed against the point of the pin 502 by the leg support element 534 interacting therewith, the pin 502 penetrating into the knee joint of the leg 520 between the thigh bone and the drumstick bone, and behind the kneecap. The leg 520 is thus transferred from the processing device 526, if appropriate with the assistance of a radially outward movement of the leg support element 535 interacting with the leg, in order to press the tarsal joint of the leg 520 out of the recess in the carrying disc 532. The leg 520 is then conveyed by the conveyor member 480 to a subsequent processing station, such as a processing station as shown in FIG. 41.

The processing device 526 can only function as a suspended transfer conveyor for transferring the legs from the overhead conveyor to the conveyor members 480, but the leg support elements 534, 535 may also be provided with means for carrying out the operations which have been explained above with reference to FIGS. 26a–d and 27a–b, or for carrying out further operations.

Figure 41:
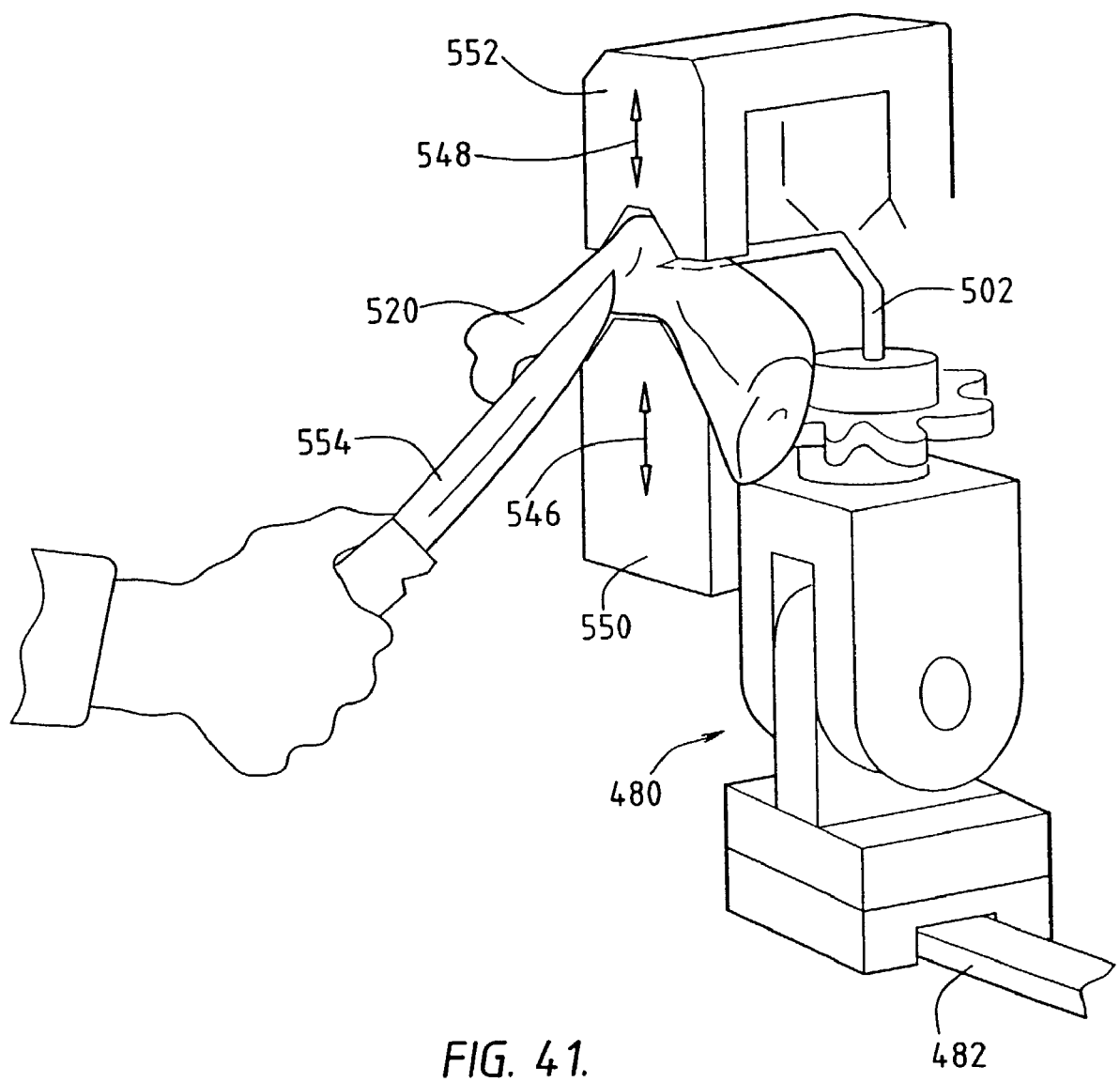
FIG. 41 shows a perspective view of the way in which an operation is carried out on a poultry leg on a carrier in accordance with FIG. 38.

FIG. 41 shows a conveyor member 480 which, on the pin 502 thereof, carries a leg 520. The leg 520 is fixed by means of support elements 550 and 552, which can move in a manner not shown in more detail in the directions of double arrows 546 and 548, the support element 550 supporting the leg 520 on its rear side in the area of the knee joint, and the support element 552 supporting the leg on its front side in the area of the knee joint. The entire process of conveying the leg 520 to the support elements 550, 552 and fixing the leg 520 between the support elements 550, 552 can take place completely automatically by suitably controlling the movements of the conveyor member 480 and the support elements 550, 552. In the fixed position of the leg 520, processing operations can be carried out thereon automatically or manually, for example incisions can be made manually using a blade 554.

While the invention has been described and illustrated in its preferred embodiments, it should be understood that departures may be made therefrom within the scope of the invention, which is not limited to the details disclosed herein.

We claim:

1. A method for processing poultry legs each comprising at least a drumstick, the method comprising:
   a. providing a plurality of carriers moveable along a conveyor path in a conveying direction;
   b. suspending each leg from a carrier, wherein each leg is suspended at only a single end of the leg;
   c. making at least one transverse incision substantially around the circumference of the drumstick in the vicinity of the tarsal joint of the leg, wherein the carrier from which the leg is suspended is moved along the conveyor path during making of the at least one transverse incision;
   d. conveying the carrier to a separating device for at least partially separating a part from the leg suspended by the carrier, wherein the separating device is adapted to at least partially separate parts from legs suspended from different carriers; and
   e. at least partially separating a part from the leg with the separating device, wherein the carrier from which the leg is suspended is moved along the conveyor path during the separating of the part from the leg.

2. The method of claim 1, wherein making the transverse incision substantially around the circumference of the drumstick comprises making at least a first incision and a second incision, wherein making each of the first and second incisions comprises cutting from one side of the leg towards an opposite side of the leg and wherein the first and second incisions are made in opposite directions around the circumference of the drumstick.

3. The method of claim 1, wherein the drumstick comprises tendons and the method further comprises:
   (a) cutting into the drumstick in the vicinity of the tarsal joint on a first side of the drumstick; and
   (b) severing tendons of the drumstick in the vicinity of the tarsal joint.

4. The method of claim 3, further comprising moving the tendons to a second side of the drumstick opposite the first side before severing the tendons.

5. The method of claim 1, further comprising making a substantially longitudinal incision between the tarsal joint and the knee joint of the leg before at least partially separating a part of the leg.

6. The method of claim 1, wherein the leg further comprises a thigh and the method further comprises making a substantially longitudinal incision between the tarsal joint and the hip joint of the leg or between the knee joint and the hip joint of the leg before at least partially separating apart of the leg.

7. The method of claim 5, wherein the longitudinal incision is made in a direction away from the tarsal joint.

8. The method of claim 5, wherein the transverse incision and the longitudinal incision intersect.

9. The method of claim 1, wherein the leg further comprises skin and wherein making at least one transverse incision comprises cutting into the skin to a depth substantially equal to the thickness of the skin.

10. The method of claim 1, wherein the leg further comprises skin, and wherein at least partially separating a part of the leg comprises pulling the skin off of the leg.

11. The method of claim 9, further comprising stretching the skin before cutting into the skin.

12. The method of claim 9, further comprising stretching the skin after cutting into the skin.

13. The method of claim 1, wherein the leg comprises meat and a bone, and wherein at least partially separating a part of the leg comprises at least partially scraping the meat off the bone between the tarsal joint and the knee joint.

14. The method of claim 13, wherein scraping occurs along a scraping path from the tarsal joint to the knee joint.

15. The method of claim 14, wherein scraping is repeated at least once along at least part of the scraping path.

16. The method of claim 14, further comprising providing a knee support to support the knee joint on a side facing away from the tarsal joint.

17. The method of claim 16, wherein during the scraping the leg is lifted up by the knee support.

18. The method of claim 13, further comprising separating the meat from the bone at least in part by cutting through the meat on the side of the knee joint facing away from the tarsal joint.

19. The method of claim 1, wherein the drumstick comprises a drumstick bone and the leg further comprises a thigh having a thigh bone, the method further comprising:
   (a) making at least one incision along the thigh bone in its longitudinal direction;
   (b) making at least one incision along the drumstick bone in its longitudinal direction; and
   (c) cutting into tendons of the knee joint.

20. The method of claim 19, wherein making at least one incision along the thigh bone comprises making an incision substantially on the rear side and the inner side of the thigh bone.

21. The method of claim 19, wherein at least one of the incisions is made from the knee joint to the hip joint or from the knee joint to the tarsal joint.

22. The method of claim 19, wherein the tendons are cut in the area between the kneecap and the back of the knee and between the thigh bone and The drumstick bone.

23. The method of claim 19, further comprising positioning the kneecap of the leg prior to cutting into the tendons.

24. The method of claim 23, wherein positioning the kneecap comprises placing a stop against the kneecap.

25. The method of claim 23, wherein positioning the kneecap comprises placing a pin in the knee joint.

26. The method of claim 19, further comprising supporting at least one side of the leg while making one or more of the incisions.

27. The method of claim 19, further comprising supporting the leg in the back of the knee while making one or more of the incisions.

28. The method of claim 19, further comprising supporting the leg on its front side while making one or more of the incisions.

29. The method of claim 19, further comprising hanging the leg by the tarsal joint from a carrier of a conveyor.

30. The method of claim 19, further comprising removing at least a part of the thigh bone from the thigh through the thigh incision after cutting the tendons.

31. The method of claim 30, further comprising directing a force substantially transversely to the thigh bone onto the thigh bone in the vicinity of a condyle on the side of the knee joint.

32. A device for processing poultry legs each comprising at least a drumstick, the device comprising:
   a. a plurality of carriers, wherein each carrier is configured to suspend at least one leg therefrom and wherein each leg is to be suspended at only a single end of the leg;
   b. a conveyor for moving the carriers along a conveyor path in a conveying direction;
   c. transverse incision means for making at least one transverse incision in the drumstick substantially around the circumference of the drumstick in the vicinity of the tarsal joint of the leg, wherein the transverse incision means is adapted to cut while the carrier from which the leg is suspended is moved simultaneously along the conveyor path; and
   d. separation means for at least partially separating a part from the leg suspended by the carrier, wherein the separation means is adapted to at least partially separate the part from the leg while the carrier from which the leg is suspended is moved along the conveyor path, and wherein the separation means is adapted to at least partially separate parts from legs suspended from different carriers,
   wherein the separation means is positioned along the conveyor path to process the legs suspended from the different carriers.

33. The device of claim 32, wherein the transverse incision means comprises two blades arranged on either side of the conveyor path which can move into and out of the conveyor path.

34. The device of claim 33, wherein the blades each comprise a convex cutting edge.

35. The device of claim 33, wherein the blades can each pivot about a substantially vertically oriented axis.

36. The device of claim 33, wherein the blades are positioned in the conveyor path and can move out of the conveyor path counter to a biasing force.

37. The device of claim 32, thither comprising leg support means which can move beneath the conveyor, parallel to and synchronously therewith, in the conveying direction, for supporting the leg on its rear side.

38. The device of claim 32, wherein the transverse incision means comprise:
   (a) a set of tendon support members which are intended to move from a first side of a drumstick having tendons, along opposite sides of the drumstick, and to a second side of the drumstick opposite the first side, thereby moving the tendons to the second side of the drumstick; and
   (b) a cutting means for severing the tendons on the second side of the drumstick.

39. The device of claim 32, further comprising longitudinal incision means for making a longitudinal incision in the leg.

40. The device of claim 39, wherein the longitudinal incision is between the tarsal joint and the knee joint.

41. The device of claim 39, wherein the leg further comprises a thigh and the longitudinal incision is between the tarsal joint and the hip joint or between the knee joint and the hip joint.

42. The device of claim 39, wherein the longitudinal incision means comprise at least one arm with a free end which is provided with a blade, the blade being movable in a vertical plane and away from the tarsal joint in order to make an incision.

43. The device of claim 42, wherein the blade is moved substantially in the conveyor path on the rear side of the leg which is to be processed.

44. The device of claim 42, wherein the arm is pivotable synchronously with the carrier about a pin which is at a distance from the blade.

45. The device of claim 44, wherein the arm comprises a first section and a second section, wherein the second section supports the blade and is pivotable relative to the first section and counter to a biasing force.

46. The device of claim 42, further comprising a stop positioned on the arm for interacting with the blade and positioning the leg with respect to the blade.

47. The device of claim 39, further comprising two guides arranged on either side of and substantially parallel to the conveyor path, wherein the distance between the guides is adjustable and the guides may be moved apart counter to a biasing force and wherein the guides may be positioned so that the distance between the guides is smaller than the transverse dimensions of the drumstick.

48. The device of claim 47, wherein the guides interact with the longitudinal incision means.

49. The device of claim 32 wherein the leg comprises meat and a bone, wherein the separation means comprise:
   (a) scraper means which act away from the tarsal joint in the direction of the knee joint for scraping the meat off the bone; and
   (b) support means which interact with the scraper means for supporting the bone during the scraping.

50. The device of claim 49, wherein the support means comprises a knee support which can be placed against a part of the knee joint.

51. The device of claim 32, further comprising skin stretching means adapted to engage the skin at one or more locations between the tarsal joint and the knee joint and to move the engaged skin section away from the tarsal joint.

52. The device of claim 51, further comprising brushing elements ranged in the conveyor path of the drumstick which can be moved apart, transversely to the conveying direction, counter to a biasing force.

53. The device of claim 52, wherein the brushing elements are arranged at one end of one or more arms which are arranged beneath the conveyor path in such a manner that they can pivot counter to a biasing force, on a substantially horizontal pin extending transversely with respect to the conveyor path.

54. The device of claim 32, further comprising skinning rollers arranged in the conveyor path, wherein each skinning roller has a longitudinal axis which is oriented substantially parallel or at a slight angle to the conveyor path of the leg.

55. The device of claim 32, further comprising elongate skinning rollers each having helical ridges, wherein the diameter of at least one of the skinning rollers varies along the length of the at least one roller.

56. The device of claim 32, further comprising a set of elongate skinning rollers each having helical ridges, wherein the ridges comprise helical grooves that traverse the width of the ridges.

57. The device of claim 32, wherein the leg further comprises a thigh and the device further comprises:
   (a) thigh incision means for making at least one incision along the thigh bone, in the longitudinal direction thereof;
   (b) drumstick incision means for making at least one incision along the drumstick bone in the longitudinal direction thereof; and
   (c) knee incision means for cutting into tendons of the knee joint.

58. The device of claim 57, wherein the knee incision means comprises a first blade and a second blade, wherein the blades at least partially overlap and can be inserted into one side of the poultry leg behind the kneecap and at least partially between opposing ends of the thigh bone and the drumstick bone and wherein the blades are separable so that the first blade also forms at least a part of the thigh incision means and the second blade also forms at least a part of the drumstick incision means.

59. The device of claim 57, further comprising leg positioning means for supporting the leg on at least one of its sides.

60. The device of claim 59, wherein the leg positioning means comprises a support surface for one side of the poultry leg.

61. The device of claim 60, wherein the support surface is provided with one or more slots for allowing the thigh incision means, the drumstick incision means, or the knee incision means to pass through the one or more slots.

62. The device of claim 57, further comprising leg positioning means for supporting the leg in the back of its knee.

63. The device of claim 62, wherein the leg positioning means comprises a rod oriented transversely with respect to the leg.

64. The device of claim 57, further comprising leg positioning means for supporting the leg on its front side.

65. The device of claim 64, wherein the leg positioning means comprises a support surface to be placed against the thigh.

66. The device of claim 57, further comprising leg positioning means for positioning the kneecap of the leg.

67. The device of claim 66, wherein the leg positioning means comprises a kneecap stop for arranging against the kneecap.

68. The device of claim 66, wherein the leg positioning means comprises a pin, at least one end of which may be inserted into the leg behind the kneecap and between the thigh bone and the drumstick bone.

69. The device of claim 57, further comprising thigh bone removal means for removing the thigh bone from the thigh through a thigh incision made using the thigh incision means.

70. The device of claim 69, wherein the thigh bone removal means is adapted to exert a force on the thigh bone in the vicinity of the condyle on the side of the knee joint, which force is directed substantially transversely with respect to the thigh bone.

71. The device of claim 32, wherein the carrier comprises a pin, at least one end of which may be inserted into the leg behind the kneecap and between the thigh bone and the drumstick bone.

72. The device of claim 71, wherein the pin comprises a first elongate section comprising the at least one end to be inserted into the leg and a second elongate section connected to the first elongate section and oriented transversely thereto and wherein the carrier further comprises:
  (a) a first element for moving the carrier along a predetermined path;
  (b) a second element rotatably mounted on the first element;
  (c) a third element pivotably mounted on the second element; and
  (d) a fourth element rotatably mounted on the third element, wherein the pin is attached to the fourth element and can rotate therewith.

73. The device of claim 71, further comprising support elements for supporting at least one section of the leg.

74. A device for processing poultry legs, the device comprising:
  a. a plurality of carriers, wherein each carrier is configured to suspend at least one leg therefrom and wherein each leg is to be suspended at only a single end of the leg;
  b. a conveyor for moving the carriers along a conveyor path in a conveying direction;
  c. at least one cutting device for making at least one transverse incision in and substantially around the leg while the carrier from which the leg is suspended is moved simultaneously along the conveyor path; and
  d. a separation device for at least partially separating a part from the leg suspended by the carrier, wherein the separation means is adapted to at least partially separate the part form the leg while the carrier from which the leg is suspended is moved along the conveyor path, and wherein the separation device is adapted to at least partially separate parts from legs suspended from different carriers,
  wherein the separation device is positioned along the conveyor path to process the legs suspended from the different carriers.

75. The device of claim 74, wherein the leg comprises a drumstick bone, a thigh bone surrounded by thigh meat, and a knee joint and the cutting device is adapted to make the at least one transverse incision in and substantially around the knee joint, wherein the separating device comprises a guide to apply downward pressure on the thigh bone to at least partially separate the thigh bone from the thigh meat.

76. The device of claim 75, further comprising a pressing means to press the thigh bone at least partially out of the thigh meat proximal the knee joint.

77. The device of claim 74, wherein the leg comprises a drumstick bone, a thigh bone surrounded by thigh meat, and a knee joint and the cutting device is adapted to make the at least one transverse incision in and substantially around the knee joint and wherein the separating device comprises a guide having a slot, wherein, upon engagement of the thigh bone in the slot, the separating device at least partially separates the thigh meat from the thigh bone.

78. The device of claim 77, wherein the separating device scrapes the thigh meat at least partially from the thigh bone.

79. A device for processing poultry legs, the device comprising:
  a. a plurality of carriers, wherein each carrier is configured to suspend at least one leg therefrom and wherein each leg is to be suspended at only a single end of the leg;
  b. a conveyor for moving the carriers along a conveyor pat in a conveying direction;
  c. at least one blade for making at least one transverse incision in and substantially around the leg while the carrier from which the leg is suspended is moved simultaneously along the conveyor path; and
  d. at least one scraper plate that surrounds a portion of the leg for at least partially scraping a part from the leg suspended by the carrier, wherein the scraper plate is adapted to at least partially scrape the part from the leg while the carrier from which the leg is suspended is moved along the conveyor path, and wherein the scraper plate is adapted to at least partially scrape parts from legs suspended from different carriers,
  wherein the scraper plate is positioned along the conveyor path to process the legs suspended from the different carriers.

* * * * *

UNITED STATES PATENT AND TRADEMARK OFFICE
CERTIFICATE OF CORRECTION

PATENT NO. : 7,059,954 B2
APPLICATION NO. : 10/393705
DATED : March 21, 2003
INVENTOR(S) : Annema et al.

It is certified that error appears in the above-identified patent and that said Letters Patent is hereby corrected as shown below:

In column 23, line 21 replace "moved" with -- moving --

In column 23, line 31 replace "moved" with -- moving --

In column 25, line 13 replace "moved" with -- moving --

In column 25, line 19 replace "moved" with -- moving --

In column 28, line 10 replace "moved" with -- moving --

In column 28, line 15 replace "moved" with --moving --

In column 28, line 53 replace "moved" with -- moving --

In column 28, line 60 replace "moved" with -- moving --

Signed and Sealed this

Twenty-third Day of January, 2007

JON W. DUDAS
*Director of the United States Patent and Trademark Office*

UNITED STATES PATENT AND TRADEMARK OFFICE
CERTIFICATE OF CORRECTION

PATENT NO. : 7,059,954 B2
APPLICATION NO. : 10/393705
DATED : June 13, 2006
INVENTOR(S) : Annema et al.

It is certified that error appears in the above-identified patent and that said Letters Patent is hereby corrected as shown below:

In column 23, line 21 replace "moved" with -- moving --

In column 23, line 31 replace "moved" with -- moving --

In column 25, line 13 replace "moved" with -- moving --

In column 25, line 19 replace "moved" with -- moving --

In column 28, line 10 replace "moved" with -- moving --

In column 28, line 15 replace "moved" with --moving --

In column 28, line 53 replace "moved" with -- moving --

In column 28, line 60 replace "moved" with -- moving --

This certificate supersedes Certificate of Correction issued January 23, 2007.

Signed and Sealed this

Twentieth Day of February, 2007

JON W. DUDAS
*Director of the United States Patent and Trademark Office*